United States Patent [19]

Long et al.

[11] Patent Number: 4,974,144
[45] Date of Patent: Nov. 27, 1990

[54] DIGITAL DATA PROCESSOR WITH FAULT-TOLERANT PERIPHERAL INTERFACE

[75] Inventors: William L. Long, Pembroke; Robert F. Wambach, Attleboro; Kurt F. Baty, Medway; Joseph M. Lamb, Hopedale, all of Mass.

[73] Assignee: Stratus Computer, Inc., Marlboro, Mass.

[21] Appl. No.: 368,124

[22] Filed: Jun. 16, 1989

Related U.S. Application Data

[63] Continuation of Ser. No. 79,225, Jul. 29, 1987, abandoned, which is a continuation-in-part of Ser. No. 904,827, Sep. 8, 1986, Pat. No. 4,750,177, which is a continuation of Ser. No. 307,436, Oct. 1, 1981, abandoned, and a continuation-in-part of Ser. No. 18,629, Feb. 25, 1987, abandoned.

[51] Int. Cl.$^5$ .................. G06F 11/16; G06F 13/00
[52] U.S. Cl. ............................ 364/200; 371/8.2; 364/240.2; 364/268; 364/268.3; 364/268.7; 364/268.9
[58] Field of Search ... 364/200 MS File, 900 MS File; 371/8.2

[56] References Cited

U.S. PATENT DOCUMENTS

| | | | |
|---|---|---|---|
| 3,548,382 | 12/1970 | Lichty et al. | 340/172 |
| 3,688,274 | 8/1972 | Cormier et al. | 340/172 |
| 3,820,079 | 6/1974 | Bergh et al. | 340/172 |
| 3,879,712 | 4/1975 | Edge et al. | 340/172 |
| 3,984,814 | 10/1976 | Bailey, Jr. et al. | 340/172 |
| 3,991,407 | 11/1976 | Jordan, Jr. et al. | 340/172 |
| 4,015,246 | 3/1977 | Hopkins, Jr. et al. | 340/172 |
| 4,059,736 | 11/1977 | Perucca et al. | 179/175 |
| 4,099,234 | 7/1978 | Woods et al. | 364/200 |
| 4,245,344 | 1/1981 | Richter | 371/68 |
| 4,365,295 | 12/1982 | Katzman et al. | 364/200 |
| 4,428,044 | 1/1984 | Livon | 364/200 |
| 4,453,215 | 6/1984 | Reid | 364/200 |
| 4,484,275 | 11/1984 | Katzman et al. | 364/200 |
| 4,486,826 | 12/1984 | Wolff et al. | 364/200 |
| 4,805,039 | 4/1974 | Stiffler | 235/153 |

FOREIGN PATENT DOCUMENTS 8100925  4/1981  PCT Int'l Appl. .

OTHER PUBLICATIONS

"Standard Specification for S-100 Bus Interface Devices," K. A. Elmquist et al, Computer, Jul. 1979, vol. 12, No. 7, pp. 28-52.
"Fault Tolerant Systems" and Error Detection, T. Anderson et al, Fault Tolerance Principles and Practice, Prentice-Hall, 1981, pp. 93-145.
"Multiprocessor Organization-A Survey," P. H. Enslow, Jr., Computing Surveys, vol. 9, No. 1, Mar. 1977, pp. 103-129.
"Pluribus-An Operational Fault-Tolerant Multiprocessor," D. Katsuki et al, Proceedings of the IEEE, V. 66, No. 10, Oct. 1978, pp. 1146-1159.
"Fault-Tolerant Copmputers-A Hardware Solution to Part Failures Totally Insulates . . . ," G. Hendrie, Electronics, Jan. 27, 1983, pp. 103-105.

*Primary Examiner*—Eddie P. Chan
*Attorney, Agent, or Firm*—Lahive & Cockfield

[57] ABSTRACT

A fault-tolerant digital data processing system comprises a first input-output controller which communicates with at least one peripheral device over a peripheral device bus having first and second input/output buses, each carrying data, address, control, and timing signals from the input/output controller to the peripheral device. A device interface is coupled to the first and second input/output buses and to an associated peripheral device for transferring information between the buses and the associated peripheral device. In normal operation, the device interface applies duplicate information signals synchronously and simultaneously to the input/output buses for transfer to the input/output controller. The device interface also receives, in the absence of fault, duplicative information signal synchronously and simultaneously from the first and second input/output buses.

19 Claims, 32 Drawing Sheets

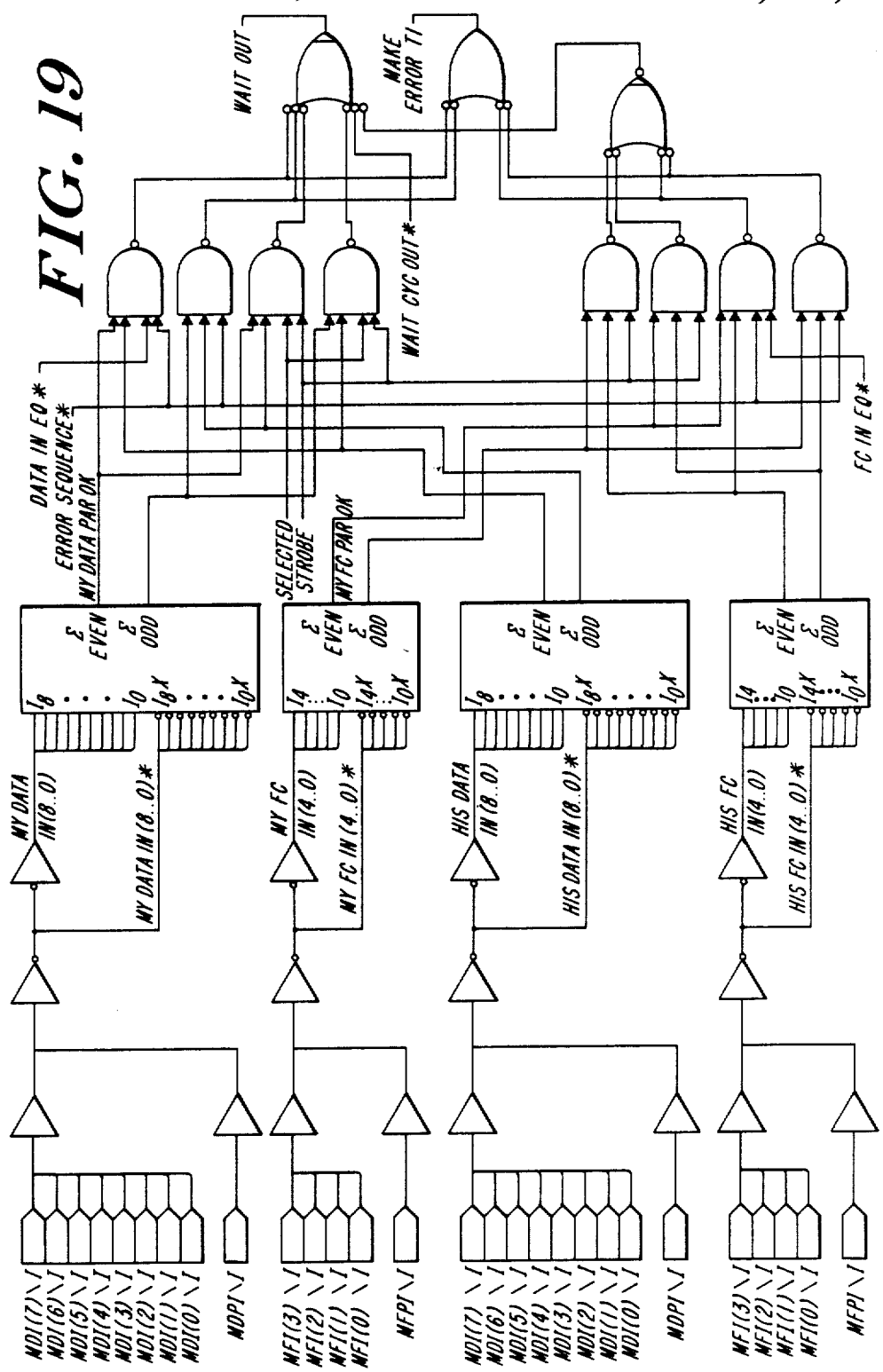

DIGITAL DATA PROCESSOR WITH FAULT-TOLERANT PERIPHERAL INTERFACE

This application is a continuation of Ser. No. 079,225, filed Jul. 29, 1987, now abandoned, which is a continuation-in-part of Ser. No. 904,827, filed Sept. 8, 1986, now U.S. Pat. No. 4,750,177, which is a continuation of Ser. No. 307,436, filed Oct. 1, 1981, now abandoned, and a continuation-in-part of Ser. No. 018,629, filed Feb. 25, 1987, now abandoned.

REFERENCE TO RELATED APPLICATIONS

This application is a continuation-in-part of U.S. patent application Ser. No. 904,827, filed Sept. 8, 1986, now U.S. Pat. No. 4,750,177, issued June 7, 1988, which is a continuation of U.S. patent application Ser. No. 307,436, filed Oct. 1, 1981. This application is, further, a continuation-in-part of U.S. patent application Ser. No. 018,629, filed Feb. 25, 1987.

The application is related to the following commonly-assigned United States patents and patent applications:

| Title | U.S. Ser. or Pat. No. |
| --- | --- |
| "Digital Data Processor With High Reliability" | U.S. Pat. No. 4,654,857 |
| "Digital Data Processor With Fault Tolerant Bus Protocol" | Ser. No. 904,827, filed September 8, 1986 (A Cont. of USSN 307,436, filed October 1, 1981), now U.S. Pat. No. 4,750,177 |
| "Central Processing Apparatus" | U.S. Pat. No. 4,453,215 |
| "Computer Memory Apparatus" | U.S. Pat. No. 4,597,084 |
| "Computer Peripheral Control Apparatus" | U.S. Pat. No. 4,486,826 |
| "Digital Data Processing Apparatus with Pipelined Memory Cycles" | Ser. No. 896,667, filed August 14, 1986 abandoned in favor of continuation application Ser. No. 227,471, filed August 1, 18988 |
| "Method and Apparatus for Fault Tolerant Computer System Having Expandable Processor Section" | Ser. No. 927,746, filed November 5, 1986, now U.S. Pat. No. 4,816,990 |
| "Method and Apparatus for Digital Logic Synchronism Monitoring" | Ser. No. 003,732, filed January 16, 1987 |
| "Fault-Tolerant Digital Timing Apparatus and Method" | Ser. No. 018,629, filed February 25, 1987, now U.S. Pat. No. 4,920,540 |
| "Digital Data Processor with Fault Tolerant Peripheral Bus Communications" | Ser. No. 079,297, filed July 29, 1987, now U.S. Pat. No. 4,926,315 |
| "Fault Tolerant Digital Data Processor with Improved Input/Output Controller" | Ser. No. 079,295, filed July 29, 1987, now abandoned |
| "Fault Tolerant Digital Data Processor with Improved Communications Monitoring" | Ser. No. 079,218, filed July 29, 1987, now U.S. Pat. No. 4,931,922 |
| ×Fault Tolerant Digital Data Processor with Improved Bus Protocol" | Ser. No. 079,223, filed July 29, 1987, now U.S. Pat. No. 4,939,643 |

The aforementioned patents and patent applications are incorporated herein by reference.

BACKGROUND OF THE INVENTION

The invention relates to fault tolerant digital data processing and, particularly, to apparatus and methods for providing fault tolerant communications with peripheral devices.

Faults in digital computer systems are inevitable and are due, at least in part, to the complexity of the circuits, the associated electromechanical devices, and the process control software. To permit system operation even after the occurrence of a fault, the art has developed a number of fault-tolerant designs. Among these is Rennels, "Architecture for Fault-Tolerant Spacecraft Computers," Proceedings of the I.E.E.E., Vol. 66, No. 10, pp. 1255-1268 (1975), disclosing a computer system having independent self-checking computer modules (SCCM's). In the event of failure of a module, the SCCM is taken off-line.

An improved fault-tolerant digital data processing system is currently available from the assignee hereof, Stratus Computer Company, of Marlboro, Massachusetts. This system employs redundant functional unit pairs, e.g., duplicative central processing units, duplicative memory units, and duplicative peripheral control units, interconnected for information transfer by a common system bus.

The aforementioned system bus includes two duplicative buses, the A Bus and the B Bus, as well as a control bus, the X Bus. During normal operation, signals transferred along the A Bus are duplicated through simultaneous transmission along the B Bus. Signals transferred along the X Bus, including timing, status, diagnostics and fault-responsive signals, and are not duplicated.

Within the Stratus System, control of and communications with peripheral devices are effected by peripheral control units. One such unit, the communication control unit, routes control and data signals to attached peripheral devices by way of a communication bus.

With this background, an object of this invention is to provide an improved digital data processing system. More particularly, an object of this invention is to provide a system for improved fault-tolerant communication with, and control of, peripheral devices.

A further object of this invention is to provide an improved fault-tolerant bus structure for use in digital data processing apparatus and, particularly, for use in communications with data processor peripheral units.

Yet another object of this invention is to provide an input/output controller for controlling and communicating with plural peripheral devices over a common peripheral bus structure.

Other objects of the invention are evident in the description which follows.

SUMMARY OF THE INVENTION

The aforementioned objects are attained by the invention which provides, in one aspect, an improved fault-tolerant digital data processing system having a first input/output controller which communicates with at least one peripheral device over a peripheral device bus. The peripheral bus means includes first and second input/output buses, each including means for carrying data, address, control, and timing signals.

The input/output controller includes an element for applying duplicate information signals synchronously and simultaneously to the first and second input/output buses for transfer to the peripheral device. That is, upon applying information signals to the first input/output bus, the input/output controller simultaneously applies those same signals to the second input/output bus.

In a further aspect, the invention provides a fault-tolerant digital data processing system of the type described above in which the input/output controller includes a bus interface element for receiving, in the absence of fault, duplicative information signal synchronously and simultaneously from the first and second input/output buses.

Still further, the invention provides a digital data processor of the type describe above in which the input/output controller includes clocking elements for generating and transferring on the first and second input/output buses strobe signals indicative of the timing of associated information transfer along those buses.

The aforementioned input/output controller can also include a scanner element for polling the peripheral devices which are connected along the peripheral device bus. By this polling, the scanner can determine the current operational status of each peripheral device. Using this scanning element, the input/output controller can determine, for example, whether a peripheral is active and awaiting instruction, whether it requires interrupt processing, or whether it has become unexpectedly inactive.

According to another aspect of the invention, a digital data processor having a first input/output controller communicates with one or more peripheral devices over a peripheral device bus having first and second input/output buses for carrying, respectively, first and second input signals. In the absence of fault, these first and second signals are identical and are transmitted synchronously and simultaneously along those buses.

The aforementioned input/output controller can include first and second processing sections, each for processing signals received on the peripheral device bus. During the course of normal operation, the first and second processing sections receive identical input signals from the peripheral bus and produce identical output signals.

Further, a first bus interface element can be coupled with the processing sections and with said peripheral bus for receiving the first and second input signals and for applying at least one of those input signals identically, i.e., synchronously and simultaneously, to said first and second processing sections.

A digital data processor of the type described above can also include a second peripheral controller which is coupled with the peripheral device bus for receiving the first and second input signals identically with the first peripheral controller. In this aspect, a second device interface element serves to apply at least one of those input signals to said second input/output controller.

In order to coordinate operations of the first and second processing sections, the data processor can include a flash circuitry element that is coupled to the first and second bus interface. This circuitry is responsive to operational states of the bus interface elements for generating a signal indicative of the synchronous receipt of identical copies at least one of the first and second input signals by each of said first and second bus interface elements.

Thus, the flash circuitry provides a mechanism by which the digital data processor can insure that the first and second bus interface sections are simultaneously applying duplicative and synchronous information signals to the first and second processing sections of the first peripheral controller, as well as to the second peripheral controller.

In still another aspect, a digital data processor as described above can utilize bus interface elements for applying duplicative output signals synchronously and simultaneously to the first and second input/output buses. Within such a processor, flash circuitry can be advantageously employed to monitor those transmissions.

According to this aspect of the invention, the flash circuitry can generate a timing signal, which itself is transmitted along the first and second input/output buses, indicative of the timing of information transfer cycles along the bus. Consequently, for example, a peripheral device attached to the bus can employ an interface for inputting transferred signals only at the time of receipt of the transmitted strobe signal. Through this mechanism, the peripheral avoids the processing of non-duplicative or asynchronous information signals.

The flash circuitry of a digital data processor as described above can include, further, a strobe delay element which responds to differing operational states of the first and second bus interface elements for delaying generation of the aforementioned STROBE signal. This delay element can be employed to facilitate continuous operation notwithstanding a slight delay in the receipt of either of the first and second information signals along the peripheral bus structure.

The flash circuitry can also employ an element for periodically and repeatedly comparing the operational states of the first and second bus interface elements in order to detect the concurrence of the first and second information signals. In the event those signals do not agree after a specified time period, the processing sections can initiate an error detection sequence to determine the source of fault.

Another aspect of the invention provides a fault-tolerant digital data processing system having a first input/output controller which communicates with at least one peripheral device over a peripheral device bus, which includes first and second input/output buses As above, each of these buses can carry data, address, control, and timing signals from the input/output controller to the peripheral device.

According to this aspect of the invention, a device interface is coupled to said first and second input/output buses means and to an associated peripheral device for transferring information between said the buses and the associated peripheral device. In normal operation, the device interface applies duplicate information signals synchronously and simultaneously to the input/output buses for transfer to said input/output controller.

In a related aspect of the invention, the device interface includes a bus interface section for receiving, in the absence of fault, duplicative information signal synchronously and simultaneously from the first and second input/output buses.

The interface can include a fault detection element that is coupled to said bus interface for detecting faulty information transmission and for responding thereto to generate a fault signal. According to this aspect of the invention, the device interface can respond to a first selected type of transmission error, e.g., a single-bit error, occurring on one of the buses for accepting data only from the other bus. Similarly, the device interface can respond to a second selected error type, e.g., a multi-bit error, occurring on either bus for initiating a diagnostic testing sequence.

The aforementioned testing sequence can include the timed generation of various diagnostic testing signals, which are intended to facilitate the identification of the source of error, By way df example, subsequent to the detection of a multi-bit error, a transmitter portion of the device interface can apply "assert" signals—i.e., all one's or zero's—to the peripheral bus data and function code conductors for a specified time interval. Concurrently, a receiver portion of the interface can monitor the bus to determine whether all the incoming signals retain their asserted values.

In still further aspects, the invention is directed to methods of operating a digital data processor in accord with the functioning of the apparatus described above.

These and other aspects of the invention are evident in the drawings and the detailed description below.

BRIEF DESCRIPTION OF THE DRAWINGS

A more complete understanding of the invention may be obtained by reference to the drawings, in which:

FIG. 19 illustrates a preferred circuit for detecting faults in incoming data signals in a device interface constructed according to the invention;

DESCRIPTION OF THE ILLUSTRATED EMBODIMENT

Figure 1:
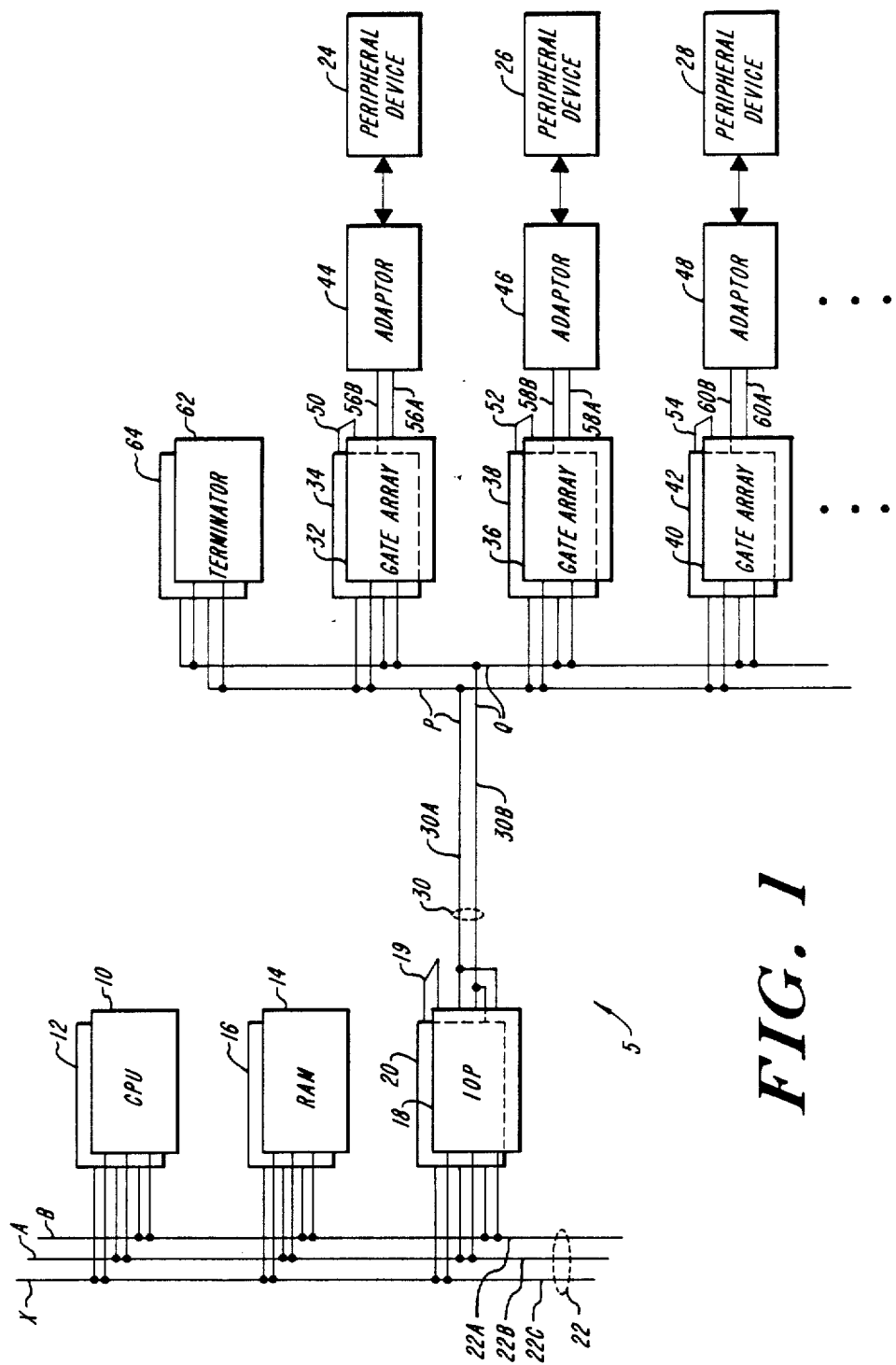
FIG. 1 illustrates a digital data processing system including a fault tolerant peripheral i/o system constructed according to a preferred practice of the invention.

FIG. 1 depicts a digital data processing system 5 having a fault tolerant peripheral input/output system constructed according to a preferred practice of the invention. The system 5 includes partnered central processing units 10, 12, partnered random access memory unites 14, 16, and partnered input/output controllers 18, 20, connected for communications over system bus 22.

The i/o controllers 18, 20, which are coupled via flash bus 19, control the transfer of information and control signals between the system backplane, represented by system bus 22, and one or more peripheral devices 24, 26, 28. These peripheral devices can include permanent storage media, e.g., disk and tape drives, communications controllers, network interfaces, and the like.

Peripheral device control and information signal transfers occur over peripheral bus 30, which includes dual input/output buses 30A, 30B. Signals carried over these buses are routed to the peripheral devices 24, 26, 28 via gate arrays 32, 34, 36, 38, 40, 42 and adaptors 44, 46, 48. As shown in the illustration, each peripheral device, e.g., device 24, is associated with a gate array pair, e.g., arrays 32, 34, and an adaptor, e.g., adaptor 44. The paired gate arrays, e.g., arrays 32, 34, are interconnected by a communications line, as illustrated; e.g., see line 50. Moreover, each gate array is connected to its associated adaptor by an adaptor bus; see lines 56A, 56B, 58A, 58B, 60A, 60B. In turn, the adaptors 44, 46, 48 are coupled to their respective associated peripheral devices 24, 26, 28 via local peripheral lines, as illustrated.

The peripheral bus 30 and, particularly, first and second i/o buses 30A, 30B, are terminated by terminators 62, 64.

The illustrated central processing units 10, 12, the random access memory units, and the system bus 22 are constructed according to the teachings of the aforementioned United States patents and patent applications, to wit, U.S. Pat. Nos. 4,453,215; 4,486,826; and 4,597,084; and U.S. patent application Ser. Nos. 762,039; 896,667; 904,827; and 927,746.

According to a preferred practice, i/o buses 30A and 30B serve as redundant signal carriers. That is, the buses 30A, 30B carry duplicative information signals synchronously and simultaneously. This arrangement facilitates the detection of transmission faults and permits the system to provide continuous, uninterrupted, processing and communication over the non-faulty bus.

According to a preferred practice, each bus 30A, 30b, includes data, control, parity, strobe, and "wait" signal conductors. Physically, the bus 30 can be implemented using two cables of 30 twisted pairs each. Such an implementation permits redundant 8-bit transfers at 4 megahertz using one cable or, alternatively, redundant 16-bit transfers at 4 megahertz using both cables. Information transfers along bus 30 occur at a cycle rate of 250 nanoseconds, thus providing 8-bit transfers at four megabytes per second and 16-bit transfers at eight megabytes per second.

The data, control, parity and wait signal lines of each i/o bus 30A, 30B are open collector conductors and are driven, for example, by Motorola 26S10 transceivers. Two strobe lines are provided in each bus 30A, 30B. These paired lines serve as a differential signal carriers driven at the i/o controller 14, 20 and received at terminators 62, 64.

The gate array pairs, which may reside on a single board, are inserted in slots of an adaptor chassis (not shown). Each slot is associated with a slot-id which defines the address of the associated peripheral device. In one embodiment, the chassis maintains sixteen such addressable slots, with the far end terminators 62, 64 occupying the final two slots.

Figure 2:
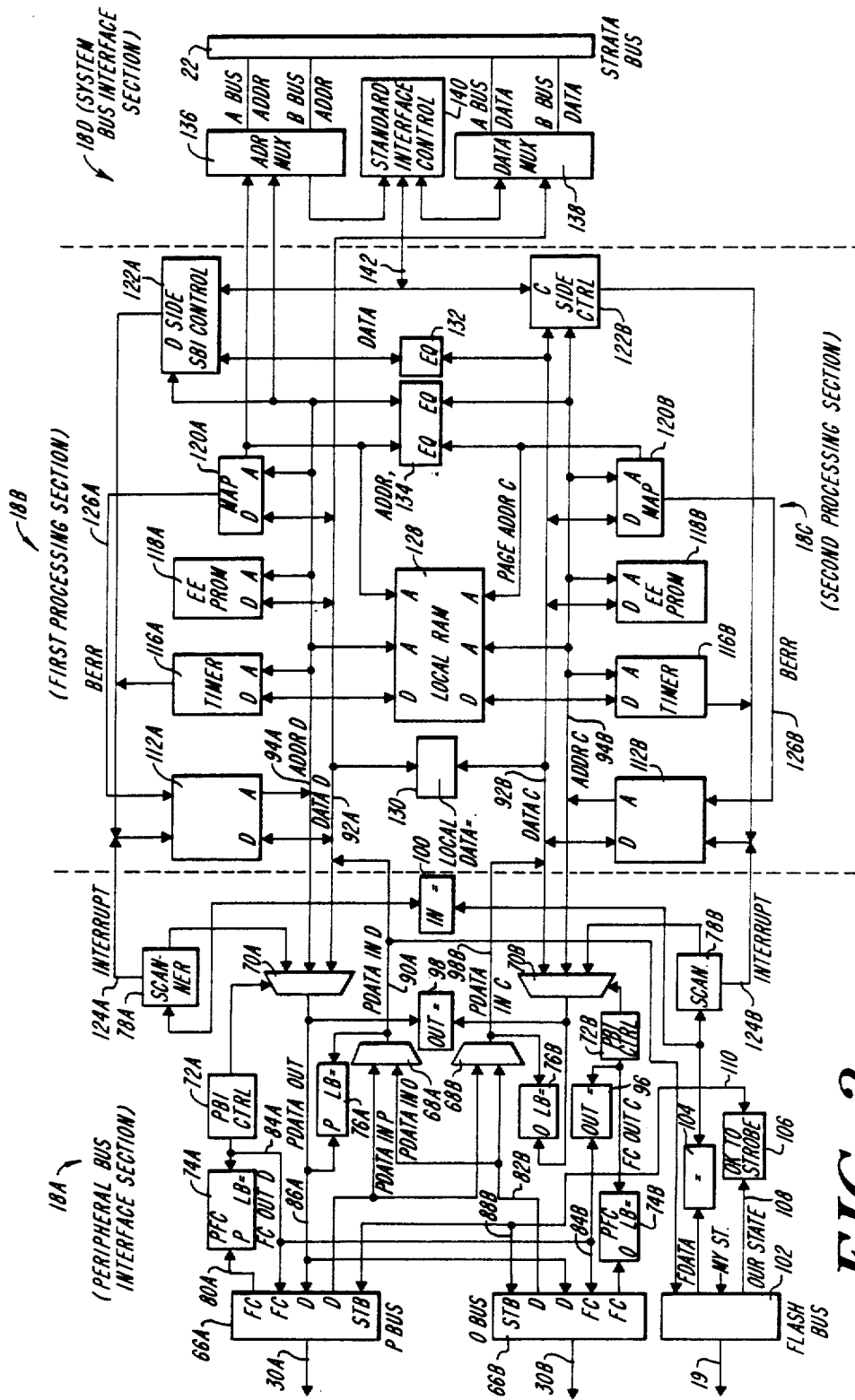
FIG. 2 illustrates an i/o controller constructed in accord with a preferred practice of the invention.

FIG. 2 depicts an i/o controller 18 constructed in accord with a preferred practice of the invention. The i/o controller 18 includes a peripheral bus interface section 18A, a first processing sections 18B, a second processing section 18C, and a system bus interface section 18D. The peripheral bus interface section 18A provides an interface for receiving, transmitting, and checking information transfers between the i/o controller 18 and devices attached to first and second i/o buses 30A, 30B. The system bus interface section 18D provides interface for receiving, transmitting, and checking information transfers between the i/o controller 18 and those functional units (e.g., central processing units 10, 12 and random access memory units 14, 16) attached along the system bus 22. The first and second processing sections 18B, 18C serve as redundant processing for signals received by the i/o controller from system and peripheral buses.

The peripheral bus control section 18A is composed of two duplicative interface sections: the "drive" section shown in the upper-left portion of FIG. 2; and the "check" section shown in the lower-left portion of FIG. 2. The drive section is primarily associated with both the first i/o bus 30A (hereinafter referred to as the "P bus") and the first processing section 18B. That is, in the absence of fault, the drive section couples the P Bus 30A with the first processing section 18B. Similarly, the check section is primarily associated with the second i/o bus 30B (hereinafter referred to as the "Q bus") and the second processing section 18C.

With particular reference to FIG. 2, it is seen that the drive section of the peripheral bus interface 18A includes transceiver 66A, input data multiplexor 68A, output data multiplexor 70A, peripheral bus interface control 72A, function code loop-back comparator 74A, data loop-back comparator 76A, and peripheral scanner 78A.

Transceiver 66A receives incoming data from the P bus and makes this data available to the controller 18 on line 82A. The transceiver also monitors function code signals on the P bus, via line 80A, for loopback comparison. Data generated for output by the controller 18 is passed to the transceiver via line 86A for transmission along the P bus, while function codes generated for output by the controller 18 are passed to 66A via line 84A for transmission along the P bus.

Incoming drive section data signals are routed to multiplexor 68A, along with data signals received from the check section transceiver 66B, as shown. Data selected by multiplexor 68A is routed along line 90A to the first processing section data bus 92A.

In the absence of fault, as where duplicate data signals are received from P bus and Q bus synchronously and simultaneously, the multiplexor 68A will select P bus data signals, received along line 82A, for routing to first processing section data bus 92A. However, if the P bus data is detected as faulty, the multiplexor will select Q bus data signals, received along line 82B, for routing to the first processing section data bus 92A.

Outgoing data signals generated by the scanner 78A, the first processing data bus 92A, and the first processing address bus 94A, are routed through output multiplexor 70A, which acts under the control of controller 72A. Signals from the multiplexor 70A are transmitted to the P bus via line 86A, while simultaneously being routed to loop-back comparator 76A.

The bus interface control 72A generates a function code signal along line 84A for output by the transceiver 66A. This function code signal is also routed to the check section for output along the Q bus via line 84B and transceiver 66B. Function code signals generated by control 72A are compared with incoming function code signals, routed on line 80A, by loop-back comparator 74A.

As shown in FIG. 2, the check side of the peripheral bus interface section 18A is of similar construction to the drive side of that section. Accordingly, operation of the check side of the peripheral bus interface section 18A will be understood by reference to the discussion above.

With further reference to FIG. 2, the peripheral bus interface 18A is seen to include function code comparator 96. This comparator compares function code signals produced by both the drive side interface control 72A and the check side interface control 72B to produce a signal indicating whether these match. The interface 18A further includes output data comparator 98 and input data comparator 100. The output data comparator 98 is arranged for comparing data signals selected by the drive side multiplexor 70A with those selected by check side multiplexor 70B, while the input data comparator is arranged for comparing data selected by multiplexor 68A with that selected by check side multiplexor 68B.

In addition to the drive and check sides, discussed above, the peripheral bus interface section 18A includes circuitry for transmitting local data and operational status signals to partner controller 20. This circuitry, termed "flash" circuitry, also compares data and status signals received from the partner controller 20.

According to the illustrated embodiment, the flash circuitry includes transceiver 102, comparator 104, and strobe generator 106. The transceiver 102 transmits data signals from the drive side of the interface 18A to the flash bus 19. The transceiver also transmits operational status signals to the flash bus 19, as indicated by the signal line denoted MY STATE. Data received from the flash bus is transferred from the transceiver 102 to the comparator 104, as shown. There, the data is compared with check side data routed on line 90B. State information received from the flash bus is passed along line 108 to strobe generator 106. If this information compares favorably with local operational status signals, or if it is determined that strobe signals must otherwise be generated, e.g., during an error detection sequence, the strobe generator 106 generates strobe information for routing to the P and Q buses via lines 110, 88A, and 88B.

With further reference to FIG. 2, the first processing section 18B includes processor 112A, timer 116A, EEPROM 118A, map section 120A, and control 122A. As indicated in the illustration, each of these elements is coupled to the data bus 92A for transmitting and receiving data signals, while the later four of the elements are coupled to the address bus 94A for receiving addressing signals. The processor 112A is arranged for driving addressing signals onto the address bus 94A.

Interrupt signals generated by the scanner 78A, the timer 116A, and the control 122A are transferred via line 124A to the processor. Similarly, an error signal designated BERR generated by the map section is transferred via line 126A to the processor 112A.

The second processing section 18C is constructed similarly to the first processing section 18B, as shown in the drawing.

The controller 18 also includes circuitry which is shared by the first and second processing sections 18B, 18C. To wit, a random access memory module 128 accepts addressing information from both address buses 94A, 94B, as illustrated. The module is also connected for receiving and transmitting data to and from the local data buses 92A, 92B, as shown in the illustration. The illustration also depicts the transfer of paging information to the memory module 128 from map sections 120A, 120B.

According to a preferred embodiment, data comparators 130, 132 monitor signals received from the local data buses 92A, 92B to identify discrepancies between them. A further comparator 134 monitors signals received from the local address buses 94A, 94B, as well as signals generated by map sections 120A, 120B, to identify differences therebetween.

The system bus interface section 18D includes address multiplexor 136, data multiplexor 138, as well as standard interface control 140. The address multiplexor 136 transfers output address signals from the map section 120A and the address bus 94A to the system bus 22 and, more particularly, to the duplicative buses 22A and 22B. The data multiplexor 138 transfers output data signals from the local data bus 92A to the duplicative buses 22A and 22B, as shown in the illustration. As further depicted in FIG. 2, address and control information received by the address and data multiplexors 136, 138 is routed to the standard interface control 140. From there, this incoming information may be routed via line 142 to controls 122A and 122B. A preferred construction of bus interface section 18D is provided in the aforementioned related United States Patents and Patent Applications.

I/O Controller Peripheral Bus Interface

According to one preferred practice, i/o controller 18 can be connected with the peripheral bus 30, via transceivers 66A, 66B, to send and/or receive the signals identified below. Hereinafter, the i/o controller is referred to as the "IOP", while a gate array/adaptor combination, e.g., gate arrays 32, 34 and adaptor 44, is referred to as an "interface" or "IOA".

| Signal Name | Description | Signal Direction |
| --- | --- | --- |
| Data 0 P | Bus P Data Bit 0 | IOP to/from IOA |
| Data 1 P | Bus P Data Bit 1 | IOP to/from IOA |
| Data 2 P | Bus P Data Bit 2 | IOP to/from IOA |
| Data 3 P | Bus P Data Bit 3 | IOP to/from IOA |
| Data 4 P | Bus P Data Bit 4 | IOP to/from IOA |
| Data 5 P | Bus P Data Bit 5 | IOP to/from IOA |
| Data 6 P | Bus P Data Bit 6 | IOP to/from IOA |
| Data 7 P | Bus P Data Bit 7 | IOP to/from IOA |
| Data Parity P | Bus P Data Parity | IOP to/from IOA |
| Data 0 Q | Bus Q Data Bit 0 | IOP to/from IOA |
| Data 1 Q | Bus Q Data Bit 1 | IOP to/from IOA |
| Data 2 Q | Bus Q Data Bit 2 | IOP to/from IOA |
| Data 3 Q | Bus Q Data Bit 3 | IOP to/from IOA |
| Data 4 Q | Bus Q Data Bit 4 | IOP to/from IOA |
| Data 5 Q | Bus Q Data Bit 5 | IOP to/from IOA |
| Data 6 Q | Bus Q Data Bit 6 | IOP to/from IOA |
| Data 7 Q | Bus Q Data Bit 7 | IOP to/from IOA |
| Data Parity Q | Bus Q Data Parity | IOP to/from IOA |
| Func 0 P | Bus P Function Code Bit 0 | IOP to IOA |
| Func 1 P | Bus P Function Code Bit 1 | IOP to IOA |
| Func 2 P | Bus P Function Code Bit 2 | IOP to IOA |
| Func Parity P | Bus P Function Code Parity | IOP to IOA |
| Func 0 Q | Bus Q Function Code Bit 0 | IOP to IOA |
| Func 1 Q | Bus Q Function Code Bit 1 | IOP to IOA |
| Func 2 Q | Bus Q Function Code Bit 2 | IOP to IOA |
| Func Parity Q | Bus A Function Code Parity | IOP to IOA |
| Strobe P | Bus P Strobe positive conductor of differential pair | IOP to IOA |
| Strobe P* | Bus P Strobe negative conductor of differential pair | IOP to IOA |
| Strobe Q | Bus Q Strobe positive conductor of differential pair | IOP to IOA |
| Strobe Q* | Bus Q Strobe | IOP to IOA |

-continued

| Signal Name | Description | Signal Direction |
|---|---|---|
| | negative conductor of differential pair | |
| Wait P | Bus P Wait | IOA to IOP |
| Wait Q | Bus Q Wait | IOA to IOP |

According to a preferred practice, i/o controller 18 transmits and receives on the flash bus 19 the signals listed below, wherein the first i/o controller, e.g., controller 18, is referred to as "IOP 1", and the second i/o controller, e.g., controller 20, is referred to as "IOP 2". An "*" in the signal name indicates that the signal is inverted. The flash bus 19 is a wire OR'ed open-collector. The controllers IOP 1 and IOP 2 concurrently present a signal level on the bus 19, with the "low" level prevailing and being received by both controllers.

| Signal Name | Description | Signal Direction |
|---|---|---|
| FDATA 0* | Flash Bus Data Bit 0 | IOP 1 to/from IOP 2 |
| FDATA 1* | Flash Bus Data Bit 1 | IOP 1 to/from IOP 2 |
| FDATA 2* | Flash Bus Data Bit 2 | IOP 1 to/from IOP 2 |
| FDATA 3* | Flash Bus Data Bit 3 | IOP 1 to/from IOP 2 |
| FDATA 4* | Flash Bus Data Bit 4 | IOP 1 to/from IOP 2 |
| FDATA 5* | Flash Bus Data Bit 5 | IOP 1 to/from IOP 2 |
| FDATA 6* | Flash Bus Data Bit 6 | IOP 1 to/from IOP 2 |
| FDATA 7* | Flash Bus Data Bit 7 | IOP 1 to/from IOP 2 |
| WE STRB* | IOP to issue STROBE | IOP 1 to/from IOP 2 |
| WE HOLD STRB* | IOP to hold STROBE because of WAIT | IOP 1 to/from IOP 2 |
| CF NEQ* | Check side data does not equal flash data | IOP 1 to/from IOP 2 |
| CD NEQ* | Check side data does not equal drive side data | IOP 1 to/from IOP 2 |
| P NOK* | Failure detected in Bus P | IOP 1 to/from IOP 2 |
| Q NOK* | Failure detected in Bus Q | IOP 1 to/from IOP 2 |

Memory Allocation

The i/o controller 18 and its circuitry is allocated in a virtual memory configuration as follows:

| Address | Content |
|---|---|
| 000000x - BDFFFFx | User mapped virtual memory |
| BE0000x - BEFFFFx | PROM (elements 118A, 118B), also residing at 000000x - 00ffffx when PROM is not high |
| BF0000x - BF7FFFx | Not used |
| BF8000x - BF8FFFx | Sync page |
| BF9000x - BF9FFFx | P Bus DMA (direct memory access) select/P Bus command page |
| BFA000x - BFAFFFx | Supervisor control (incl., control registers for P bus, timer elements 116A, 116B), scanner (elements 78A, 78B, and scanner list) |
| BFB000x - BFBFFFx | Privileged control |
| BFC000x - BFFFFFx | Map (elements 120A, 120B) |
| C00000x - FFFFFFx | P Bus programmed i/o space, providing a 4 MByte window into |

| Address | Content |
|---|---|
| | the selected adaptor |

Within the DMA select/interface command page, address space is arranged as follows:

| Address | Access | Content |
|---|---|---|
| BF9002X | write word | Select Adaptor for PIO command<br>Bits 15-08 Slot/subchannel<br>07 "1"<br>06-00 Command number |
| BF9004-006 | write long | Select peripheral adaptor for DMA write<br>Bits 31-24 Slot/subchannel<br>23-22 "00"<br>21-16 Upper six adaptor address bits<br>15-00 Lower sixteen adaptor address bits |
| BF9008-BF900A | write long | Select peripheral adaptor for DMA read<br>Bits 31-24 Slot/subchannel<br>23-22 "00"<br>21-16 Upper six adaptor address bits<br>15-00 Lower sixteen adaptor address bits |
| BF900C | write long | Select Adaptor for DMA Verify<br>Bits 31-24 slot/subchannel<br>23-22 "00"<br>21-16 up 6 peripheral adaptor address bits<br>15-00 lower 16 adaptor address bits |

Supervisory Control Page

Supervisory control page accesses are made at virtual page BFA000x. The timer, peripheral bus and scanner control, including the scanner list, are addressed in this page. USER and CODE accesses to this page cause the generation of BERR* along line 126A. The page also maintains selected interrupt, privilege, and scanner interrupt status information.

All control accesses to the supervisory control page, except for accesses to timer 116A require no wait states. Unlatched control pulses are initiated by the rising edge of a first timing signal and terminated by the falling edge of a subsequent timing signal. Control bits for the standard bus interface and P bus are synchronized to a 4 MHz clock signal.

Within the supervisory control command page, i/o address space is allocated as follows:

| Address | Access | Content |
|---|---|---|
| BFA000 | Read | Timer Data Word |
| BFA002 | | Timer Status Word<br>Bits 15-00 |
| BFA000 | Write | Timer Data Word |
| BFA002 | | Timer Command/Data Pointer Words<br>Bits 15-00 |
| BFA400 | Read | Checksum Word<br>Bits 15-00 |
| BFA400 | Write | PUBS/SCANNER/DEV CONTROL |

-continued

| Address | Access | Content |
|---|---|---|
| | | WORD<br>Bit 15 (1 to set/0 to clear)<br>Bits 02-01-00<br>  1 1 1  PBUS Enable Bit (active hi)<br>  1 1 0  Set PBUS-BERR Enable Bit (active hi)<br>  1 0 1  Scanner on (active hi)<br>  1 0 0  Run Scanner (active hi)<br>  0 1 1  Timer Interrupt Mask/Clear (masked off lo)<br>  0 1 0  Level 1 Interrupt (active hi)<br>  0 0 1  Privileged Bit (active low)<br>  0 0 0  PBUS Lock (active low) |
| BFA800 | Read | Scanner Interrupt Status Word (to be read only if a scanner interrupt is pending)<br>Bits 15-00<br>Bit 15 Adaptor Alive (active hi)<br>Bit 14 Adaptor Interrupt (active hi)<br>Bit 13 Adaptor Obeying P<br>Bit 12 Adaptor Obeying Q<br>Bits 11-8 Adaptor Interrupt Code or Subchannel<br>Bits 7-4 Slot number<br>Bits 3-0 TBD (subchannel) |
| BFA801 | write | PTO Slot Select Address Byte<br>Bits 7-4 Slot number<br>Bits 3-0 TBD (subchannel) |
| BFAC01-<br>BFADFF | Read (Odd Addresses) | Scanner Slot Select Address Byte<br>Bits 7-4 Slot number<br>Bits 3-0 TBD (subchannel) |
| BFAC01-<br>BFADFF | write (Odd Addresses) | Scanner Slot Select Address Byte<br>Bits 7-4 Slot number<br>Bits 3-0 TBD (subchannel) |

Privilege Control Page

Privilege control page accesses are made at virtual address BFB000x. The controller 18 privileged-only status and control registers are stored in this virtual page. Additionally, the standard bus interface 122A control resides in this page. Accesses to the privilege control page require no wait states.

Within the privileged control page, i/o address space is arranged as follows:

| Address | Access | Content |
|---|---|---|
| BFB000 | Read | Board Status Word (note: if one, a mask bit allows the interrupt for the specified condition)<br>Bit 15 BROKEN<br>Bit 14 BROKEN TWO<br>Bit 13 MEMORY BROKEN -- Parity/Data<br>Bit 12 MEMORY BROKEN -- Compare<br>Bit 11 TIMER INTERRUPT MASK (enabled if 1)<br>Bit 10 PK COMPARE (Hi=OK) |
| | | Bit 09 COMMAND PENDING<br>Bit 08 STATUS CHANGE<br>Bit 07 Side C = 1, D = PROM HI -- read only<br>Bit 06 INTERRUPT PENDING (from IOP on Strata-BUS)<br>Bit 05 PARTNERED bit<br>Bit 04 ZOUT GT<br>Bit 03 LEVEL1 INT<br>Bit 02 PROM HI -- when this bit is cleared, PROM addresses start at 0 and RAM addresses below 8000 are not available. When prom is high, Side D is also high. When prom is not high, Side is low.<br>Bit 01 INTERRUPT MASK for Bit 09 (CMD PENDING) being 1 (Level 4)<br>Bit 00 INTERRUPT MASK for all conditions and levels (Bits 00-05 are 0 after a RESET.) |
| BFB000 | Write | Board Status Word<br>Bit 15 (1 to set/0 to clear)<br>Bits 02-01-00<br>  1 1 1  P PBUS Enabled<br>  1 1 0  Q PBUS Enabled<br>  1 0 1  PARTNERED bit<br>  1 0 0  OUTPUT GRANT bit<br>  0 1 1  PBUS OBEY FORCE bit<br>  0 1 0  PROM HI bit<br>  0 0 1  INTERRUPT MASK for (CMD PENDING) Level 4<br>  0 0 0  INTERRUPT MASK for all conditions and levels |
| BFB401<br>BFB403<br>BFB405<br>BFB407 | Read | Standard Interface Command Register Bytes<br>Bits 07-00 for all |
| BFB400 | write | Board Control Word<br>Bits 15--02-01-00<br>0  1 1 1  CLEAR BROKEN (only used by PROM code)<br>0  1 1 0  CLEAR BROKEN TWO, CLEAR MEMORY, PARITY ERROR, CLEAR MEMORY COMPARE ERROR, CLEAR INTERRUPT LEVELS 2-3, CLEAR PK COMPARE ERROR, CLEAR WAIT-TIMEOUT ERROR, CLEAR PBUS OBEY ERROR<br>0  1 0 1  CLEAR CHECKSUM<br>0  1 0 0  SYNC JIFFY TIMER<br>0  0 1 1  SET INTERRUPT REQUEST<br>0  0 1 0  CLEAR DMA ENABLE<br>0  0 0 1  CLEAR COMMAND PENDING<br>0  0 0 0  CLEAR STATUS CHANGE |
| BFB801<br>BFB803<br>BFB805<br>BFB807 | Read | Standard Interface Pointer Register Bytes<br><br>Bits 07-00 for all |
| BFB801 | Write | Standard Interface VOS Vector Byte<br>Bits 07-00 Vector Number |
| BFBC00 | Read | Pbus Status Word |

| Address | Access | Content |
|---|---|---|
| | | Bit 15 VERIFY OK |
| | | Bit 14 DMA WRITE |
| | | Bit 13 DMA READ |
| | | Bit 12 SCANNER INTERRUPT (active low) |
| | | Bit 11 SCANNER SET TO RUN (active low) |
| | | Bit 10 PBUS OBEY FORCED |
| | | Bit 9 P PBUS ENABLED Sync |
| | | Bit 8 Q PBUS ENABLED Sync |
| | | Bit 7 PBUS WAIT-TIMEOUT ERROR (active low) |
| | | Bit 6 PBUS OBEY ERROR (active low) |
| | | Bit 5 PBUS SELECT ERROR (active low) |
| | | Bit 4 PBUS SELECT BERR ENABLED (active hi) |
| | | Bit 3 PBUS ENABLED Sync |
| | | Bit 2 PBUS LOCK (locked if low) |
| | | Bit 1 OBEY P |
| | | Bit 0 OBEY Q |
| BFBC00 | Write | CHECKSUM TEST WORD/BYTE Bits 15-8 Add byte (if asserted) to checksum for test Bits 7-0 Add byte (if asserted) to checksum for test |

The Map Element

In a preferred embodiment, the map 120A includes four pages of 24 bit map entries, each having sixteen physical address translation bits, one i/o bit, one interlock bit, three access control bits, one local/main memory bit, one DMA thread bit, and one spare bit. The translation address bits are aligned on even word boundaries, while the control bits occupy a bytes aligned on odd word boundaries. The access control bits are allocated to define the following access types:
no access;
any access - write only memory;
any access - read data/execute;
any access - read data/write data;
privileged access - no access;
privileged access - write only memory;
privileged access - read data/execute; and
privileged access - read data/write data.

According to one preferred embodiment, the following memory access control violations will cause assertion of BERR* on line 126A:
(1) an unprivileged access to a privileged page;
(2) an execute access to a write accessible page;
(3) a write access to a non-write accessible page; and
(4) a read access to a non-read accessible page.

Moreover, the following local virtual access violations can also cause assertion of BERR, as above:
(1) a code access to the local virtual pages, except prom 118A;
(2) an unprivileged write access to the privileged control page;
(3) a user access to the supervisor control page;
(4) a write to prom 118A;
(5) an overrange during local memory access;
(6) a read to the sync selection page;
(7) a peripheral bus time-out error occurring during a peripheral bus access;
(8) a peripheral bus obey error occurring during a non-DMA peripheral bus access, except when bus obey is forced;
(9) a peripheral bus obey error occurring during a DMA cycle; and
(10) a CPU (112A) write during a DMA cycle.

In the illustrated embodiment, a peripheral bus select error will be generated under the following circumstances:
(1) a peripheral bus access to an empty or broken peripheral bus device adaptor slot in the adaptor chassis, except when peripheral bus select errors are disables;
(2) a peripheral bus DMA with either addressing bit 1 or data bit 7 asserted;
(3) a peripheral bus command with address bit 1 deasserted;
(4) a peripheral bus select when the peripheral bus is defined as locked;
(5) a peripheral bus access when the peripheral bus is turned off.

Local Memory Access

The illustrated controller 18 utilizes a 12 MHz Motorola 68010 processor 112A which executes instructions out of local memory 128 with no wait states, unless a memory refresh is demanded.

With regard to operation of the memory 128, a row strobe signal RRAS* is issued on every cycle of the local processor 112A. If the cycle is a local memory access, and (i) a refresh is not demanded, and (ii) a LOCAL VIRTUAL or an IACK cycle is not decoded, strobe signal RCAS* will be issued; otherwise, RRAS* ABORT will be issued, thereby terminating RRAS*.

Terminating RRAS* allows a free refresh to occur, so long as a refresh is requested after the signal AS* is asserted during a CPU bus cycle having 3 or more wait states. It is necessary to be able to perform a refresh while AS* is asserted so that during synchronization of partnered i/o controllers 18, 20, memory refresh times are not violated while the local CPU 112A is waiting, with AS* asserted, for the other board to catch up.

Most refresh cycles occur by demand, i.e., the refresh cycle begins before AS* is asserted, regardless of the type of the next cycle. If the next cycle is a local memory access, the refresh cycle will add 3 wait states; otherwise, no wait states will be added.

A signal RAS PRECHARGE* is clocked by the rising edge of RRAS* to prevent any reassertion of RRAS*. Assertion of RAS PRECHARGE* also prevents a refresh cycle from occurring before the RAM has had time to recover from a RAM access abort or a late negation of AS*.

Addresses to the RAMs are selected by a signal SELCOL*, which follows RRAS* by 15 nsec. Row addresses to the RAMs are the low order address bits of the CPU 112A and do not have a map translation delay. Some of the column addresses are part of the mapped address area and have map translation delay. The first processing section 18B employs a Motorola 74F521 to determine whether the local memory access being made is within the range of the local memory space. If not, the signal OVERRANGE is asserted.

A refresh cycle occurs synchronously with the 12 MHz clock signal. A refresh request is generated as a result of the falling edge of timer clock, which is synchronized to the rising edge of the 12 MHz CLK, every 15.25 microseconds.

Map Access

Access to map unit 120 occurs with no wait states. The map 120A, when used for address translation, is 4K long by 24 bits wide, including 16 physical address bits and eight control bits. Map entries reside on word or long word boundaries, with byte accesses being unallowable. Even addressed words store the 16 bits of translation information. The upper eight bits of the odd addressed word are the control bits, including read access, write access, privileged access, local memory, interlock, i/o, dma, and spare bit signals. The lower eight bits of the odd-address words are not use.

The map 120A virtual page access are privileged only/data only access; an unprivileged or code access will cause BERR* to be asserted. These pages are also write protected from the unprivileged access.

Timer

The timer 116A, including its associated jiffy counters, is synchronized with the 12 MHz clock signal. The timer has a period of 15.25 microseconds which is asserted for 1.3 microseconds and unasserted for 13.9 microseconds. Timer signals are re-synchronized to the 12 MHz CLK after the counters reach a selected value. A signal, TIMER STABLE*, is negated 1.3 microseconds before the rising edge of the timer clock signal, while being asserted 1.3 microseconds after that rising edge to prevent accessing the TIMER too close to its clock edge. The timer 116A addresses are stored within the supervisory control virtual page as noted above. The timer 116A may only be accessed at word boundaries. Such accesses add from 1 to 31 wait states to the CPU 112A bus cycle depending on the state of a signal TIMER* STABLE when the access is made. For the timer 116A to interrupt the processor 112A, the interrupt mask TIMER IMSK must be set to one. Upon servicing a TIMER INTERRUPT, TIMER IMSK must be set to zero to clear the condition, and then set to one to re-enable interrupts from the TIMER.

Interrupt Acknowledge

The processor 118A provides an interrupt acknowledge cycle, IACK, requiring no wait states. On any interrupt acknowledge, the lower three address bits on local address buses 92A, 92B indicate which level interrupt the process is servicing. These three bits are returned to the processor in an interrupt vector byte, with the high order bit of the byte as asserted. The interrupt levels are as follows.

| Interrupt Level | Device |
|---|---|
| LEVEL 7 | DEBUGGER |
| LEVEL 6 | TIMER |
| LEVEL 5 | SCANNER |
| LEVEL 4 | CMD PENDING |
| LEVEL 3 | PBUS TIME OUT or OBEY ERROR |
| LEVEL 2 | PBUS OBEY TOGGLE CLOCK |
| LEVEL 1 | SOFTWARE INTERRUPT |

Scanner

The illustrated scanner 78A runs as a parallel processor to the main board CPU. If enabled and set to run, it will scan the adaptors in the adaptor chassis in a software assignable order for interrupts and lack of alive status. The scanner takes advantage of the select mechanism of the adaptors by using an aborted select to retrieve adaptor status. This allows a 750 nanosecond scan cycle for each entry in the scan list.

A scanner table entry is one byte long, including four bits designating a peripheral slot number and four bits designating a subchannel number.

The software controlled scan list forces the scanner 78A to check only those slots which are occupied. The scanner may be utilized to compensate for different interrupt service requirements of different adaptors by including selected adaptor slots more than once in the scan list. The scan list consists of 256 entries. All entries must be contiguous, starting at the first entry. However, the entire scan list does not have to be filled. A "return to zero" entry is employed by the scanner 78A to scan the active terminators in the adaptor chassis. An interrupt from such a scan to the terminator indicates a bulk power supply failure, fan failure, power synchronization failure, or a terminator failure.

The scanner 78A, upon finding a slot with the interrupt bit set or the alive bit cleared, will stop at that entry and interrupt the processor 112A. When reading back the scanner interrupt status word, the processor 112A reads the adaptor status in one byte and the contents of the scan list entry in the other. The scanner interrupt status is not read unless there is an interrupt or the scanner is not set to run.

The scanner 78A runs when it is enabled and there are no processor 112A pending on the peripheral bus 30. The processor 112A cycles have priority; accordingly, the scanner 74A will stop while during those cycles and restart only after the first idle cycle during which the processor 112A does not access the bus. The scanner 78A stops completely when an adaptor is selected for DMA and restarts when DMA enable is cleared.

Flash Circuitry

Figure 3:
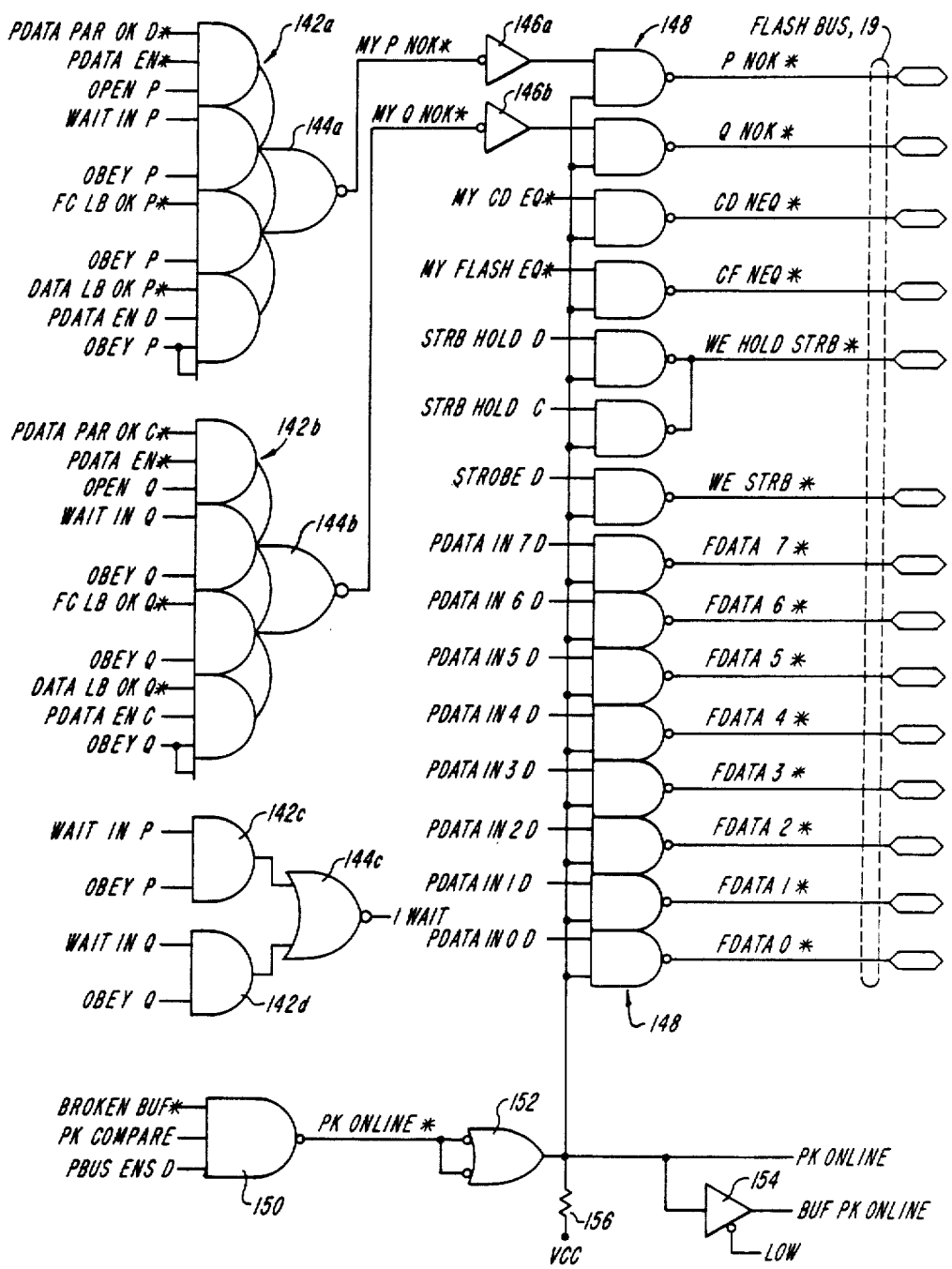
FIG. 3 illustrates a flash circuitry element constructed in accord with a preferred practice of the invention.

FIG. 3 depicts a preferred construction for the flash circuitry of an i/o controller 18. The circuitry includes AND gates 142A, 142B, 142C, 142D, NOR gates 144A, 144B, 144C, inverters 146A, 146B, NAND gates 148, NAND gate 150, OR gate 152, and buffer 154. The flash circuitry provides, as output from NAND gates 148, controller operational state signals which are OR'ed onto the open collector flash bus 19.

The AND gates 142A accepts the following input signals:

| Signal | Description |
|---|---|
| PDATA PAR OK D* | validity of data signal parity at transceiver 66A |
| PDATA EN* | i/o controller enabled to drive data onto the peripheral bus 30 |
| OBEY P | i/o controller enabled to send/receive on the P bus 30A |
| WHAT IN P | i/o controller receiving WAIT signal on the P bus 30A |
| FC LB OK P* | function code loopback comparator 74A output |
| DATA LB OK P* | data loopback comparator 76A output |
| PDATA EN D | i/o controller drive side 18B enabled to drive data onto peripheral bus 30 |

Logical AND's of the above signals are generated by AND gates 142A in the manner indicated in the illustration. Outputs of the array 142a are passed to NOR gate 144a to produce a binary signal, MY P NOK*, representative of the validity of information transfer signals received from the P bus 30A. In particular, MY P NOK* has an assertive state indicating that signals received from the P bus by the i/o controller, e.g., controller 18, contain errors. While, MY P NOK* has a non-assertive state indicating that no obvious fault has occurred in the signals received from the P bus. The signal MY P NOK* is routed through inverter 146a.

In a similar manner, the AND gates 142b and NOR gate 144b produce a binary signal, MY Q NOK*, representative of the validity of information transfer signals received from the Q bus 30B. The signal MY Q NOK* is routed through inverter 146b.

The AND gates 142C, 142D and NOR GATE 144C are arranged to generate an I WAIT signal, having an assertive state indicating that the controller is to delay generation of the strobe signal.

The NAND gate 150 is arranged to generate a binary signal, PK ONLINE*, as a boolean NAND of the following input signals:

| Signal | Description |
| --- | --- |
| BROKEN BUF* | |
| PK COMARE | |
| PBUS ENS D | |

The PK ONLINE* signal, which has an assertive state indicating that the associated i/o controller is on-line, is negated by negated-input OR gate 152, as shown. The resulting signal PK ONLINE is tied through resistor 156 to potential +VCC and, further, is coupled to an input of each of the NAND gates in array 148. The output of gate 152 is also retained in buffer 154 to provide the buffered signal BUF PK ONLINE.

With further reference to FIG. 3, outputs of each of inverters 146a and 146b, as well as each of the signals listed below, is provided as a second input to individual NAND gates in array 148.

| Signal | Description |
| --- | --- |
| MY CD EQ* | output of comparator 100 |
| MY FLASH EQ* | output of comparator 104 |
| STRB HOLD D | drive side of i/o controller delaying strobe signal generation |
| STRB HOLD C | check side of i/o controller delaying strobe signal generation |
| STROBE D | drive side regenerate of strobe |
| STROBE C | check side regenerate of strobe |

The output of the NAND gates of array 148 are passed to the open collector conductors of flash bus 19 as shown in the illustration.

Strobe Signal Generation

Figure 4:
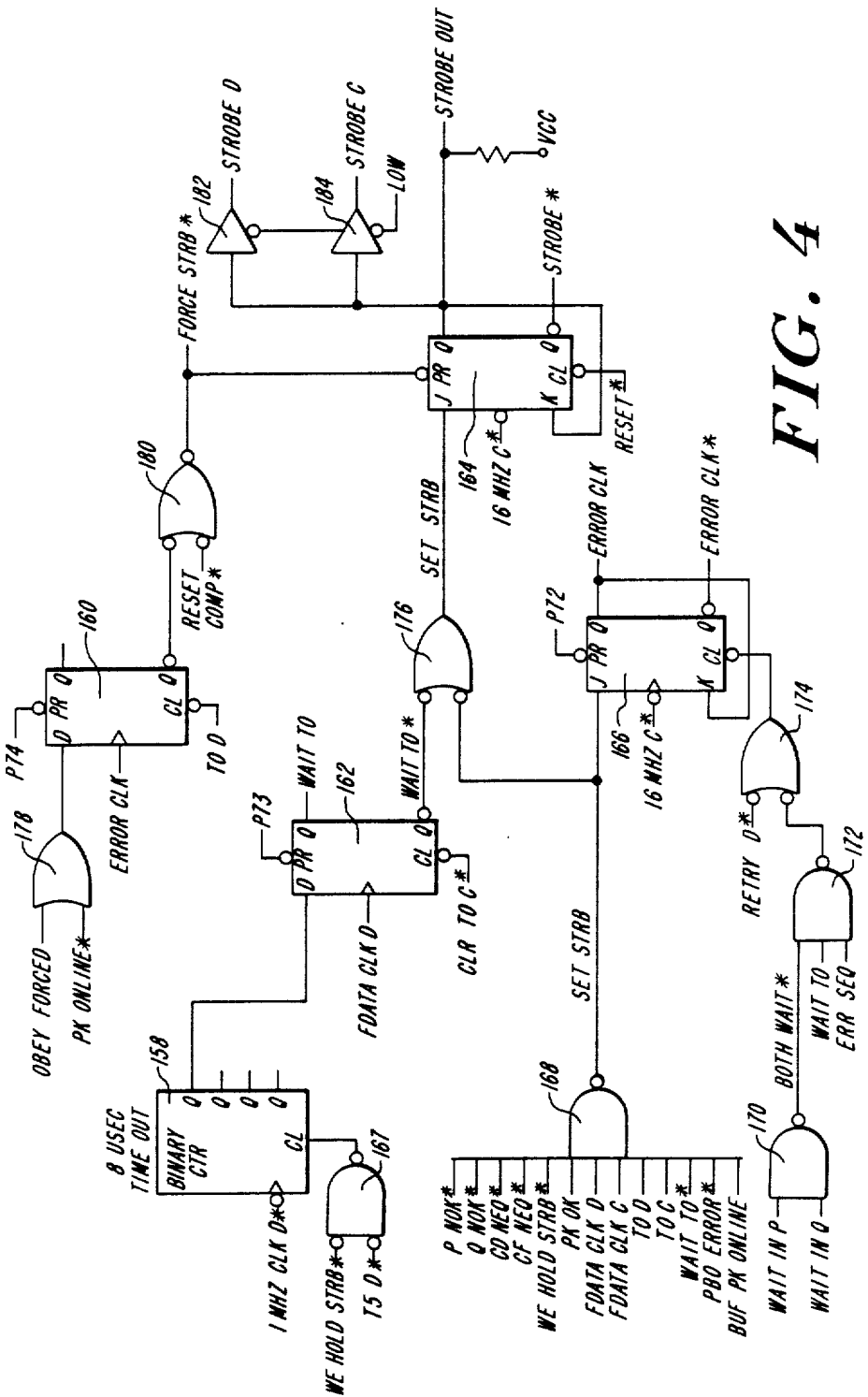
FIG. 4 illustrates a preferred configuration of circuitry used to generate pre-strobe signals.

FIG. 4 depicts one preferred configuration of circuitry used to generate pre-STROBE signals in i/o controller 18, 20. The illustrated circuitry includes counter 158, flip-flops 160, 162, 164, 166, NAND gates 167, 168, 170, 172, OR gates 174, 176, 178, NOR gate 180, and buffers 182, 184.

The counter 158 is driven by a 1 MHz clock signal provided in the drive side of the i/o controller. A clear input to the counter 158 is provided by the output of NAND gate 167, having at its negated inputs, a WE HOLD STROBE* signals and a timing signal, designated T5 D*. The fourth output bit of the timer 158 is coupled to "D" input of flip-flop 162, as shown.

The flip-flop 162 is arranged for generating a WAIT TO signal, reflecting that a time out is required in order to permit error checking. As shown in the illustrated embodiment a delay of eight microseconds, resulting from assertion by one or more peripherals of a WAIT signal on the peripheral bus, causes the aforementioned time out. The negated output of flip-floP 162 is routed to provide an input to OR gate 176.

A second input to OR gate 176 is provided by the SET STROBE output of NAND gate 168. Inputs to gate 168 include PNOK*, QNOK, CDNEQ*, WE HOLD STRB*, PK OK, FDATA CLK D (an output of the drive side flash data clock), FDATA CLK C (an output of the check side flash data clock), T0 D (the drive side primary timing signal for the peripheral bus transfer cycle), T0 C (the corresponding signal generated on the check side), WAIT TO*, PBO error (indicating a bus obey error), and BUF PK ONLINE.

The SET STRB* output of NAND gate 168 is also provided as the "j" input to flip-flop 166. A clear input to that flip-flop is provided as an output of the gates 170, 172, and 174, as shown in the illustration. The flip-flop 166 provides as output the ERROR CLK and ERROR CLK* signals, which provide timing signals for the error sequence initiated by the i/o processor during the time out.

As shown at the top of FIG. 4, a FORCE STRB* signal is generated by the combined actions of flip-flop 160 and NOR gate 180. This FORCE STRB* serves as a preset to flip-flop 164, which serves to generate a STROBE OUT signal at its "Q" output. The clear input to that flip-flop is provided by a STROBE CLR* signal. A 16 MHz clock signals generated by the check side drives the flip-flop 164.

As further shown in the illustration, the STROBE OUT output of flip-flop 164 is retained in buffers 182 and 184, providing STROBE D and STROBE C signals, respectively.

Figure 5A:
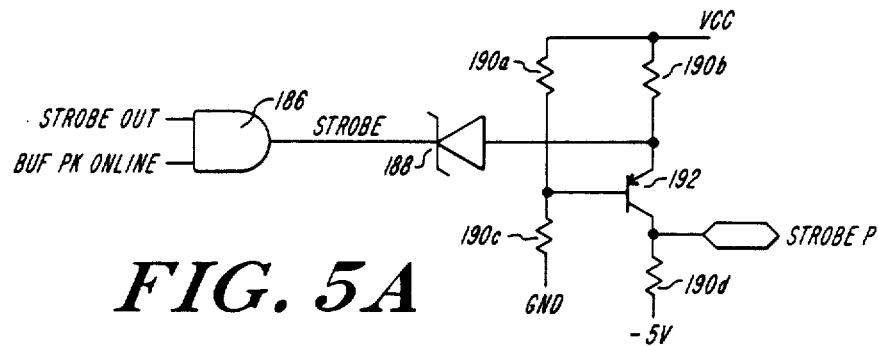
FIGS. 5A and 5B illustrate preferred circuitry for generating strobe signals.

FIG. 5A depicts a preferred circuit for generating a STROBE P signal for transmission along P bus 30A. The circuit includes a AND gate, having as its inputs the STROBE OUT signal (see FIG. 4) and a BUF PK ONLINE signal (see FIG. 3). The output of the AND gate 186 is output to the STROBE P pin of the bus 30A via diode 188, resistors 190a, 190b, 190c, 190d, and transistor 192, as shown.

Figure 5B:
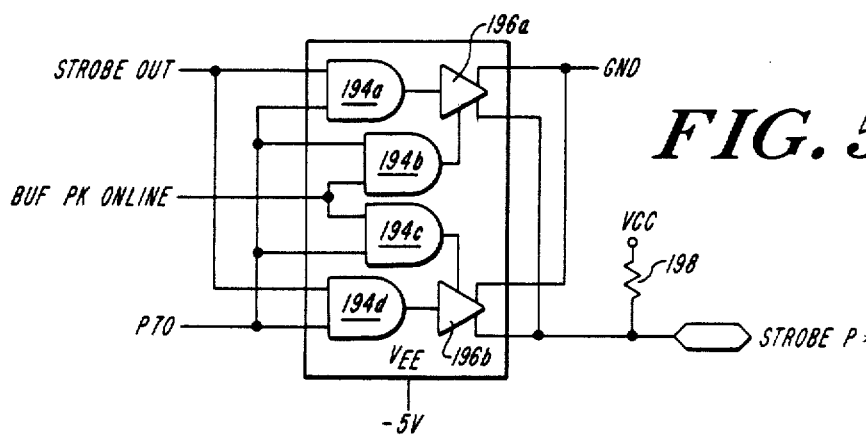

FIG. 5B depicts a preferred circuit for generating a STROBE P* signal for output along P bus 30A. The circuit includes an AND gate array 194a, 194b, 194c, 194d, and inverters 196a, 196b implemented in combination with resistor 198 as shown in the illustration.

Figure 6A:
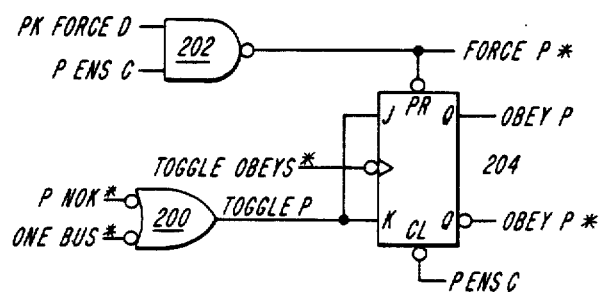
FIGS. 6A and 6B illustrate preferred circuitry for generating bus obey signals.

FIG. 6A depicts one preferred configuration of circuitry utilized in i/o controller 18, 20 for generating an OBEY P signal, conditioning the controller is to respond only to those peripheral bus signals received on the first i/o bus 30A. The illustrated circuitry includes OR gate 200, NAND gate 202, and flip-flop 204.

The OR gate 200 Produces a TOGGLE P signal representative of a boolean logic OR of the P NOK* signal and the ONE BUS* signal (indicating that the i/o controller is currently conditioned to receive signals on only one of the i/o buses 30A, 30B). The TOGGLE P signal is routed to provide the "j" and "k" inputs to flip-flop 204.

The negated preset signal for flip-flop 204 is provided by the FORCE P* signal output of NAND gate 202. The FORCE P* signal results from the boolean NAND function of the PK FORCE D signal (indicating that the i/o controller is conditioned to respond on the drive side) and the P ENS D signal (indicating that the P bus is enabled).

Figure 7:
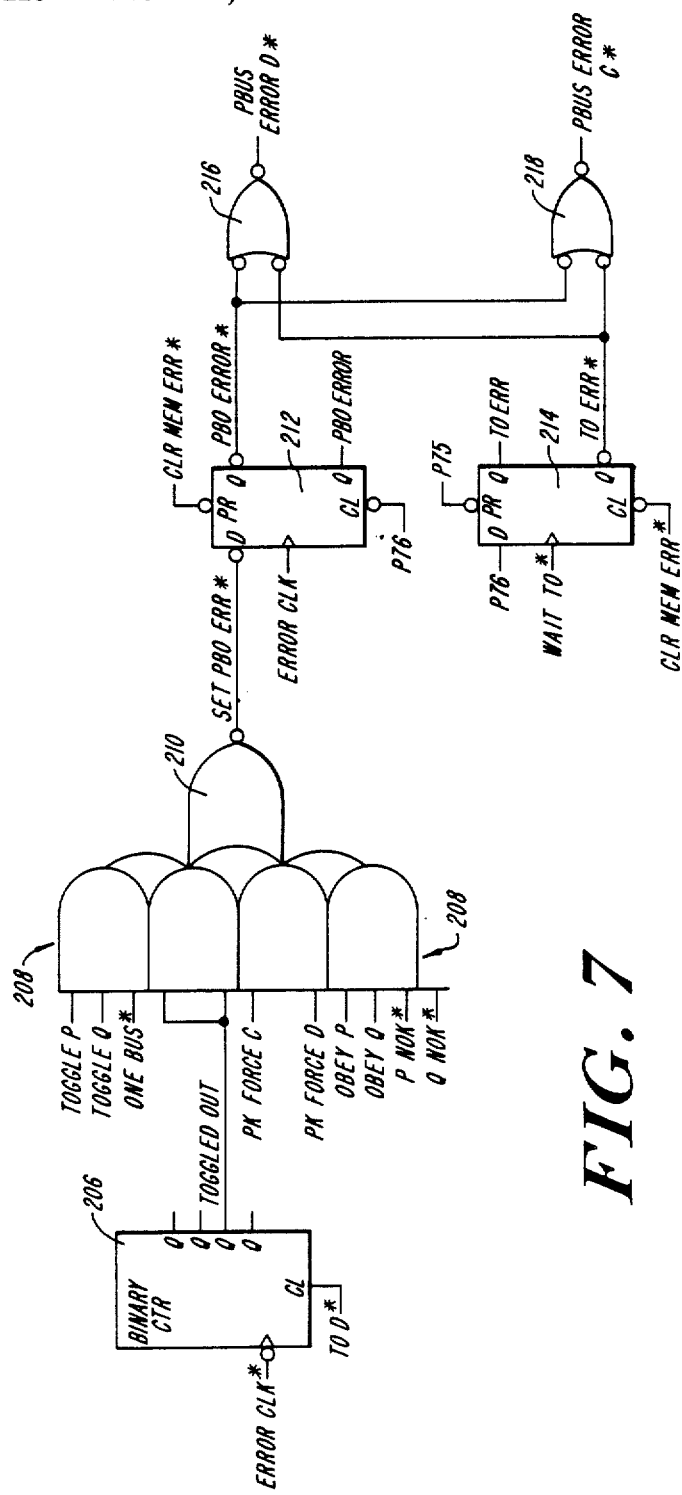
FIG. 7 illustrates one preferred circuitry for generating bus and time-out error signals.

A clock input to flip-flop 204 is provided by a TOGGLE OBEYS* signal, resulting from a boolean NAND of the ERROR CLK signal (see FIG. 4) and a PBO ERROR* signal (see FIG. 7).

The flip-flop 204 provides the aforementioned OBEY P signal at its "q" output, while providing the inverse signal, OBEY P*, as the negated output.

Figure 6B:
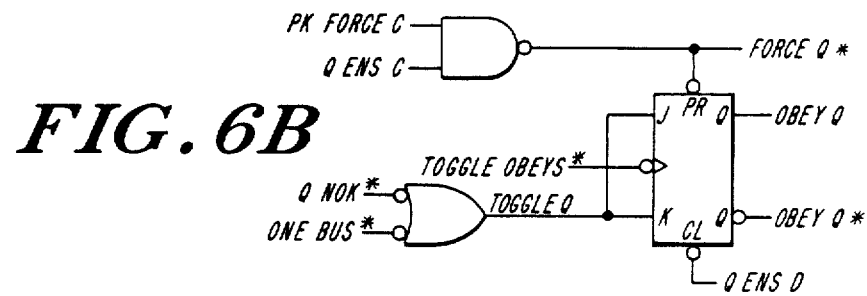

FIG. 6B depicts one preferred configuration of circuitry utilized in i/o controller 18, 20 for generating an OBEY Q signal, conditioning the controller is to respond only to those peripheral bus signals received on the second i/o bus 30B. The circuit is constructed similarly to that shown above in FIG. 6A.

FIG. 7 depicts one preferred configuration of circuitry utilized in i/o controller 18, 20 for generating bus and time-out error signals. The circuitry includes counter 206, AND gate array 208, NOR gate 210, flip-flops 212, 214, and NOR gates 216, 218.

As shown at the left of the illustration, the clear input of the counter is provided by the T0 D*, the inverse of the drive side 18B T0 clock signal. A clock input to the counter 206 is provided by the ERROR CLK* signal (see FIG. 4). The second output bit of counter 206 drives a TOGGLED OUT signal, which serves as an input to AND gate array 208. The AND gate array 208 also accepts as input TOGGLE P (FIG. 6A), TOGGLE Q (FIG. 6B), ONE BUS* (the inverse of a boolean exclusive OR of the OBEY P and OBEY Q signals), PK FORCE D, PK FORCE D, OBEY P (FIG. 6A), OBEY Q (FIG. 6B), P NOK*, and Q NOK* signals.

Output of AND gate array 208 is routed to NOR gate 210, as shown in the illustration. This gate produces a SET PBO ERR* signal, which provides an input to NOR gate 211. As illustrated, a second input to gate 211 is provided by the non-inverting output of flip-flop 212. The output of NOR gate 211 drives the "D" input of flip flop 212, as shown. In operation, once PBO ERROR* is set, it is held by the NOR gate 211 until cleared by the CLR MEM ERR* signal. The clock input for that flip-flop is provided by the ERROR CLK signal, while the preset is driven by the CLR MEM ERR* signal (indicating that the error signal is to be cleared). At its non-inverting output, the flip-flop 212 drives a PBO ERROR signal, indicating that a peripheral bus error has occurred.

As further shown in FIG. 7, the flip-flop 214 has a clock input which is driven by the WAIT TO* signal (FIG. 4), and a clear input driven by the CLR MEM ERR* signal. At its inverting output, the flip-flop 214 drives a TO ERR* signal, indicating that a time-out error has occurred.

The PBO ERROR* and TO ERR* signal are routed to inverting inputs of NOR gates 216 and 218, as shown. Output of these gates provide PBUS ERROR D* and PBUS ERROR C* signals, indicating a peripheral bus error has been detected in each of the drive and check sections of the i/o controller.

Figure 8:
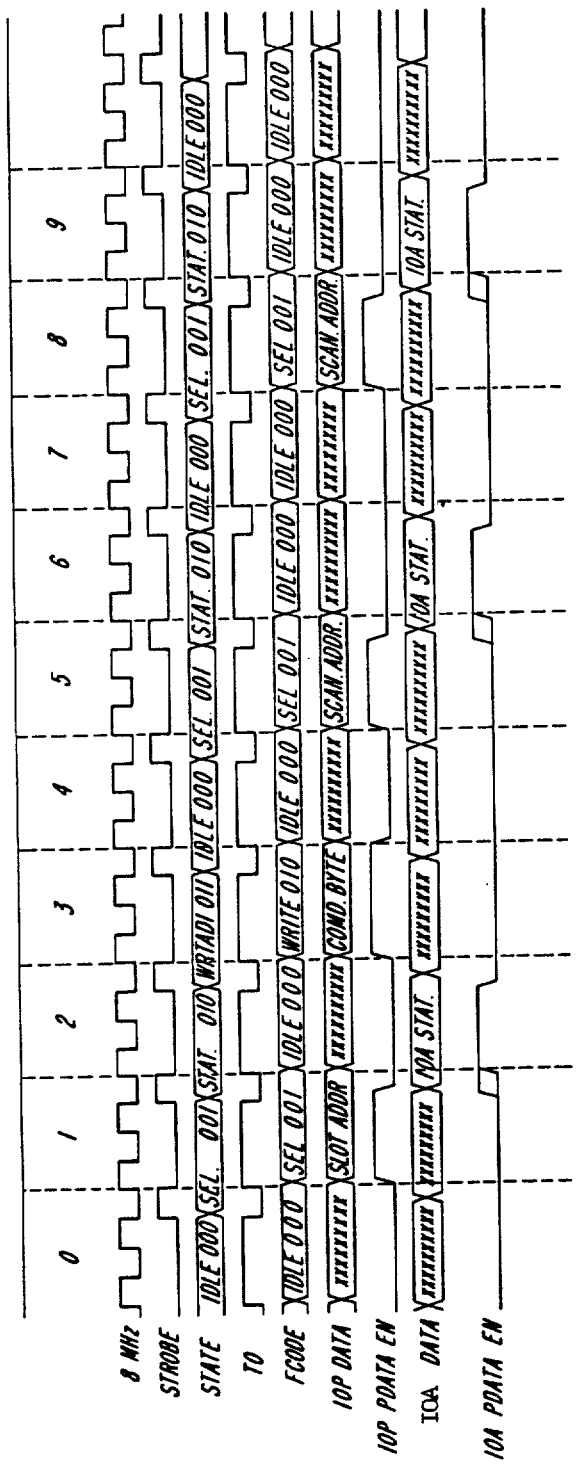
FIG. 8 illustrates a timing sequence for preferred command and scanner cycles.

FIG. 8 depicts a timing sequence for two information transfer cycle types—a command cycle and a scanner cycle—executed by an i/o controller acting according to a preferred embodiment of the invention. During a scanner cycle, the i/o controller, under control of its scanner units (FIG. 2, elements 124A, 124B), interrogates peripheral units and their respective interfaces, i.e., gate arrays and peripheral adaptors, to determine the operational state thereof. In a command cycle, on the other hand, the i/o controller sends a one-byte command to a selected peripheral device.

Referring to FIG. 8, wave forms transmitted on the strobe conductors of each of the first and second i/o buses, i.e., the STROBE signal, are shown on wave form line 220. Falling edges of the STROBE signal define information transfer timing intervals, as shown by consecutively numbered time intervals at the top of the illustration. Line 222 represents the content of signals transferred on the function code conductors of each of the first and second i/o buses, while line 224 represents the content of signals transferred on the data conductors of those buses.

As indicated by line 222 in Timing Interval 0, the system is in an idle state, with an IDLE function code being asserted on the i/o bus function code conductors. Concurrently, as shown by line 224, all one's are asserted on the data conductors.

In Timing Interval 1, the i/o controller commences a command cycle. Particularly, the SELECT function code is asserted on the function code conductors—see line 222—while a peripheral selection addressing byte is transmitted on the data conductors—see line 224. This peripheral selection addressing byte can include, as in the preferred embodiment, four SLOT ID bits and four "subchannel" bits. Gate arrays (FIG. 1, elements 32, 34 . . . 42) can be conditioned to respond to selected channel/subchannel bit patterns to determine whether the command cycle is directed to the gate array, its associated adaptor, and/or its associated peripheral device.

In Timing Interval 2, the i/o controller asserts IDLE on the function code conductors of the i/o buses while monitoring the data conductors of those buses to receive a response from the addressed peripheral device or interface In absence of fault, the i/o controller will expect to receive an ALIVE signal—e.g., an asserted seventh bit in an otherwise non-asserted transmission byte—on the data conductors, indicating that the addressed peripheral is operational. The addressed peripheral and interface can also respond, during the Timing Interval 2, with a signal indicating that an interrupt is pending, or with signals indicating which i/o buses are being obeyed. Absent error, the command cycle continues in Timing Interval 3 with the transmission of a peripheral/interface command signal. In one embodiment, that signal can represent one of six commands and have the following format:

| Command | Bit Pattern* |
| --- | --- |
| Reset | "100XX000" |
| Clear Interrupt | "100XX001" |
| Toggle Obey P* | "100XX010" |
| Toggle Obey Q* | "100XX011" |
| Clear Broken | "100XX100" |
| Set Broken | "100XX101" |
| Set Interrupt | "100XX110" |
| CLR CPU Reset | "100XX111" |

*the designation "X" represents an unused bit

*—the designation "X" represents an unused bit

Following transmission of the peripheral/adaptor command signal, the illustrated system re-enters the idle state, with the transmission of an IDLE signal on the function code conductors of the i/o buses; see Timing Interval 4.

With further reference to FIG. 4, Timing Intervals 5–6, and 7–8 illustrate the execution of two scanner cycles. More particularly, as shown in Timing Interval 5, the i/o controller 18 initiates a scanner cycle by transmission, on the function code conductors of the i/o buses, a SELECT signal e.g., having a unique bit pattern "001"). Concurrently, the i/o controller transmits on the data conductors a peripheral selection addressing byte directed to the peripheral/adaptor being polled.

In the subsequent interval, i.e., Timing Interval 6, the i/o controller transmits an IDLE signal on the function code conductors, while monitoring the data conductors for a peripheral/adaptor response. According to one preferred embodiment, a response signal constitutes a one byte transmission having the following format:

| Bit | Content |
|---|---|
| 07 | ALIVE-peripheral is operation or "alive" |
| 06 | INTERRUPT-periperal/interface signalling an interrupt |
| 05 | Obey p*-interface not receiving signals on the P bus |
| 06 | Obey Q*-interface not receiving signals on the Q bus |
| 03-10 | interrupt code |

As indicated by line 222, the i/o controller enters the idle state in Timing Interval 7, following receipt of the peripheral/interface response.

A further scanner cycle is shown in timing intervals 8-9, proceeding in the same manner as the cycle discussed above.

Figure 9:
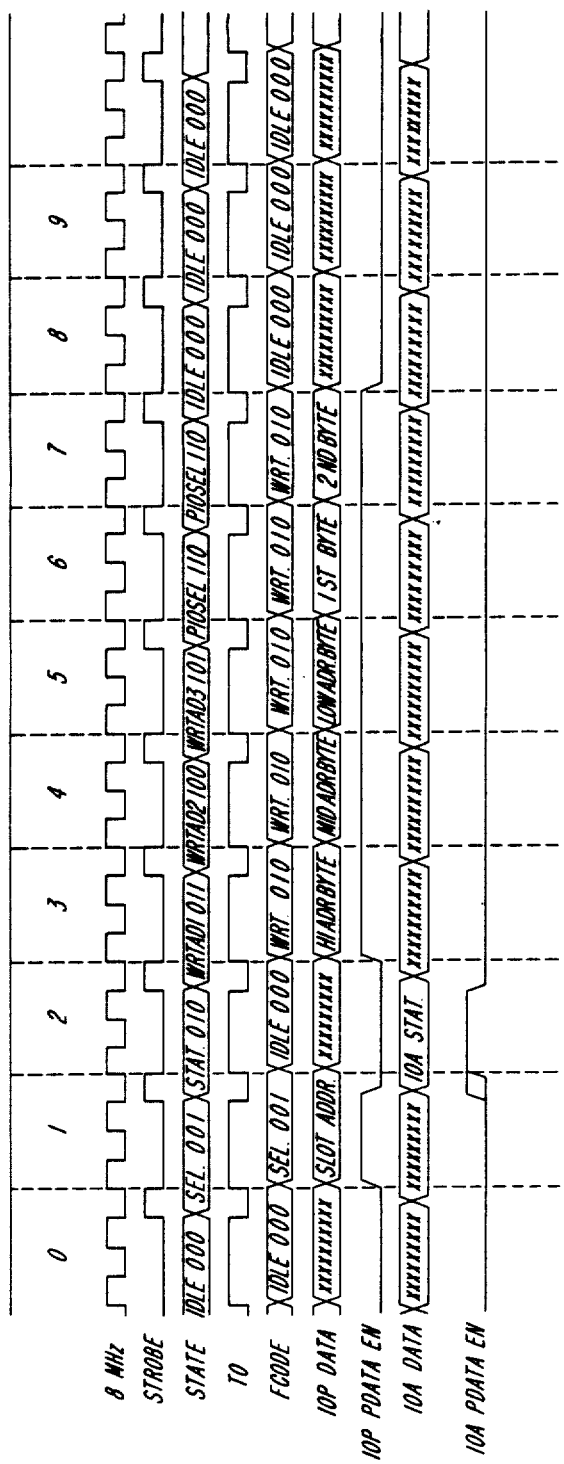
FIG. 9 depicts a timing sequence for a preferred peripheral i/o write cycle.

FIG. 9 depicts a timing sequence for a peripheral i/o (PIO) write cycle. As noted above, this information transfer cycle provides a mechanism through which the i/o controller can transfer a data word to an attached peripheral device.

As above, the timing sequence for the PIO write cycle is shown by way of a strobe line 226, a function code phase line 228, and a data phase line 230. Moreover, the falling edges of the strobe line 226—representing the STROBE signal—define the PIO write cycles timing intervals Numbering for these intervals is given at the top of the illustration.

In accord with function code phase line, the i/o controller is in its idle state in time interval 0. At time interval 1, the controller commences the PIO write cycle. Particularly, during that timing interval, the controller transmits a SELECT signal, accompanied by a peripheral selection address byte, on the function code and data conductors of the i/o buses; see function code phase line 228, data phase line 230. As above, the controller awaits a response from the addressed unit in time interval 2.

Assuming no error or interrupt signal is received during the response interval, the i/o controller transmits the data write address the next three timing intervals particularly, during time interval 3, the controller asserts a WRITE signal on the function code conductors, while asserting the high-order byte of the write address on the data conductors. During time interval 4, the controller continues assertion of the WRITE signal, while asserting the middle-order byte of the write address on the data conductors. Further, during time interval 5, the controller transmits the low-order byte of the write address on the data conducts, while continuing assertion of the WRITE signal on the function code conductor.

As shown by function code phase line 228, the i/o controller sends write data on the peripheral bus subsequent to transmission of the write data address. Specifically, the controller transmits the high-order byte of write data on the data conductors during time interval 6 and transmits the low-order byte of write data on the data conductors during time interval 7. The controller maintains assertion of the WRITE signal of the function code controllers during these intervals.

Subsequent to transmission of the write data, the i/o controller re-enters the idle state, with transmission of the IDLE signal of the function code conductors; see function code phase line 228.

Figure 10:
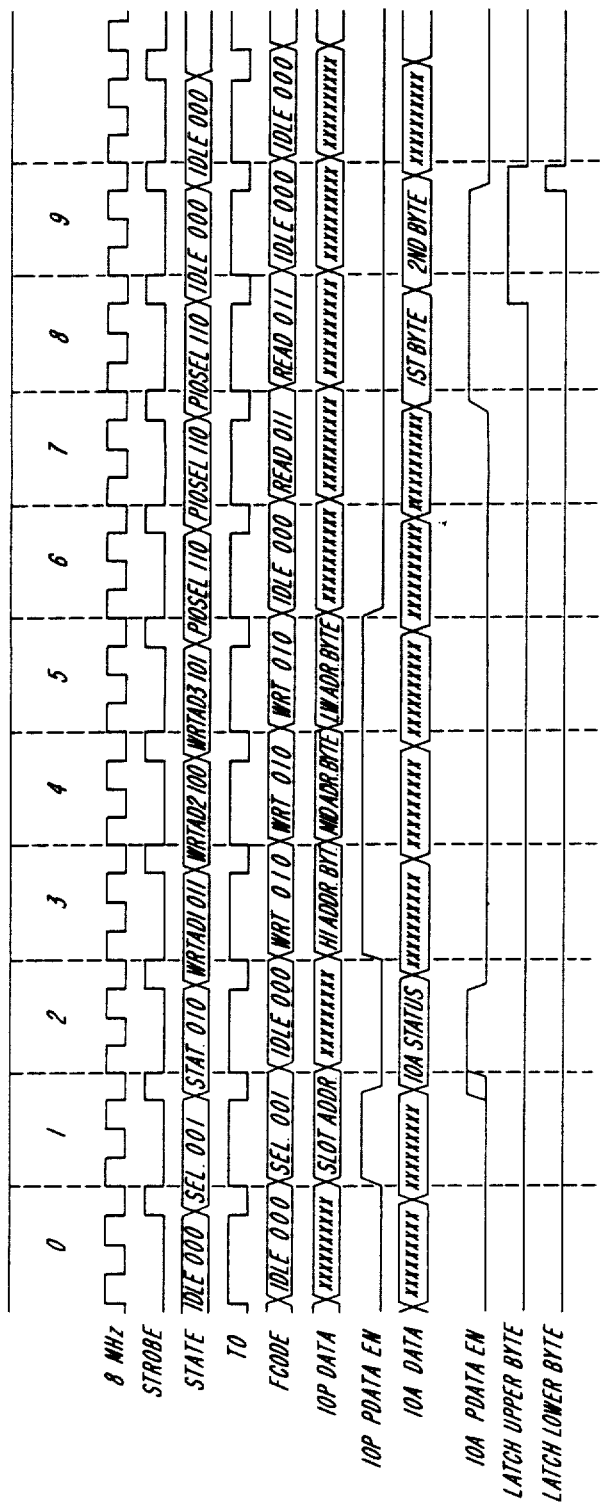
FIG. 10 depicts a timing sequence for a preferred peripheral i/o read cycle.

FIG. 10 depicts a timing sequence for a peripheral i/o (PIO) read cycle. This information transfer cycle provides a mechanism through which the i/o controller 18 requests the transfer of a read data word from an attached peripheral device. As above, timing for the cycle is indicated through strobe line 232, function code phase line 234, and data phase line 236. Timing intervals, defined by the falling edge of the strobe line 232, are shown across the top of the illustration.

The i/o controller 18 initiates a PIO read cycle in a manner similar to that of the PIO write cycle, to wit, the controller selects a peripheral unit and transmits three bytes of address information. In this instance, however, that address information indicates the location from which data is to be read). See function code and data phase lines 234, 238.

Following transmission of the read data address information, the controller 18 asserts IDLE on the function code conductors. This signals the addressed unit that a read cycle—as opposed to a write cycle—has commenced. The unit accordingly reads the addressed data locations and begins data transmission. More particularly, in Time Interval 7, the addressed unit sends a first byte of read data, while in Time Interval 8, the unit sends the remaining byte of data.

Apart from the first data byte, the i/o controller signals the addressed unit to continue read data transmission through successive assertions of the READ signal on the function code conductors. Thus, for example, the controller asserts the READ signal during Time Interval 7 in order to effect the transmission of a byte of read data in Time Interval 8. The controller's assertion of IDLE, e.g., during Time Interval 9, effects completion of the cycle. That is, no further data is transmitted by the addressed unit subsequent to assertion of the IDLE signal.

Peripheral Bus Selection and Control Logic

As noted above, the i/o controller 18 and, more particularly, processor 112A is arranged for two types of data access son the peripheral bus: direct memory access (DMA) and programmed i/o access (PIO). The PIO access moves only a single word on the bus 30, treating the peripherals as bank selected memory. The DMA, on the other hand, is designed for moving a continuous stream of bytes to a selected peripheral. In executing a DMA access, the controller 18 utilizes hardware assist which permits the processor 112A to move each read or write word of data in a single cycle. This hardware also calculates a checksum for every transferred word, in addition to permitting data verification (a verify cycle) for data written to the peripherals.

Peripheral Bus Timing

Figure 11:
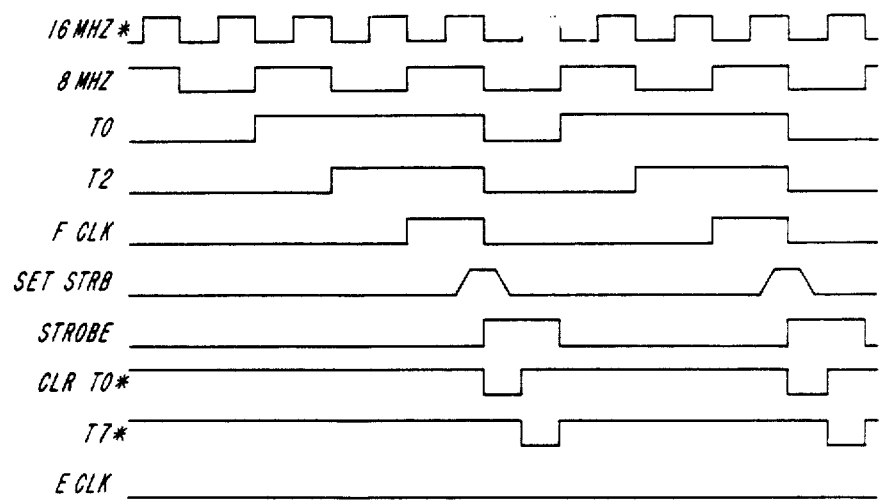
FIG. 11 illustrates a timing sequence for two normal peripheral bus interface cycles.

The peripheral bus timing, as shown in FIG. 11, is based on the falling edge of the 16 MHz* system backplane clock, provided along line 22C by a clock element (not shown). To maintain a substantially synchronous relationship between the 12 MHz processor 112A and the peripheral bus timing, controller 18 cycles only start on the leading edge of the interval 8 MHz clock.

The first 8 MHz edge after cycle commencement clocks T0. The next falling edge of 16 MHz* clocks interval T2, which would clock out data onto the peripheral bus during a write. The next falling edge of 16 MHz* clocks FDATA CLK, capturing data signals from the peripheral bus. The next rising edge of 16 MHz* clocks interval T5.

Figure 12:
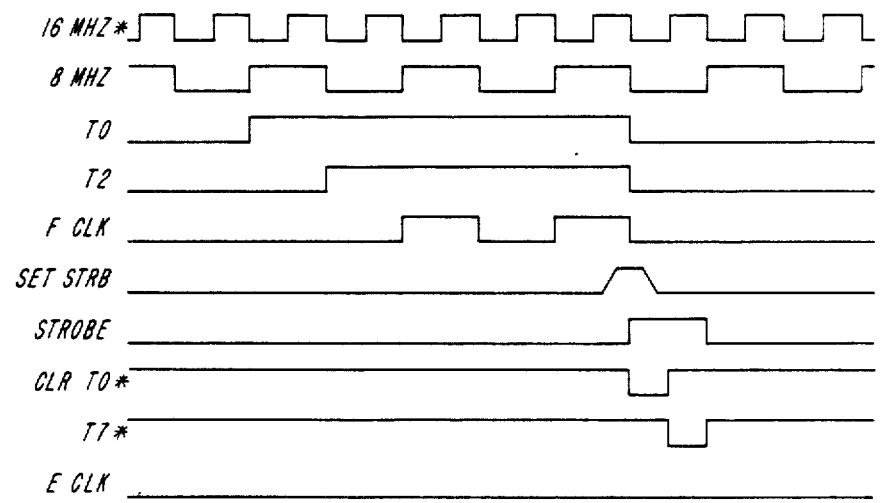
FIG. 12 illustrates a timing sequence for a peripheral bus interface cycle including two peripheral-bus/flash-bus comparisons.

If the proper conditions are met as a result of comparisons of the captured data, the signal SET STROBE* is asserted, and the next falling edge of the 16 MHz* clock signal will cause STROBE. If SET STROBE* is not asserted, as shown in FIG. 12, then that edge will only clear FDATA CLK. The next falling edge of 16 MHz* signal will clock FDATA CLK again, which will clock RETRY if the PBUS is not waiting.

The new data is then run through the comparisons and if SET STROBE* is asserted, STROBE will occur on the next falling edge of the 16 MHz* clock signal. If SET STROBE* is not asserted, then ERROR CLK will occur on the next falling edge of the 16 MHz* clock signal.

If STROBE does occur, then CLR T0 will be asserted until T7 at the next rising edge of the 16 MHz* clock signal. The deassertion of T0 clears T2 and T5. STROBE deasserting on the next falling edge of 16 MHz* clears T7. T0 can be reasserted by this same edge, starting a new cycle.

Peripheral Bus Accesses

Processor 112A accesses to the peripheral bus are initiated by the signal S4 SYNC which is the result of the first 8 MHz clock signal edge following S4 SYNC. S4 SYNC will be taken on the next STROBE into the peripheral bus interface select path and the cycle will begin.

A PIO cycle (address C00000x-FFFFFFx) is initiated as follows. In the list, the designation "^" indicates assertion of the corresponding signal

| STATE | → | SELECT (0-0-1) on STROBE^ (If previous state was IDLE) |
|---|---|---|
| FCODE | → | SELECT (0-0-1) on T0^ |
| DATA SOURCE | → | PIO SLOT ADDR (1-0-0) on T0^ |
| PDATA EN | → | ASSERTED on T0^ |
| STATE | → | STATUS (0-1-0) on STROBE^ |
| FCODE | → | IDLE (0-0-0) on T0^ |
| DATA SOURCE | → | XXX on T0^ |
| PDATA EN | → | DE-ASSERTED on T0^ |
| STATE | → | WRAD1 (0-1-1) on STROBE^ |
| FCODE | → | WRITE (0-1-0) on T0^ |
| DATA SOURCE | → | PIO ADR BYTE 1 (1-0-1) on T0^ |
| PDATA EN | → | ASSERTED on T0^ |
| STATE | → | WRADR2 (1-0-0) on STROBE^ |
| FCODE | → | WRITE (0-1-0) on T0^ |
| DATA SOURCE | → | PIO ADR BYTE (1-1-0) on T0^ |
| PDATA EN | → | ASSERTED |
| STATE | → | WRADR3 (1-0-1) on STROBE^ |
| FCODE | → | WRITE (0-1-0) on T0^ |
| DATA SOURCE | → | PIO ADR BYTE 3 (1-1-1) on T0^ |
| PDATA EN | → | ASSERTED |
| STATE | → | SELECT OK for PIO (1-1-0) on STROBE^ |

A PIO WRITE cycle proceeds from initiation as follows:

| FCODE | → | WRITE (0-1-0) on T0^ |
|---|---|---|
| DATA SOURCE | → | UPPER DATA BYTE 1 (0-1-0) on T0^ (if UDS asserted) |
| PDATA EN | → | ASSERTED |
| STATE | → | SELECT OK for PIO (1-1-0) on STROBE^ |
| FCODE | → | WRITE (0-1-0) on T0^ |
| DATA SOURCE | → | LOWER DATA BYTE 1 (0-1-1) on T0^ (if LDS asserted) |
| PDATA EN | → | ASSERTED |
| STATE | → | IDLE (0-0-0) on STROBE^ |
| FCODE | → | IDLE (0-0-0) on T0^ |
| DATA SOURCE | → | ALL ASSERTED (0-0-0) on T0^ |
| PDATA EN | → | DE-ASSERTED on T0^ |
| STATE | → | IDLE (0-0-0) or SELECT (0-0-1) on STROBE^ |

A PIO READ cycle proceeds from initiation as follows:

| FCODE | → | IDLE (0-0-0) on T0^ |
|---|---|---|
| DATA SOURCE | → | UPPER DATA BYTE 1 (0-1-0) on T0^ (if UDS asserted) |
| PDATA EN | → | DE-ASSERTED |
| STATE | → | SELECT OK for PIO (1-1-0) on STROBE^ |
| FCODE | → | READ (0-1-1) on T0^ |
| DATA SOURCE | → | UPPER DATA BYTE 1 (0-1-0) on T0^ |
| PDATA EN | → | DE-ASSERTED |
| STATE | → | SELECT OK for PIO (1-1-0) on STROBE^ |
| FCODE | → | READ (0-1-1) on T0^ |
| DATA SOURCE | → | UPPER DATA BYTE 1 (0-1-0) on T0^ (if UDS asserted) |
| PDATA EN | → | DE-ASSERTED |
| STATE | → | IDLE (0-0-0) on STROBE^ (first data byte latched) |
| FCODE | → | IDLE (0-0-0) on T0^ |
| DATA SOURCE | → | LOWER DATA BYTE (0-1-1) on T0^ (if LDS asserted) |
| PDATA EN | → | DE-ASSERTED |
| STATE | → | IDLE (0-0-0) on STROBE^ (second data byte latched) |
| FCODE | → | IDLE (0-0-0) on T0^ |
| DATA SOURCE | → | ALL ASSERTED (0-0-0) on T0^ |
| PDATA EN | → | DE-ASSERTED |
| STATE | → | IDLE (0-0-0) or SELECT (0-0-1) on STROBE^ |

If processor makes a word access (with the upper data select signal, UDS, and the lower data select signal, LDS, asserted), then the control logic will access two consecutive bytes from the peripheral bus 30 during the one select. If the processor makes a long word operation, which is actually two word operations, then the control logic will make two peripheral bus selects, each time moving two bytes prior to de-selecting.

If the processor 112A makes a long word write to address BF9004x, BF9008x, or BF900Cx, then the cycle will be a DMA SELECT as follows:

| STATE | → | SELECT (0-0-1) on STROBE^ (If previous state was IDLE) |
|---|---|---|
| FCODE | → | SELECT (0-0-1) on T0^ |
| DATA SOURCE | → | UPPER DATA BYTE (0-1-0) on T0^ |
| PDATA EN | → | ASSERTED on T0^ |
| STATE | → | STATUS (0-1-0) on STROBE^ |
| FCODE | → | IDLE (0-0-0) on T0^ |
| DATA SOURCE | → | XXX on T0^ |
| PDATA EN | → | DE-ASSERTED on T0^ |
| STATE | → | WRADR1 (0-1-1) on STROBE^ |
| FCODE | → | WRITE (0-1-0) on T0^ |
| DATA SOURCE | → | LOWER DATA BYTE (0-1-1) on T0^ |
| PDATA EN | → | ASSERTED on T0^ |
| STATE | → | WRADR2 (1-0-0) on STROBE^ |
| FCODE | → | WRITE (0-1-0) on T0^ |
| DATA SOURCE | → | UPPER DATA BYTE (0-1-0) on T0^ |
| PDATA EN | → | ASSERTED |
| STATE | → | WRADR3 (1-0-1) on STROBE^ |

-continued

| | |
|---|---|
| FCODE | → WRITE (0-1-0) on T0^ |
| DATA SOURCE | → LOWER DATA BYTE (0-1-1) on T0^ |
| PDATA EN | → ASSERTED |
| STATE | → SELECT OK for DMA (1-1-1) on STROBE^ |

The adaptor is now SELECTED for READ or WRITE or VERIFY. If the SELECT was for WRITE, then the select is complete and no more STROBE signals will be asserted until the processor actually wants to move DMA data. If the SELECT was for either READ or VERIFY, then two more cycles will occur as follows:

| | |
|---|---|
| FCODE | → IDLE (0-0-0) on T0^ |
| DATA SOURCE | → UPPER DATA BYTE 1 (0-1-0) on T0^ (if UDS asserted) |
| PDATA EN | → DE-ASSERTED |
| STATE | → SELECT OK for DMA (1-1-1) on STROBE^ |
| FCODE | → READ (0-1-1) on T0^ |
| DATA SOURCE | → UPPER DATA BYTE 1 (0-1-0) on T0^ |
| PDATA EN | → DE-ASSERTED |
| STATE | → SELECT OK for DMA (1-1-1) on STROBE^ |

At this point, the first data byte will be on the peripheral bus 30 waiting to be latched in. It cannot be latched until the processor 112A makes its first DMA CYCLE access so that the first byte can be properly placed in either the upper or lower latch, depending on the states of UDS and LDS.

It will be appreciated that during a DMA cycle the processor 112A performs a cycle for each data transfer to or from the buffers; however, it does not move the data itself. The direction of the transfer is considered to have previously been set by the address of the selection. Accordingly, the processor 112A merely provides the virtual memory address of a page marked for the DMA access.

That is, where processor 112A performs a read to a virtual page marked for DMA while the controller 18 has selected a peripheral for DMA, then data will be transferred in the direction set by the selection address, to or from the physical page as mapped. A write to a DMA marked page while the controller 18 has selected a peripheral for DMA will cause a processor exception, BERR.

The illustrated controller 18 advantageously employs a programmable array logic chip, the BUFFER MANAGER PAL, to control the peripheral bus cycles once a peripheral has been selected. If selected for DMA write, then the BUFFER MANAGER PAL fills the outbound data buffers asynchronously when they are empty and the processor 112A has data ready for them during a DMA CYCLE. Once filled, the BUFFER MANAGER PAL starts peripheral bus cycles and empties the buffers synchronously with T2, as each byte is presented on the peripheral bus. When the buffer is empty, then the BUFFER MANAGER PAL stops requesting cycles until the processor 112A returns with more data.

When the processor 112A starts the next DMA cycle and S4 SYNC is asserted, then the BUFFER MANAGER PAL will return a buffer load signal PBUF RDY when the buffers needed for this cycle are empty. After PBUF RDY is asserted, the processor 112A cycle can complete when the data is valid and ready to latch into the outbound buffers.

If selected for a DMA read, then the BUFFER MANAGER PAL requests cycles to fill the inbound data buffers when empty. This data is latched in the buffers synchronous with STROBE. When the buffers are full, and the processor 112A performs a DMA cycle, then the BUFFER MANAGER PAL will issue a PBUF RDY, resulting in the signal DTACK being asserted and either a local memory or a standard bus interface write commencing.

The illustrated controller 18 is also capable of performing a "verify" operation to insure that data written to the permanent storage media, e.g., disk drives, is valid. Selecting for a verify cycle is a hybrid operation of the read and write cycle. The logic on the controller 112A, except for the function code, is performing a write without the data enable signal PDATA EN being asserted. Here, peripheral bus interface logic selects a peripheral for a read, ending the select phase as in a normal read cycle, with the first data byte waiting on the bus for the processor 112 to return with the first DMA cycle.

Subsequently, when the first DMA cycle occurs, data is read out of either main or local memory, depending on the DMA mapped page, and written into the outbound data buffers as in a DMA write cycle. The BUFFER MANAGER PAL, detecting a full buffer, commences a peripheral bus cycle with the assertion of T0. At timing interval T2, a data byte out of the buffer is latched into the output register, which would otherwise result in the placement of data on the peripheral bus, where, for example, PDATA EN was asserted. Since it is not, however, when FDATA CLK is asserted, data from the peripheral is latched into input registers. The result of the loopback comparator 76A is used to determine if the data otherwise being written is the same as the data byte being read back. If it is the same, the verify data is deemed valid; otherwise, the verify data is invalid.

FIGS. 11-14 illustrate the internal operation of a preferred i/o controller 18, 20 constructed in accord with the invention. More particularly, the illustrations depict a controller's peripheral bus interface cycle, i.e., the cycle during which the i/o controller takes data from the peripheral bus.

FIG. 11 illustrates a timing sequence for two normal peripheral interface cycles. That is, the illustration depicts the wave forms occurring during two cycles in which error-free, duplicated signals are received on the first and second i/o buses 30A, 30B by the partnered i/o controllers 18, 20.

In the illustration, the waveforms are defined as follows:

| Signal | Definition |
|---|---|
| 16 MHz* | Inverse of the sixteen megahertz clock signal |
| 8 MHz | Eight megahertz timing signal derived from 16 MHz clock signal |
| T0 | Timing signal having a leading edge which defines the start of a peripheral interface cycle |
| T2 | Timing signal derived from T0 having a leading edge which rises 125 nanoseconds after T0 and having a trailing edge which falls with T0 |
| F CLK | Flash clock signal defining |

-continued

| Signal | Definition |
|---|---|
|  | instants at which the flash circuitry compares operational states of the first i/o controller 18 and its partner, i/o controller 20; the signal is generated at the non-inverting output of a flip-flop having its "J" input driven by SET STRB*, its "K" input tied to its non-inverting output, its clock input driven by 16 MHz*, its clear input driven by T2. |
| SET STRB | Timing signal for setting the strobe flip-flop; see FIG. 4, element 176 |
| STROBE* | Timing signal defining peripheral bus interface cycles |
| CLR T0* | Signal for clearing T0 |
| T7* | Timing signal for seventh interval |
| E CLK | Error clock signal; see FIG. 4, element 166 |

In FIG. 11, the first of the illustrated peripheral interface cycles begins with the first rise of wave form T0 and ends with the first fall of wave form STROBE The second of the cycles begins with the second rise of wave form T0 and ends with the fall of wave form STROBE.

Peripheral Bus Error Handling

Peripheral bus data signals are captured by the i/o controller 18 at F CLK and compared by drive and check sides, as well as between partner controllers 18, 20. The results of these comparisons are shared between partners so that all peripheral bus obey/error decisions are made identically between boards even if only one board saw an error.

If the results of the comparisons indicate that the data captured by both boards agrees and is of good parity, then the bus interface cycle continues with the issuing of STROBE on the next falling edge of 16 MHz. If the data captured at F CLK does not agree between boards (as indicated by the WE signals), then a RETRY F CLK is issued capturing data on the bus again. The same comparisons are made with the cycle continuing if the boards agree.

FIG. 12 illustrates a timing sequence for a peripheral bus interface cycle in which the peripheral performs two peripheral bus/flash bus comparisons (hereinafter, referred to as "bus comparisons") to determine that duplicative data is received synchronously and simultaneously by the first and second processing sections 18A, 18B of the first and second peripheral controller 18, 20.

In the illustration, the peripheral bus interface cycle commences with the rise of the leading edge of wave form T0. A bus comparison is performed during the first interval in which the wave form F CLK is high; see corresponding FDATA CLK D and FDATA CLK C signals providing inputs to element 168 of FIG. 4.

As a result of the flash circuitry's detection of an improper condition during the first bus comparison—indicated by the failure of SET STRB to become asserted—the i/o controller performs a second bus comparison. This second comparison occurs during the second interval in which F CLK is shown to be asserted. As indicated by the illustration, this second interval begins 125 nanoseconds after the first interval ends.

As indicated by the rise of SET STRB, the second bus comparison results in a finding that the first and second processing sections 18A, 18B of the first and second i/o controller 18, 20 received duplicative information signals from the peripheral bus. Following the rise of SET STRB, the STROBE signal is asserted. With the fall of that signal, the illustrated cycle ends.

Figure 13:
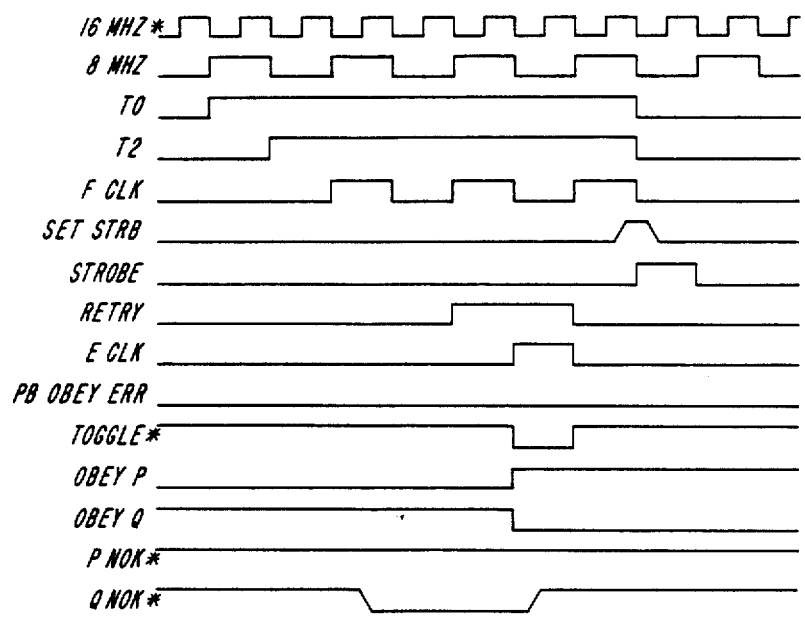
FIG. 13 depicts a timing sequence for a preferred bus interface in which the i/o controller switches bus obey modes.

FIG. 13 depicts a timing sequence for a preferred bus interface cycle where, in consequence to detecting an error, the i/o controller switches from a mode in which it obeys one of the i/o buses to a mode in which it obeys the other i/o bus. When this occurs, an ERROR CLK signal will be asserted instead of STROBE. The assertion of ERROR CLK will change the state of the obey signals as follows:

| CURRENT STATE | | | | | NEXT STATE | | |
|---|---|---|---|---|---|---|---|
| OBEY P | OBEY 0 | P OK | Q OK | ERROR CLK | OBEY P | OBEY Q | P BERR |
| T | T | T | T | asserted | T | T | T |
| T | T | T | F | asserted | T | F | F |
| T | T | F | T | asserted | F | T | F |
| T | T | F | F | asserted | F | F | T |
| T | F | F | T | asserted | F | T | F |
| F | T | T | F | asserted | T | F | F |

In addition to the signals defined above, the illustration presents the following wave forms:

| Signal | Definition |
|---|---|
| RETRY | Signal defining onset of retry interval for rechecking signals received from the i/o buses |
| PB OBEY ERR | Peripheral bus obey error; see FIG. 7, element 212 |
| TOGGLE* | indicates upon assertion that the each side of the i/o controller (e.g., the drive and check sides) is enabled to toggle from its current obey state (e.g., obeying the P bus) to a new obey state (e.g., obeying the Q bus) depending upon the status of P NOK*, Q NOK*, OBEY P*, and OBEY Q* |
| OBEY P | Signal indicating that the i/o controller is processing signals received on the P bus |
| OBEY Q | Signal indicating that the i/o controller is processing signals received on the Q bus |
| P NOK* | Signal indicating that the P bus is not fault |
| Q NOK* | Signal indicating that the Q bus is not faulty |

With particular reference to FIG. 13, the illustrated bus interface cycle begins with the rise of the T0 signal. At the outset, the i/o controller is obeying the Q bus, but not the P bus. That is, the controller is processing signals received on the Q bus, while ignoring those signals received on the P bus. This is indicated by the OBEY Q signal, which is in its assertive state at the beginning of the cycle, while the OBEY P signal is initially in its non-assertive state.

As indicated by the F CLK wave form, upon the first tick of the flash clock, signals received by the i/o controller(s) 18, 20 from the Q bus are detected as faulty; see the deassertion of Q NOK*.

With the second tick of F CLK, the RETRY signal is asserted. This signal can be generated at the non-inverted output of a flip-flop having F CLK as it clocked input, having its non-inverting output coupled to its "K" input, and having its clear input driven by the NOR of T2 C and WE HOLD STRB.

As shown earlier (see FIG. 4, elements 166 and 174), the ERROR CLK signal is generated in lieu of STROBE after RETRY is set and while SET STRB is not asserted. The ERROR CLK signal provides an input to a NAND gate, along with the PB OBEY ERR* signal (see FIG. 7, element 212) to cause TOGGLE to become asserted. This assertion enables the OBEY P and OBEY Q signals to change state.

At the time of the third illustrated flash clock—see the F CLK wave form—the i/o controller has switched from obeying the Q bus to obeying the P bus. The third illustrated flash clock forces a bus comparison (i.e., a comparison of the flash and peripheral bus signals) which reveals no error (see FIG. 14). Accordingly, SET STRB and STROBE are asserted, completing the bus interface cycle.

Figure 14:
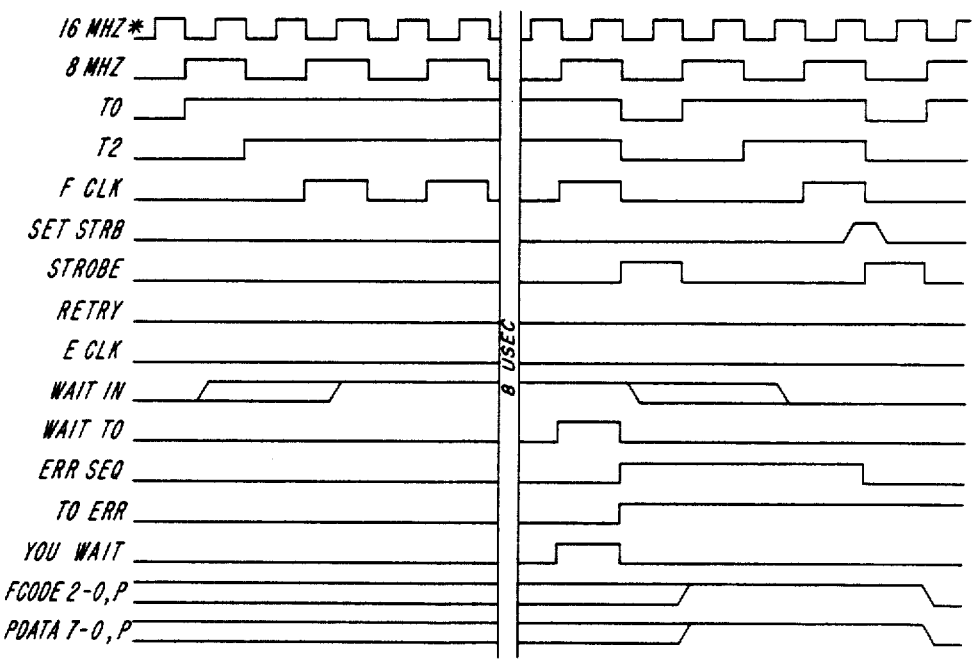
FIG. 14 illustrates a time-out sequence in a preferred i/o controller constructed according to the invention.

FIG. 14 illustrates a time out sequence in a preferred i/o controller constructed according to the invention. As noted above, those active peripheral devices which are attached to the peripheral bus constantly monitor and compare signals received on the first and second i/o buses. Whenever one of the peripherals detects an erroneous bus transmission, e.g., data signals received on the first i/o bus which do not match data signals received on the second i/o bus, the peripheral asserts WAIT on the corresponding conductors of the peripheral bus.

The i/o controller responds to brief assertions of WAIT by delaying until WAIT is deasserted any subsequent assertions of STROBE on the peripheral bus. In other terms, brief assertions of WAIT delay completion of a current bus interface cycle. This proves advantageous insofar as the delay permits the peripheral which was asserting WAIT to recheck incoming signals, which may have merely required extra time to settle or to rid themselves of interference.

However, in the event the i/o controller detects excessively lengthy assertions of WAIT, it enters an error checking sequence which allow it, as well as the peripheral devices, to locate the source of error. According to one embodiment of the inventions, the i/o controller will enter this error checking sequence if WAIT is asserted for more than eight microseconds.

In addition to those waveforms define above, FIG. 14 includes the following:

| Signal | Definition |
| --- | --- |
| WAIT TO | Wait time out signal; see FIG. 4, element 162 |
| ERR SEQ | Signal defining onset of i/o controller sequence for identifying a source of error |
| TO ERR | Signal defining a time out error |
| YOU WAIT | wait-related signal defined as a boolean AND of the WAIT TO and ERR SEQ* signals |

With particular reference to FIG. 14, if an attached peripheral detects an erroneous transmission on the peripheral bus, it asserts WAIT, which inhibits the i/o controller from asserting STROBE or RETRY. The assertion of WAIT simultaneously presets WE HLD STRB, so that the timing logic (FIG. 4) strobes only F CLK.

In addition to asserting WAIT, the fault-detecting peripheral can back-drive signals on the function code and data conducts of the first and second i/o buses. The function code loopback comparator (FIG. 2, element 74A, 74B) will, thus, indicate errors on both i/o buses. The data loopback comparators (FIG. 2, elements 76A, 76B) may also indicate errors if the i/o controller is driving data.

More particularly, if WE HLD STRB remains set for eight microseconds, the i/o controller 18 enters its time-out error sequence on the next strobe of F CLK.

The signal WAIT TIME-OUT is set by FDATA CLK and causes assertion of STROBE on the next falling edge of the timing signal 16 MHz*. The assertion of WAIT-TIME OUT also causes the controller 18 to assert WAIT back to the adaptors to insure that all adaptors enter the ERROR T2 sequence. This assertion of STROBE also clears the states of the peripheral bus selection logic, as well as clocking the adaptor asserting WAIT to deassert the WAIT conductor, the function code conductors and data conductors.

The rising edge of STROBE clears WAIT TIME-OUT, whose falling edge then sets the error signal TIME-OUT ERROR. With the function code states at IDLE, the BUFFER MANAGER PAL asserts the cycle initiation signal BCYC START regardless of the type of cycle the board was performing at the time of the assertion of WAIT TIME-OUT. The next rising edge of the 8 MHz starts the next part of the time-out cycle by asserting T0.

The assertion of T0 clocks the peripheral bus control logic into its time-out error sequence. Particularly, following the first assertion of T0 after the error signal TIME-OUT ERROR is asserted causes the controller 18 to assert all function codes conductors as well as selecting the data multiplexors 70A, 70B to assert all data conductors. Simultaneously, the controller 18 asserts the opposite data paritY on the parity conductors. A STROBE for this cycle will normally occur if WAIT has been deasserted; however, if WAIT has not been deasserted and another WAIT TIME-OUT occurs, then another FORCED STROBE occurs along with an ERROR CLK. This ERROR CLK will change the buses as follows:

| WAIT P | WAIT Q | OBEY P | OBEY Q | OBEY P | OBEY Q |
| --- | --- | --- | --- | --- | --- |
| T | F | T | T | T | F |
| F | T | T | T | F | T |
| T | F | F | T | — | — |
| F | T | T | T | T | F |
| T | F | T | F | F | T |
| F | T | T | F | — | — |

While the description above relates generally to the first i/o controller 18 and, more particularly, to the first processing section 18B, it will be appreciated that the second i/o controller 20, as well as the second processing section 18C, are constructed and operate similarly to the apparatus described above.

Peripheral Device Interface

The i/o controllers 18, 20 communicate with the peripheral devices 24, 26, 28 via the peripheral bus 30. As noted above, the controllers 18, 20 address each peripheral device using the chassis slot number of the associated interface card, which includes the gate arrays and adaptors for the peripheral.

Figure 15:
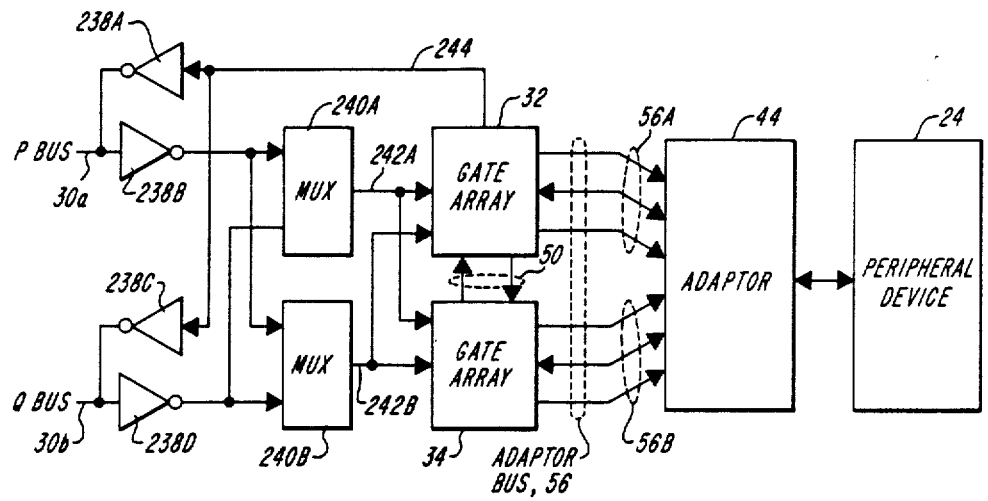
FIG. 15 depicts preferred circuitry for interfacing a peripheral device with the peripheral bus.

Referring to the drawings, FIG. 15 depicts preferred circuitry for interfacing a peripheral device 24 with the peripheral bus 30 and, more particularly, the first and second i/o buses 30A, 30B. The interface includes gate arrays 32, 34, adaptor 44, adaptor bus 56, inverters 238A, 238B, 238C, 238D, and registered multiplexors 240A, 240B.

As shown in the illustration, input signals received on the P bus 30A are routed through inverter 238B to both registered multiplexors 240A, 240B, while input signals received on the Q bus 30B are routed through inverter 238D to the multiplexors. From the registered multiplexors 240A, 240B, the input signals are routed on lines 242A, 242B to both gate arrays 32, 34, where the signals are checked and processed. Output signals produced by gate array 32 are routed via line 244 to the P bus and the Q bus via inverters 238A, 238C, respectively.

Figure 16:
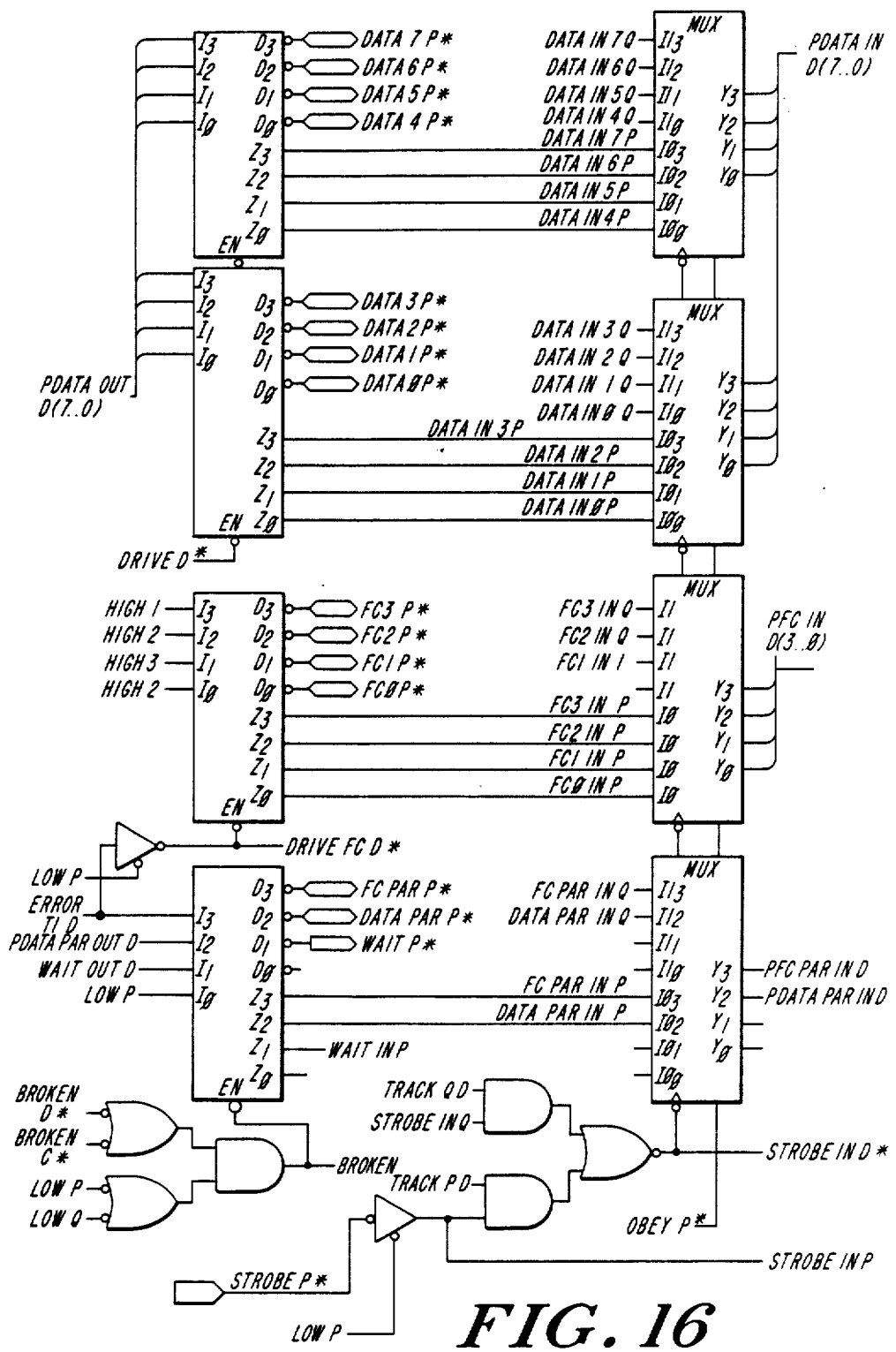
FIGS. 16 and 17 illustrate preferred bus interface circuitry for preferred gate arrays constructed in accord with the invention.
Figure 17:
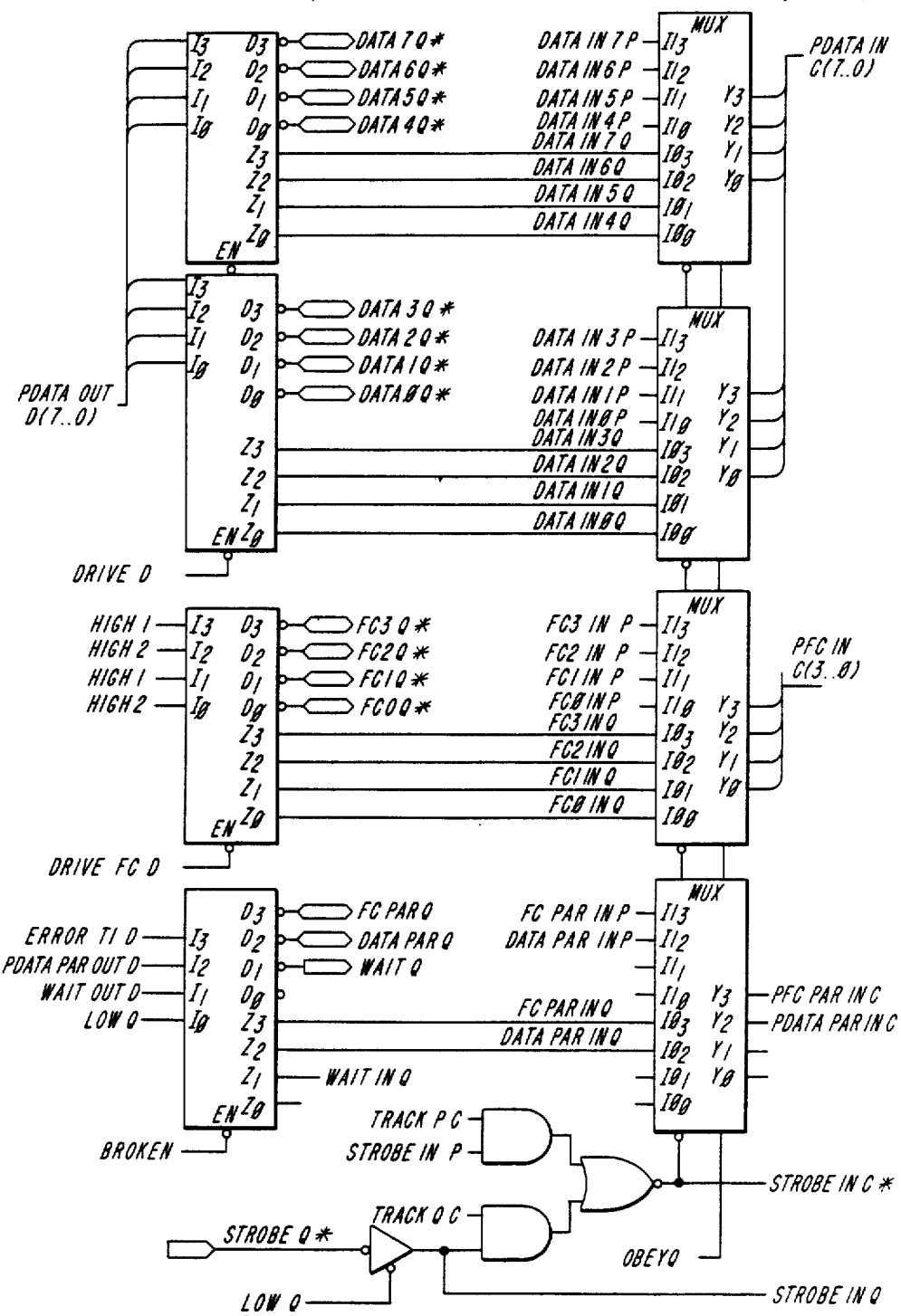

The bus interface logic is presented in greater detail in FIGS. 16 and 17. More particularly, FIG. 16 illustrates the circuitry interconnecting the peripheral bus 30 and the gate arrays 32, 34. Specifically, that illustration depicts circuitry which makes up inverters 238A, 238B, and multiplexor 240A (FIG. 15). On input, this circuitry routes data, function, and strobe signals from the P bus 30A to its principle associated gate array 32, i.e., the "drive" side array, as well as to the partner array 34. On output, this circuitry routes data, function, and WAIT signals from the gate arrays 32, 34 to both i/o buses, i.e., P bus 30A and Q bus 30B.

Similarly, FIG. 17 illustrates circuitry interconnecting the peripheral bus 30 and the gate arrays 32, 34. Specifically, the illustration depicts circuitry making up inverters 238C, 238D, and multiplexor 240B (FIG. 15). The illustrated circuit routes data between the Q bus (30B) and its principle associated gate array 34, i.e., the "check" side array, as well as to its partner gate array 32.

Figure 18:
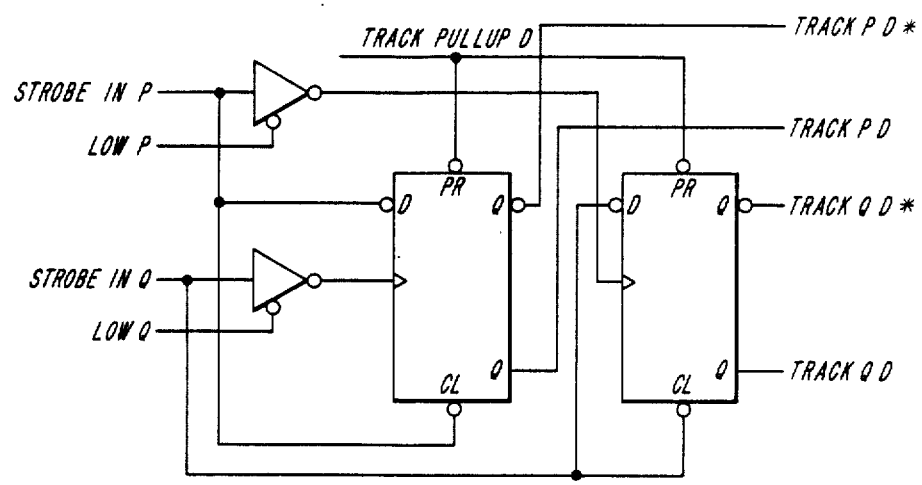
FIG. 18 depicts preferred circuitry for generating strobe tracking signals in a device interface constructed according to the invention.

FIG. 18 depicts circuitry for generating strobe tracking signals TRACK P D and TRACK Q D, as well as inverted forms thereof. This circuitry is used in combination with the circuitry depicted in FIG. 16 (at bottom) for generating the STROBE IN D* signal, representative of the timing of information signal transfers received by the drive side gate array 32. A similar circuit, not illustrated, is provided for generating the tracking signals used in combination with the circuitry depicted in FIG. 17 for generating the STROBE IN C signal, representative of the timing of information signal transfers at the check side array 34.

A full appreciation of the operation of the circuit shown in FIG. 18 may be obtained by reference to aforementioned U.S. patent application Ser. No. 018,629, filed Feb. 25, 1987, and incorporated herein by reference.

With particular reference to the interface circuitry of FIG. 16, four Motorola 26S10 transceivers provide access to eight bits of data and four bits of function code on the P bus 30A, along with their associated parity bits and with the WAIT line. The transceivers function in receive mode to produce DATA IN P and FC IN P signals. The Q BUS counterparts functioning similarly to receive and produce DATA IN Q signals.

The DATA IN P and FC IN P signals, and their associated parity bits, are routed to a set of latched multiplexers. The outputs of these latched multiplexors are the PDATA IN D and PFC IN C signals. An OBEY P* signal determines whether those outputs drive signals received from the P Bus 30A or from the Q Bus 30B. Latching occurs on the first falling edge of STROBE IN D*.

The OBEY P and OBEY Q lines are conditioned so that the latches associated with the drive side array 32 normally provide data obtained from the P Bus, while the latches associated with the check side array 34 normally provide data obtained from the Q bus.

Figures 20, 21:
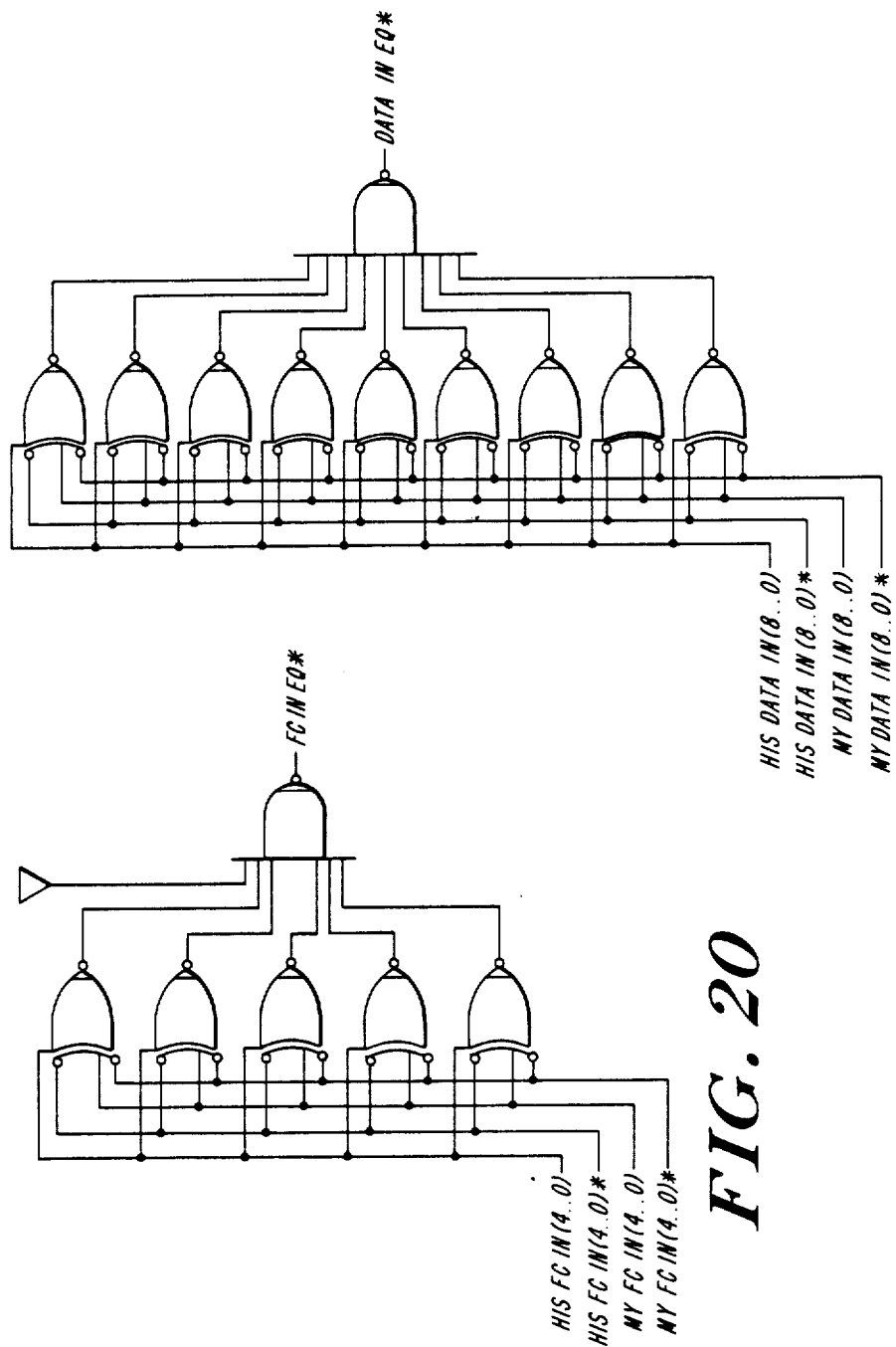
FIG. 20 illustrates a preferred circuit for comparing function code signals received by partnered gate arrays.
FIG. 21 illustrates a preferred circuit for comparing data signals received by partnered gate arrays.

FIGS. 19-20 illustrate circuitry for checking data and function code signals received by the drive side array 32. More particularly, FIG. 19 illustrates a preferred circuit for detecting faults in incoming data and for generating in response thereto WAIT and MAKE ERROR T1 signals. The figure provides circuitry for checking the parity of data and function code signals (i.e., MY DATA IN and MY FC IN) received by the gate arrays 32, as well as that of similar signals (i.e., HIS DATA IN and HIS FC IN) received in the partner gate array 34.

FIG. 20 illustrates a preferred circuit for comparing function code signals (MY FC IN) received in a gate array 32 with those (HIS FC IN) received by the partner gate array 34. The circuit generates resultant signal FC IN EQ* having an assertive value indicating that the function code signals are equal.

FIG. 21 illustrates a preferred circuit for comparing data signal (MY DATA IN) received by a gate array 32 with those (HIS DATA IN) received by the partner gate array 34. The circuit generates resultant signal DATA IN EQ* having an assertive value indicating that the compared signals are equal.

Figure 22:
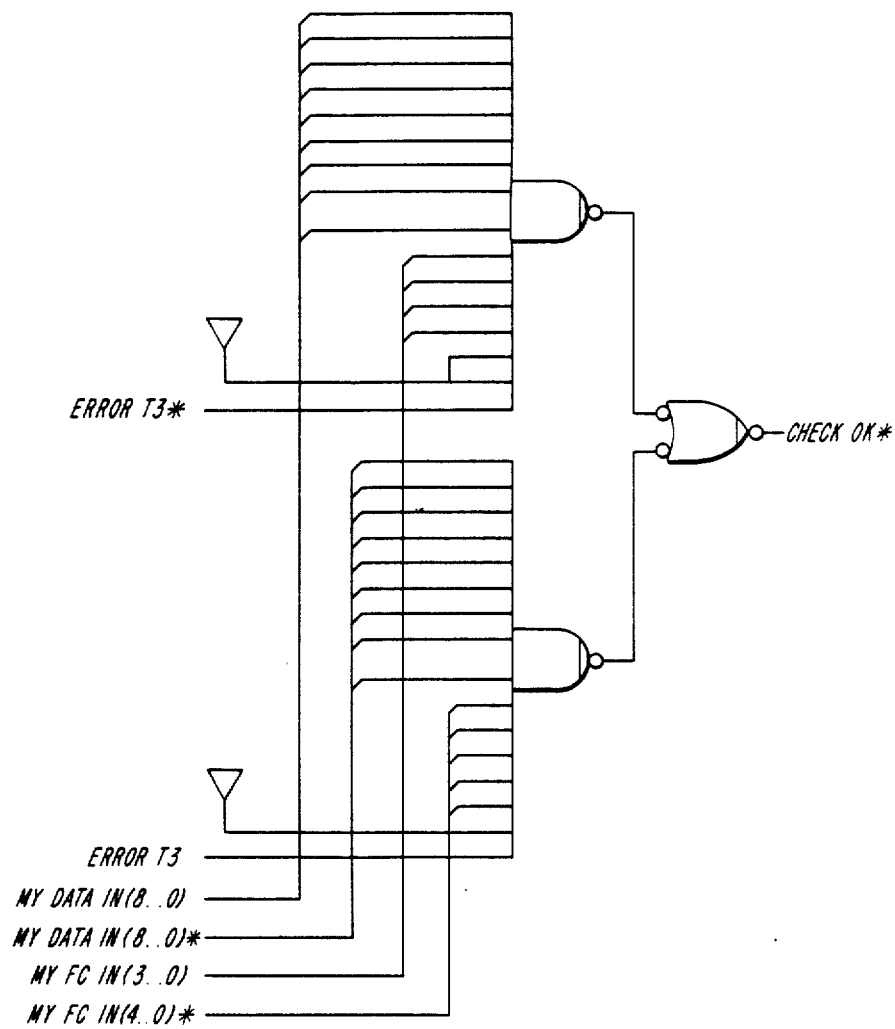
FIG. 22 illustrates preferred circuitry for checking data and function code signals received during the stages of the gate array error checking sequence.

FIG. 22 illustrates preferred circuitry for checking data and function code signals received during all stages of the peripheral bus 30 error checking sequence, discussed below.

Figure 23:
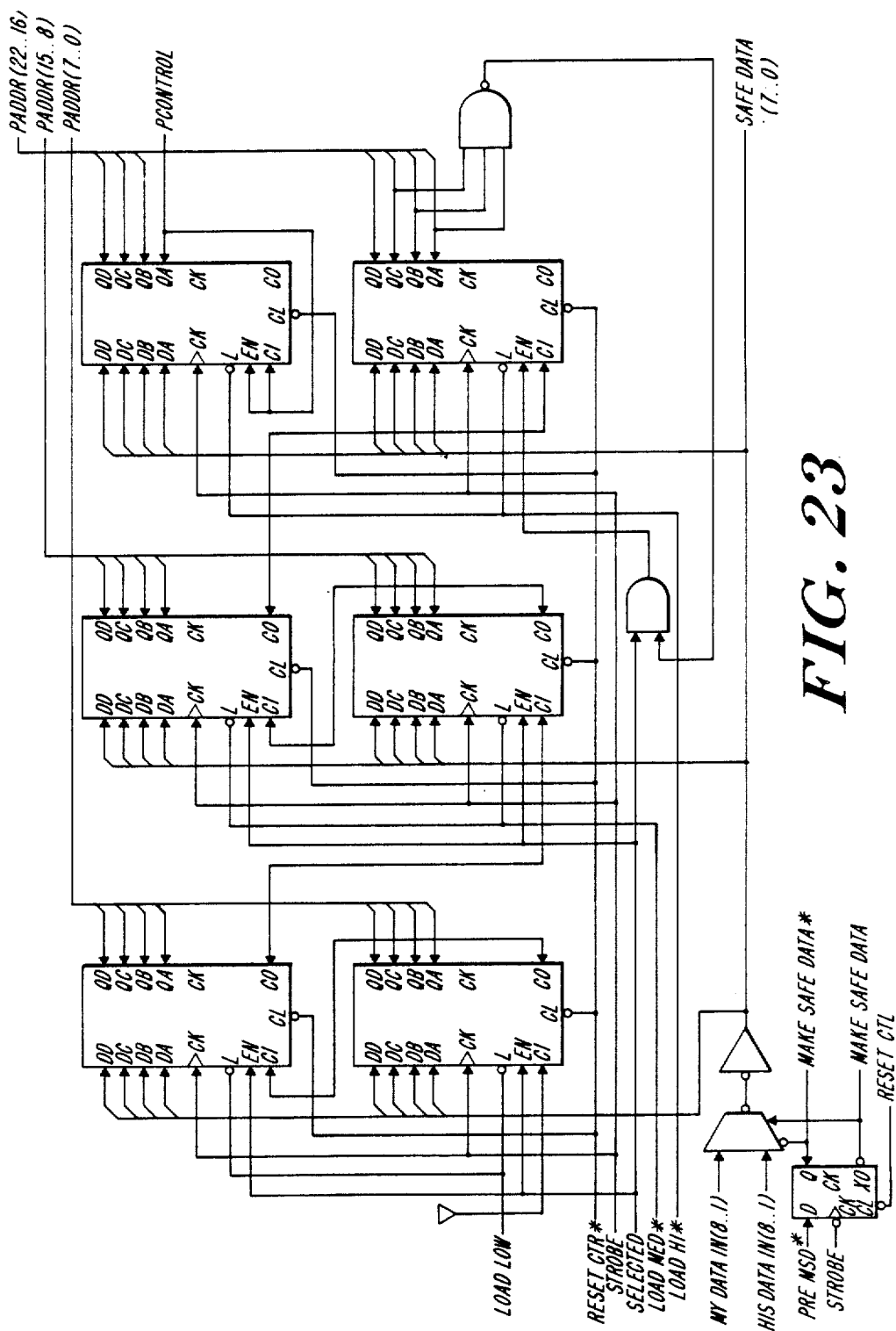
FIG. 23 illustrates preferred circuitry for extracting peripheral device address information from the peripheral bus data signals in a device interface constructed according to the invention.

FIG. 23 illustrates preferred circuitry for extracting peripheral device address information from input data signals. The circuit accepts input data signals from both gate arrays, i.e., signals MY DATA IN and HIS DATA IN to produce addressing output signals, PADDR. The circuit also selects, from those incoming data signals, data signals (SAFE DATA) which will be utilized during further processing by the gate array.

Figure 24:
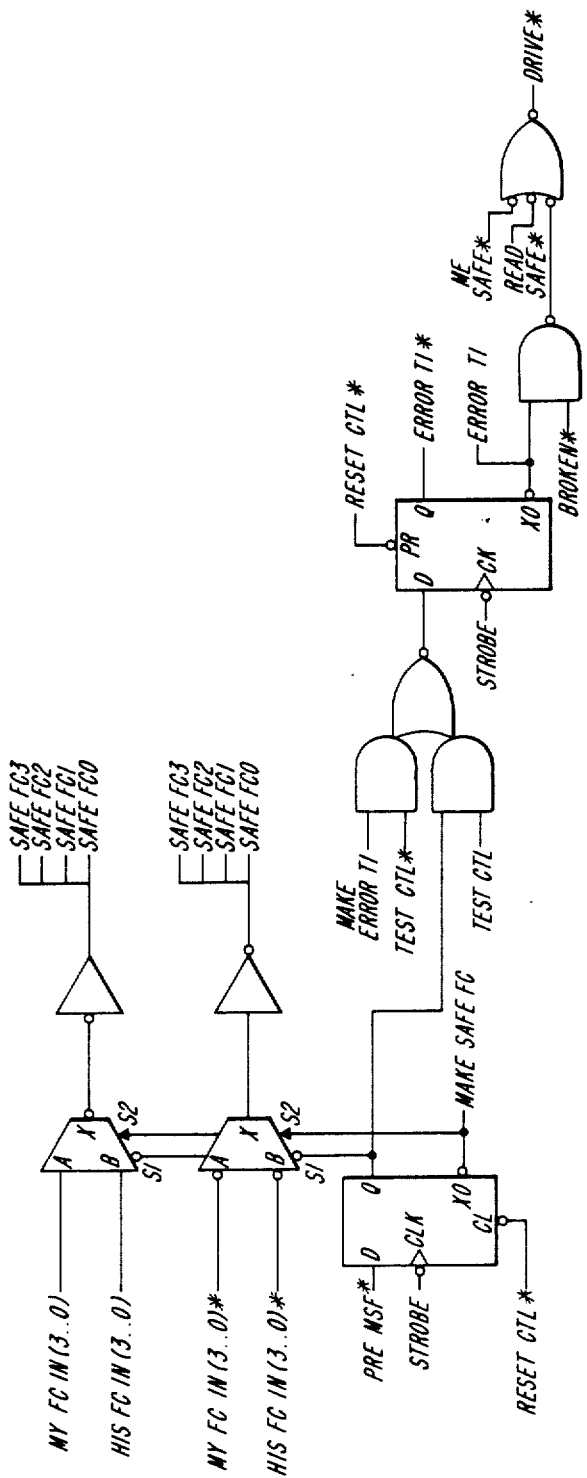
FIG. 24 depicts preferred circuitry for generating signals for initiating an error sequence in a device interface constructed according to the invention.

FIG. 24 depicts preferred circuitry for generating error sequence initiating signal ERROR T1 and for generating a DRIVE* signal for controlling operation of the attached peripheral device adaptor 44. The circuitry also includes elements for selecting, from the incoming function code signals (MY FC IN and HIS FC IN), those function code signals (SAFE FC0, SAFE FC2, . . . SAFE FC3) which will be used for further processing by the gate array 32.

With respect to FIG. 23, the trailing edge of STROBE* effects the storage of the data signal parity in the drive side latch. If that parity is ok, the MAKE SAFE DATA signal is asserted, causing the multiplexor shown at bottom left of FIG. 23 to select the PDATA IN D leads as the source of SAFE DATA for the drive side of the interface. On the other hand, if the parity stored in the drive latch proved unacceptable, the MAKE SAFE DATA signal would not be generated, thereby causing the selection of the check side latch data signals, PDATA IN C.

FIG. 24 presents logic utilized in determining whether to assert MAKE SAFE FC and thereby effect selection of drive side function code signal, as opposed to check side function code signal. That logic is used similarly to the MAKE SAFE DATA is determining function code signal selection.

The circuitry of FIG. 19 compares the function code parity check signals, PFC PAR OK, generated by the drive and check sides to determine whether both side received valid function code signals. This check is important insofar as a fault could result where one side of the interface, i.e., check side array 34, interprets the incoming signals as defining a read or select operation, while the other array, e.g., array 32, interprets those signals as defining an idle or write operation.

Particularly, in the event the arrays 32, 34 disagree whether the requested function is a read or select operation, they may not simultaneously place data or status signals on the bus. If one side is late in so doing, the i/o controllers 18, 20 might receive erroneous data. Alternatively, in the event the the arrays disagree whether the requested function is a write operation, the transmission of read or status signal may interfere with the receipt of valid write data.

To circumvent these possible sources of error, the gate array 32, 34 generates and transmits to the i/o controllers 18, 20 a WAIT signal which delays the generation of subsequent STROBE signals on the peripheral bus. Logic for generating the WAIT signal in response to a disagreement of parity signals—i.e., single bit errors perceived within the received signals—is presented in FIG. 19. Specifically, attention is directed to the logic for generating the WAIT OUT signal.

FIG. 19 also presents circuitry for generating the MAKE ERROR T1 signal in the event a multibit error is detected. Specifically, the illustrated logic generates that signal where both the drive and check side latches have incorrect data parity; where both the drive and check side latches have correct data parity, but differing data signals; where both the drive and check latches have incorrect function code parity; and where the drive and check latches have correct function code parity, but differing function code signals.

The generation of MAKE ERROR T1 causes the gate array logic to enter an error handling sequence, beginning with the assertion of WAIT.

Figure 25:
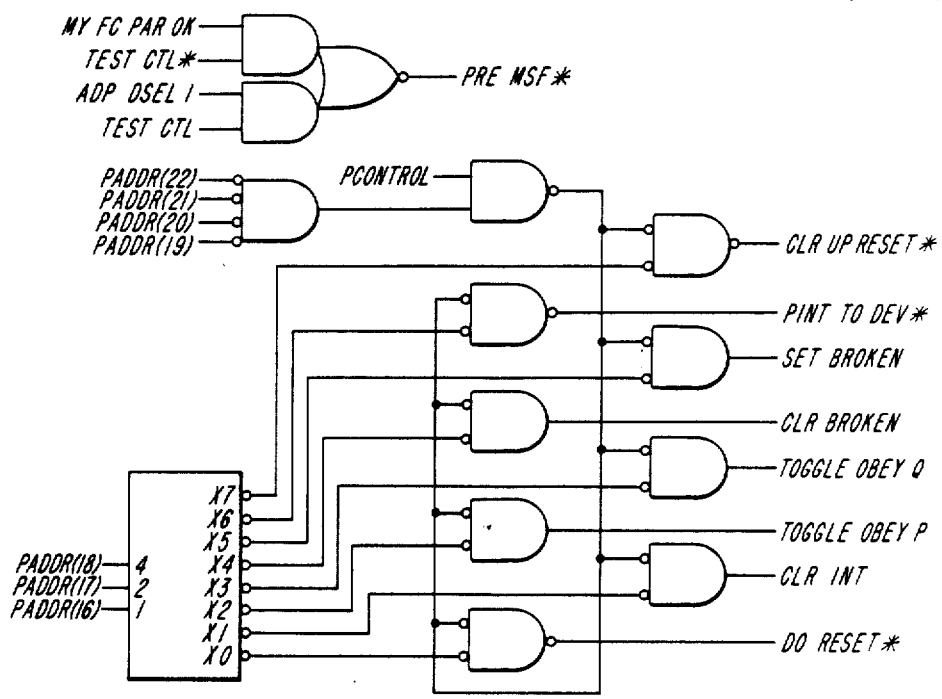
FIG. 25 illustrates preferred circuitry for extracting peripheral device adaptor command signals in a device interface constructed according to the invention.

FIGS. 25 through 36 present further circuitry of preferred gate array 32. In particular, FIG. 25 illustrates preferred circuitry for extracting, from the high order bits of the peripheral address signal PADDR, peripheral device adaptor 44 command signals CLR UP RESET, PINT TO DEV*, SET BROKEN, CLR BROKEN, TOGGLE OBEY Q, TOGGLE OBEY P, CLR INT, and DO RESET*.

Figure 26:
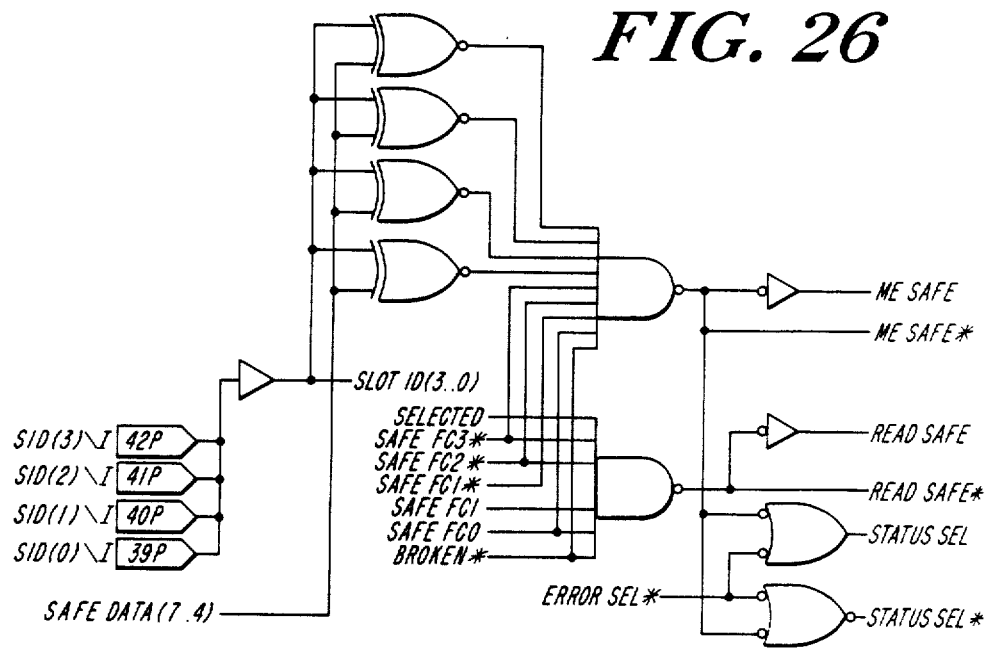
FIG. 26 illustrates preferred circuitry for evaluating slot-id signals received from the i/o controller.

FIG. 26 illustrates preferred circuitry for comparing slot-id signals (SAFE DATA bits 4–7) received from the i/o controller with the slot-id signals (SID) assigned to the gate array 32 to determine whether the gate array has been addressed (ME SAFE) and selected (STATUS SEL). The circuitry also provides elements for interpreting the function code signals (SAFE FC0, SAFE FC1, SAFE FC2, and SAFE FC3, and the respective inverted forms) to determine whether a read operation has been requested.

Figure 27:
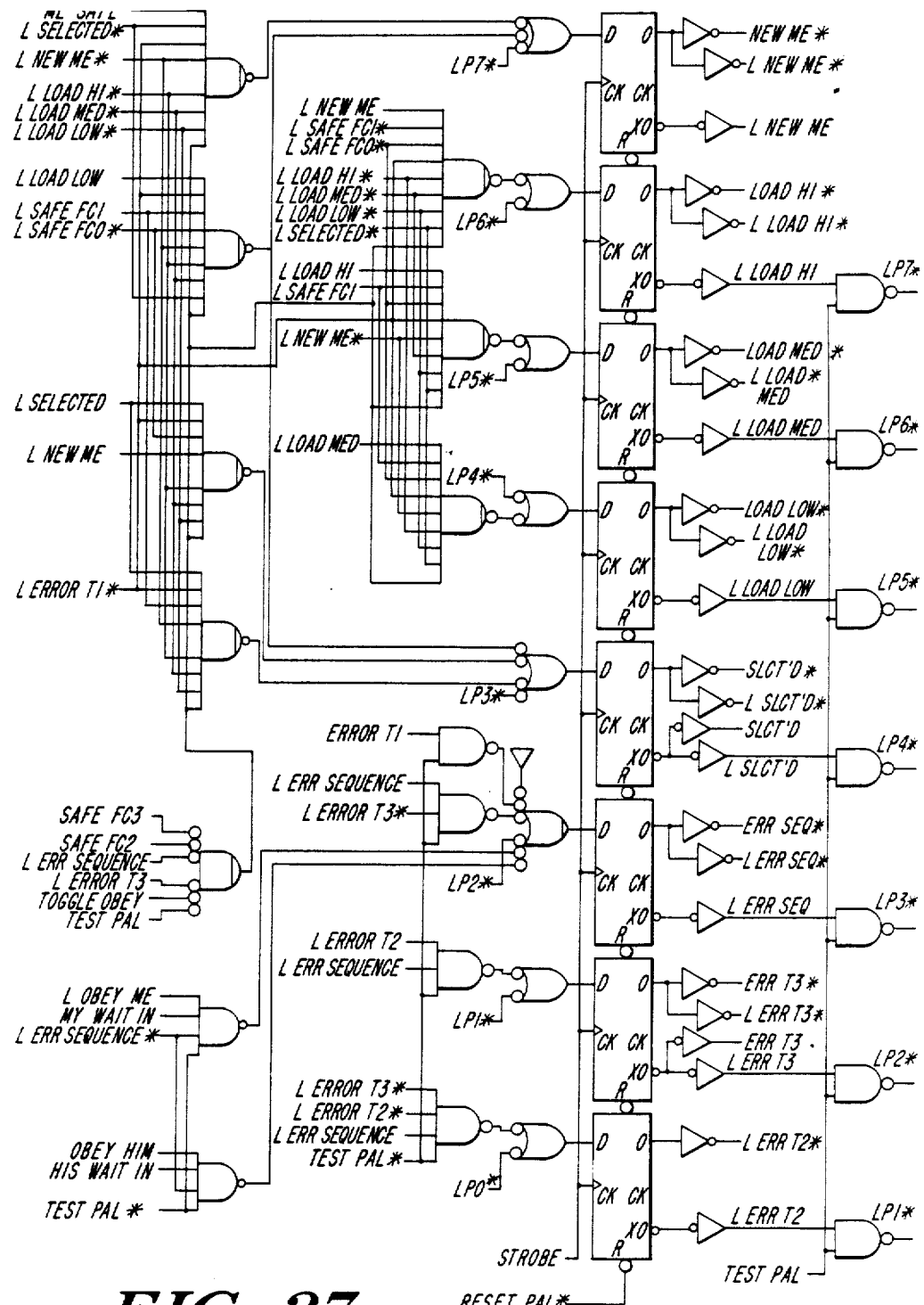
FIGS. 27 and 28 illustrate preferred circuitry for generating gate array state signals in a device interface constructed according to the invention.
Figure 28:
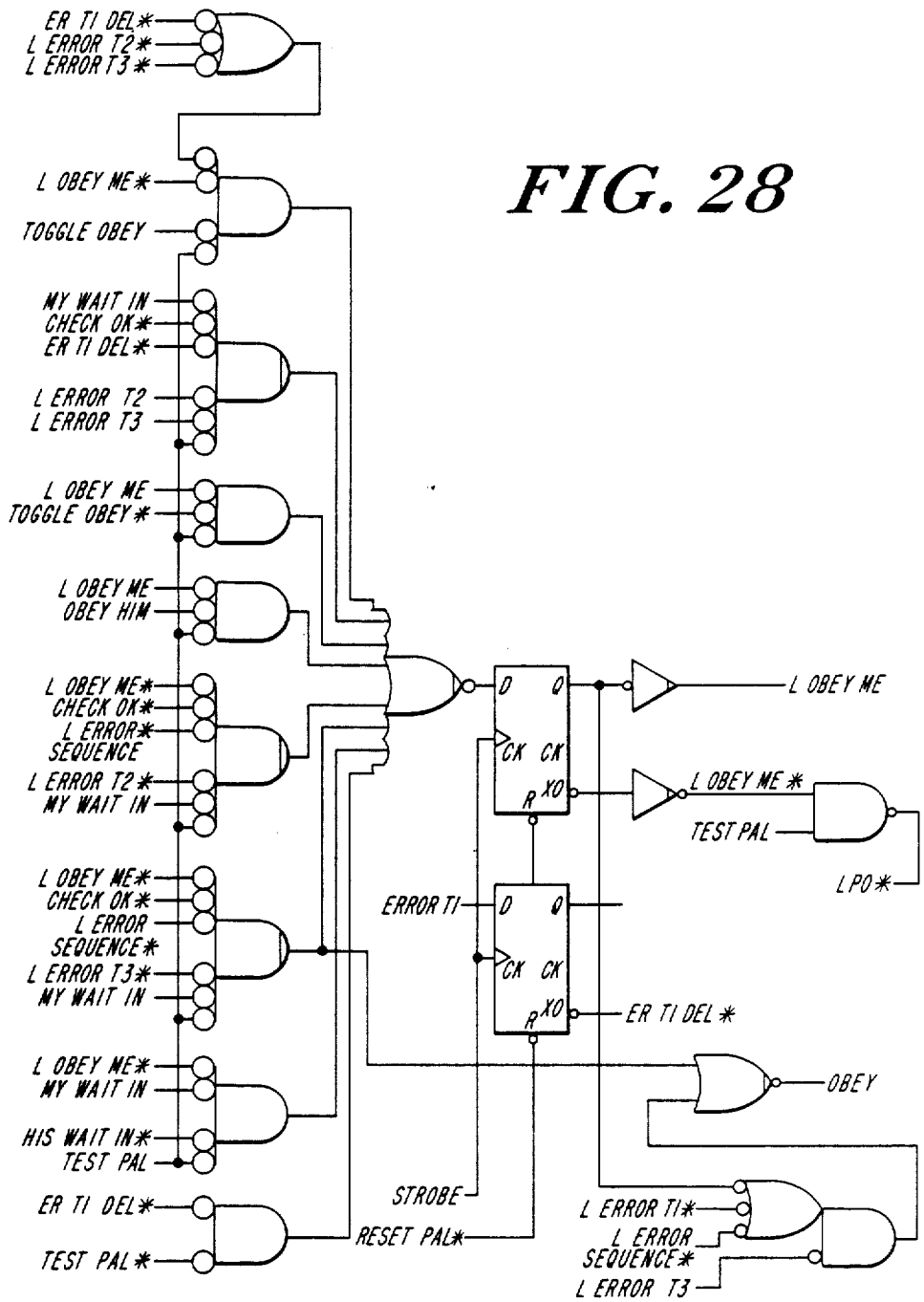

FIGS. 27 and 28 illustrate preferred circuitry for generating state signals NEW ME, LOAD HI, LOAD MED, LOAD LW, SELECTED, ERROR SEQUENCE, ERROR T3, ERROR T2, OBEY ME, and LP0 . . . LP7, as well as inverted and latched forms thereof.

Figure 29:
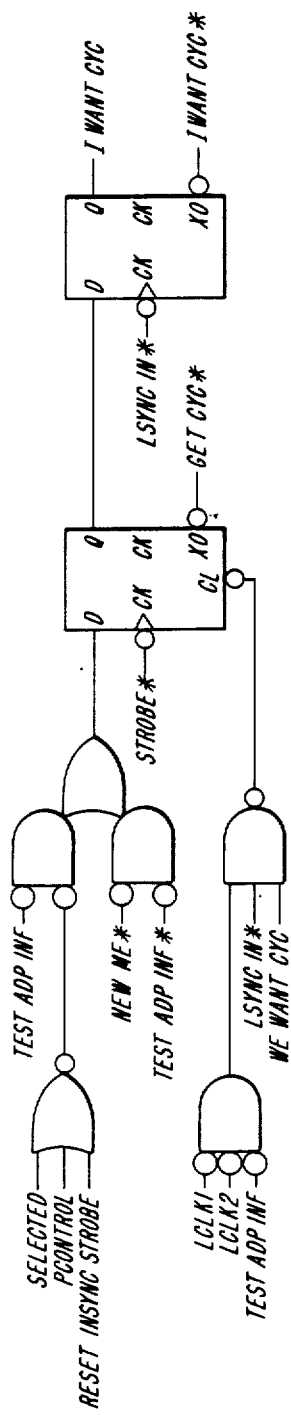
FIG. 29 illustrates a preferred circuit for generating peripheral adaptor control signals in a device interface constructed according to the invention.

FIG. 29 illustrated a preferred circuit for generating peripheral adaptor 44 control signals GET CYC* and I WANT CYC, as well as inverted forms thereof.

Figure 30:
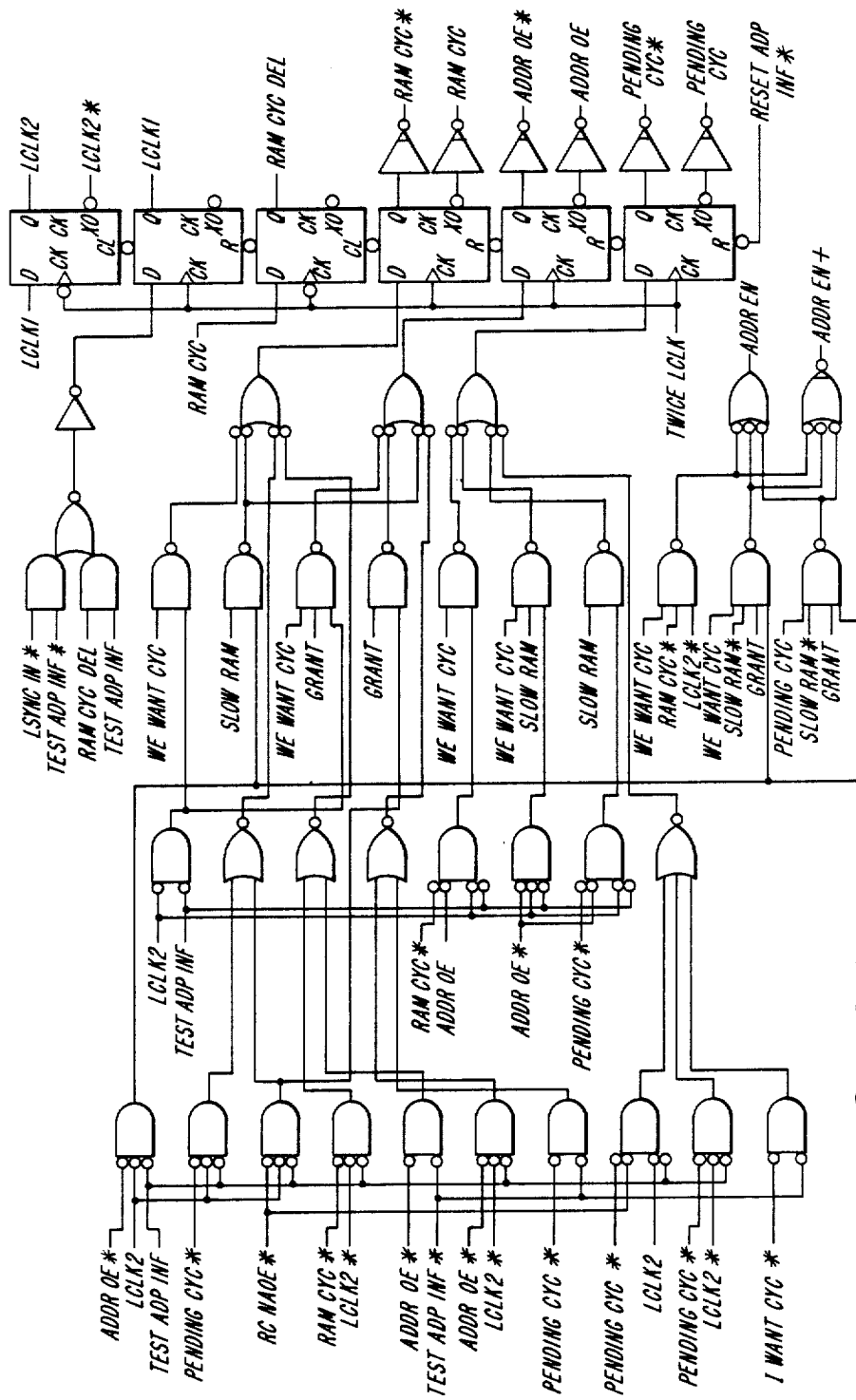
FIG. 30 illustrates preferred circuitry for generating timing signals in a device interface constructed according to the invention.

FIG. 30 illustrates preferred circuitry for generating timing signals LCLK1, LCLK2, as well as state signals RAM CYC DEL, RAM CYC, ADDR OE, ADDR EN, and PENDING CYC, as well as inverted forms thereof.

Figure 31:
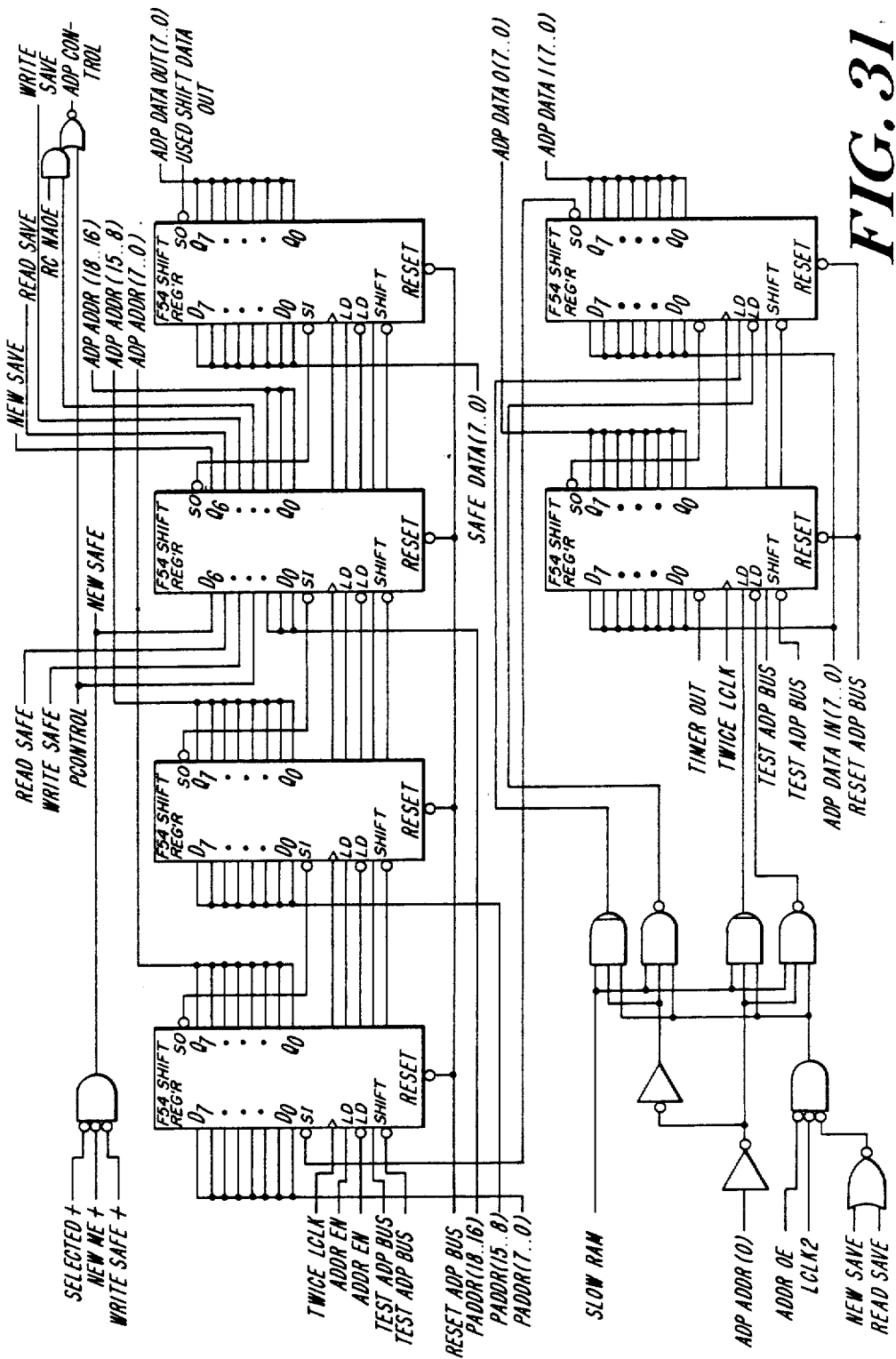
FIG. 31 illustrates a preferred circuit for generating adaptor address and data signals in a device interface constructed according to the invention.

FIG. 31 illustrates a preferred circuit for generating address (ADP ADDR) and data (ADP DATA OUT) signals for output to the adaptor 44. The circuit also includes elements for generating internal data signals (ADP DATA 0) and (ADP DATA 1) from data signals (ADP DATA IN) received from the adaptor.

Figure 32:
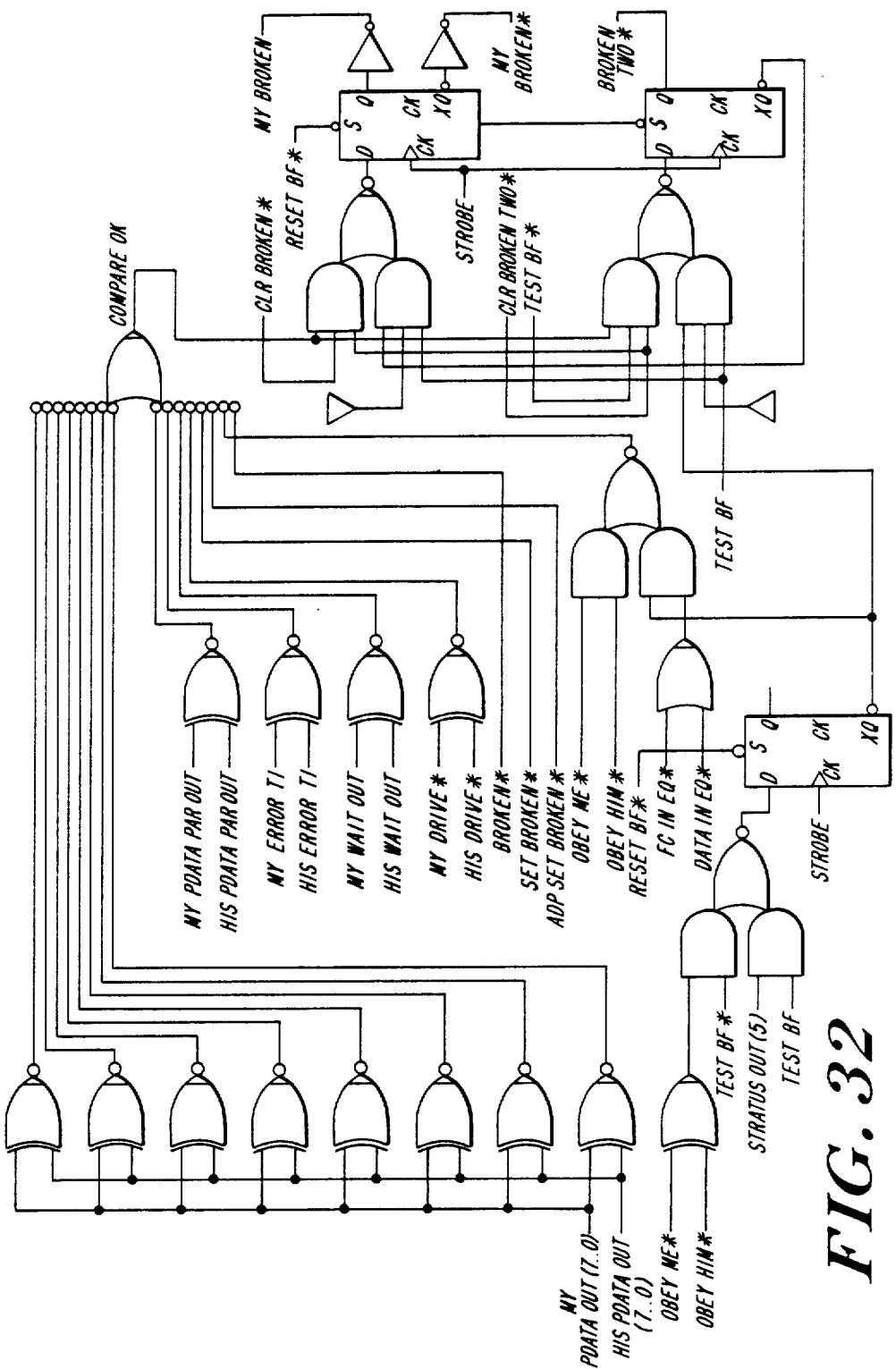
FIG. 32 illustrates preferred circuitry for comparing peripheral bus data signals generated by partnered gate arrays.

FIG. 32 illustrates preferred circuitry for comparing peripheral bus data signals (MY PDATA OUT) output by the gate array 32 with those signals (HIS PDATA OUT) output by the partner gate array 34 to generate the COMPARE OK* signal. The figure also illustrates circuitry for generating the signals MY BROKEN and BROKEN TWO, as well as inverted forms thereof.

Figure 33:
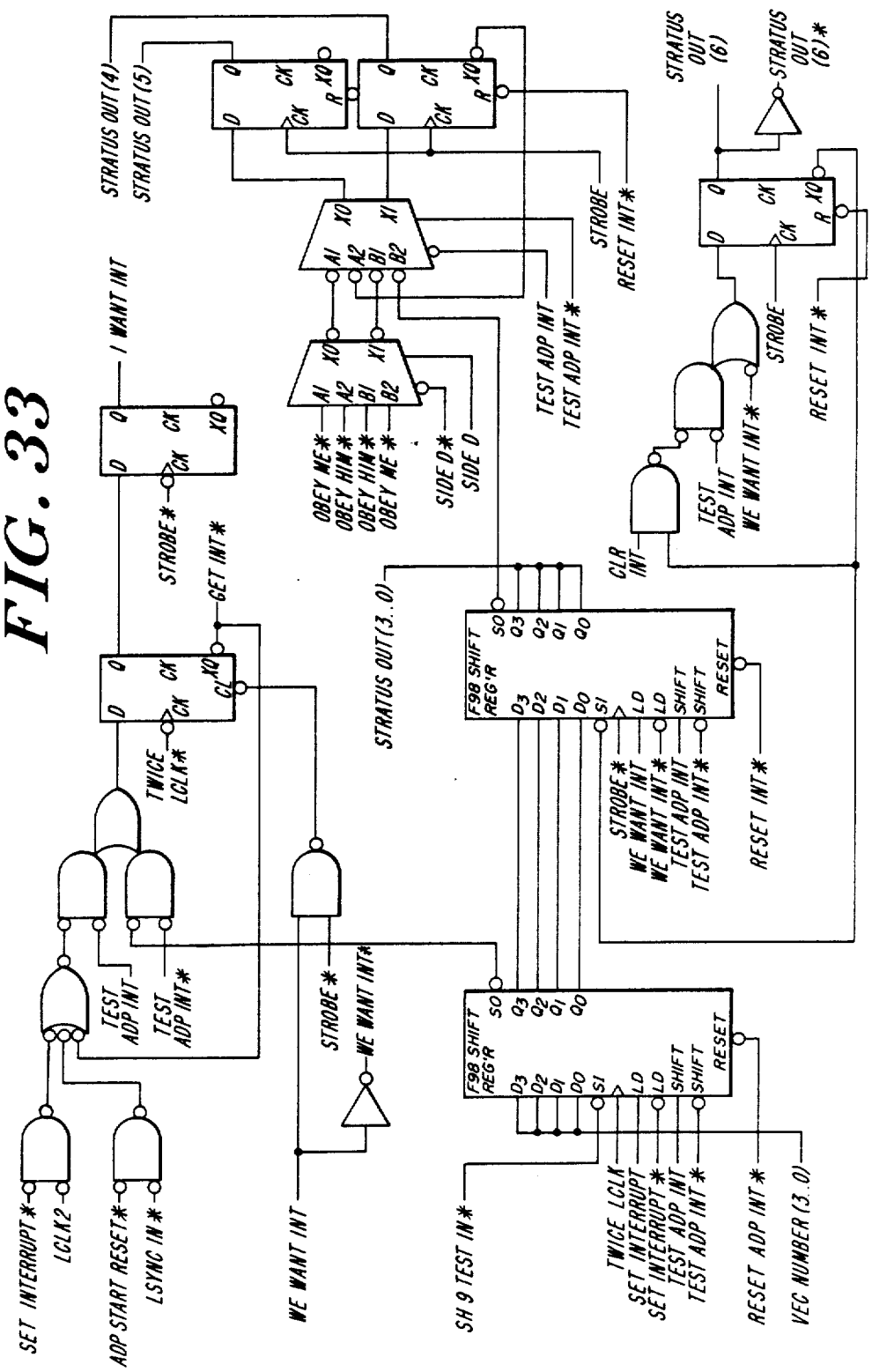
FIGS. 33 and 34 illustrate preferred circuitry for generating/interrupt-related and obey signals in a device interface constructed according to the invention.

FIG. 33 illustrates preferred circuitry for generating interrupt-related signals GET INT* and I WANT INT, as well as gate array 32 status signals (STATUS OUT).

Figure 34:
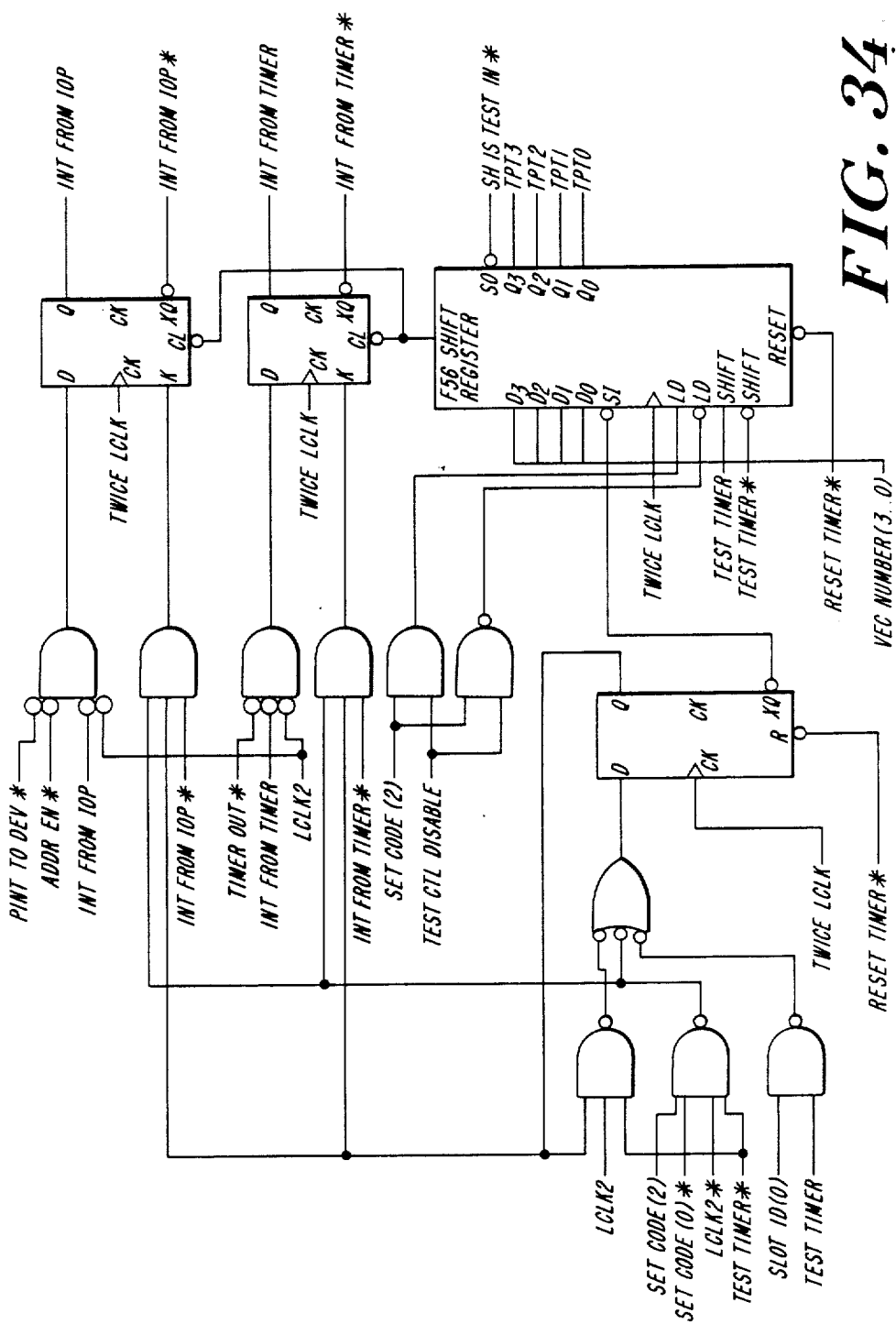

FIG. 34 illustrates a preferred circuit for generating further interrupt related signals INT FROM IOP, INT FROM TIMER.

Figure 35:
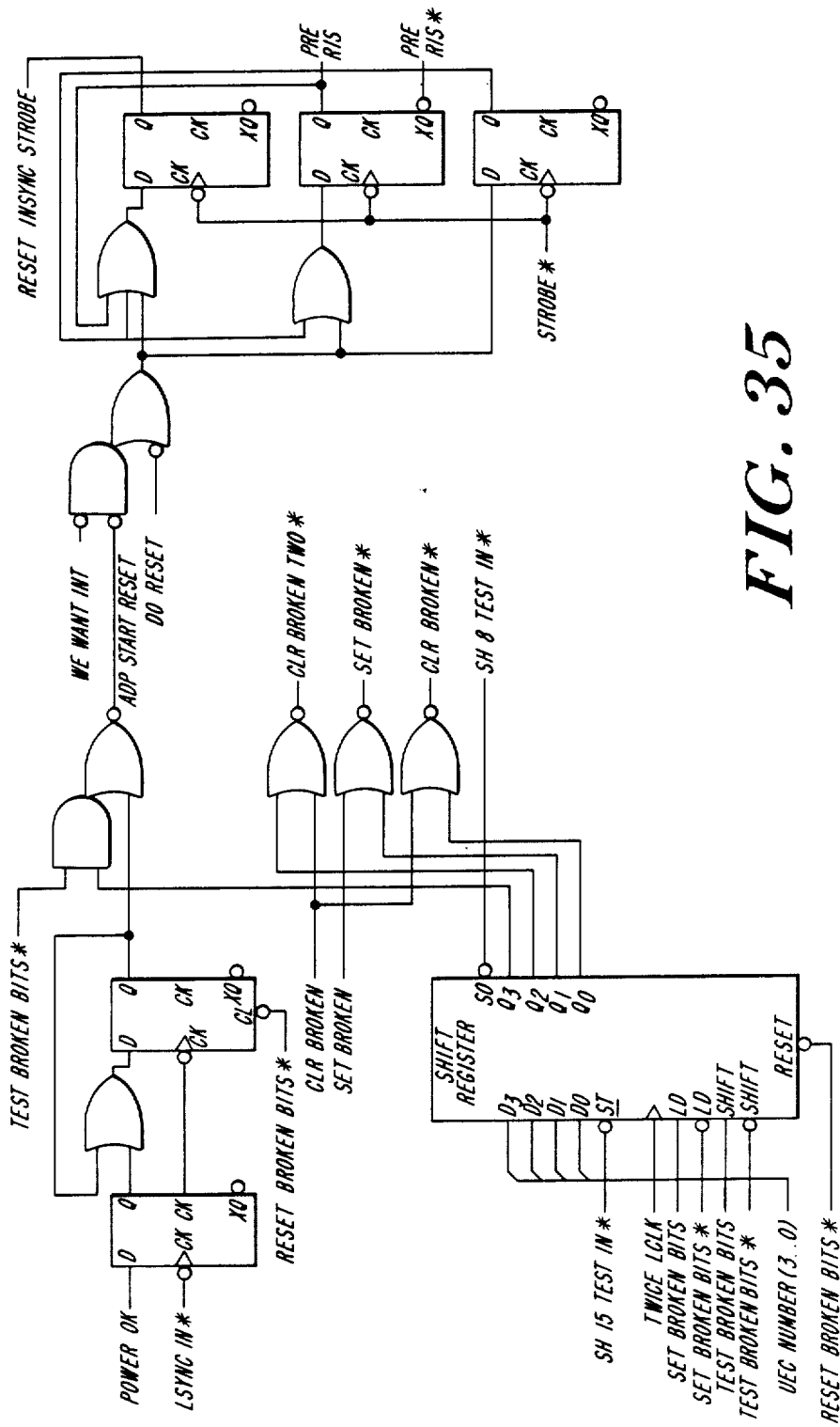
FIG. 35 illustrates preferred circuitry for generating start-up signals in a device interface constructed according to the invention.

FIG. 35 illustrates preferred circuitry for generating error-related signals CLR BROKEN TWO, SET BROKEN and synchronizing signals RESET INSYN STROBE and PRE RIS, as well as inverted forms thereof.

Figure 36:
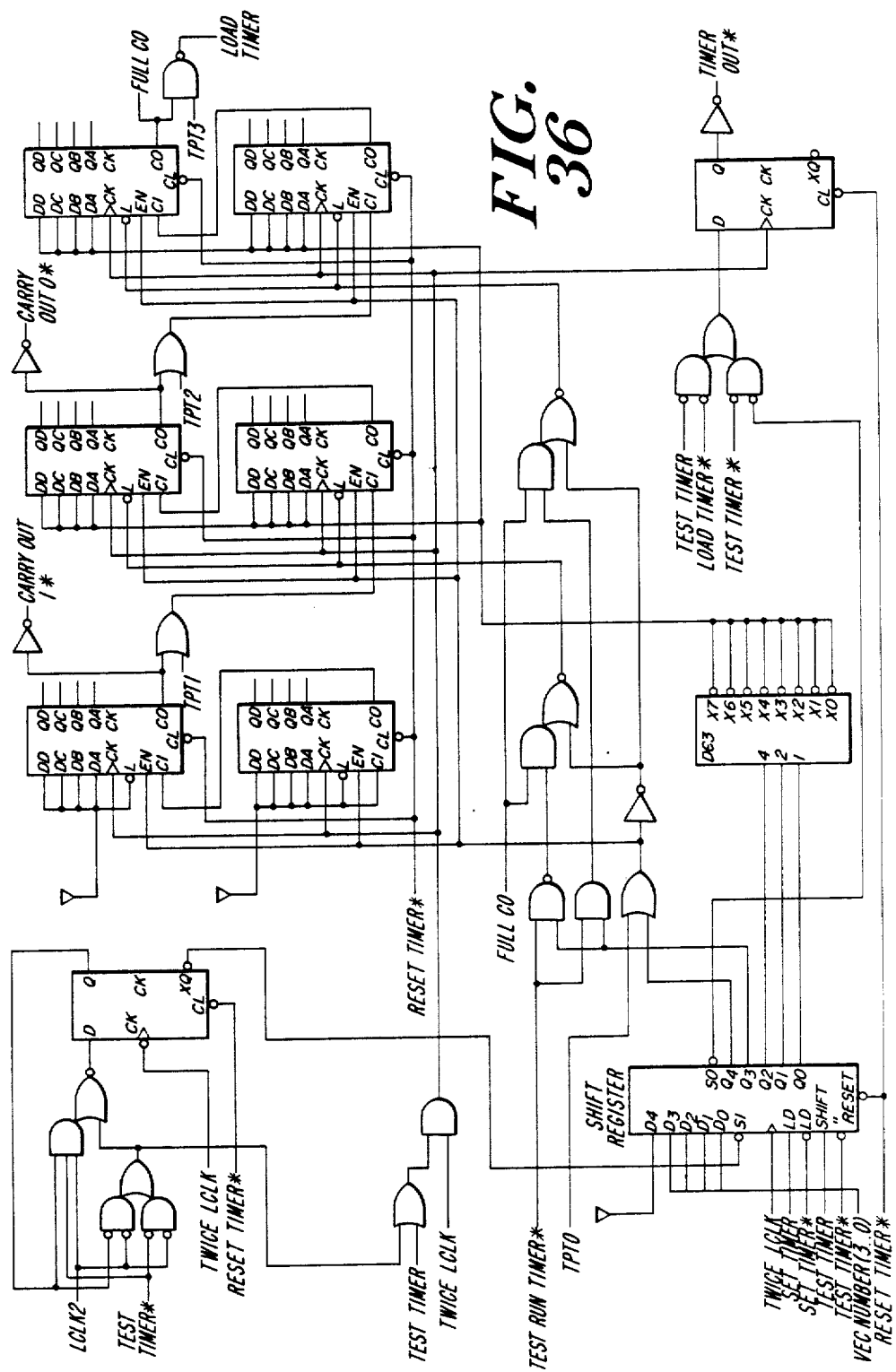
FIG. 36 illustrates a preferred circuit for generating timer signals.

FIG. 36 illustrates a preferred circuit for generating timer signals LOAD TIMER* and TIMER OUT.

Figure 37:
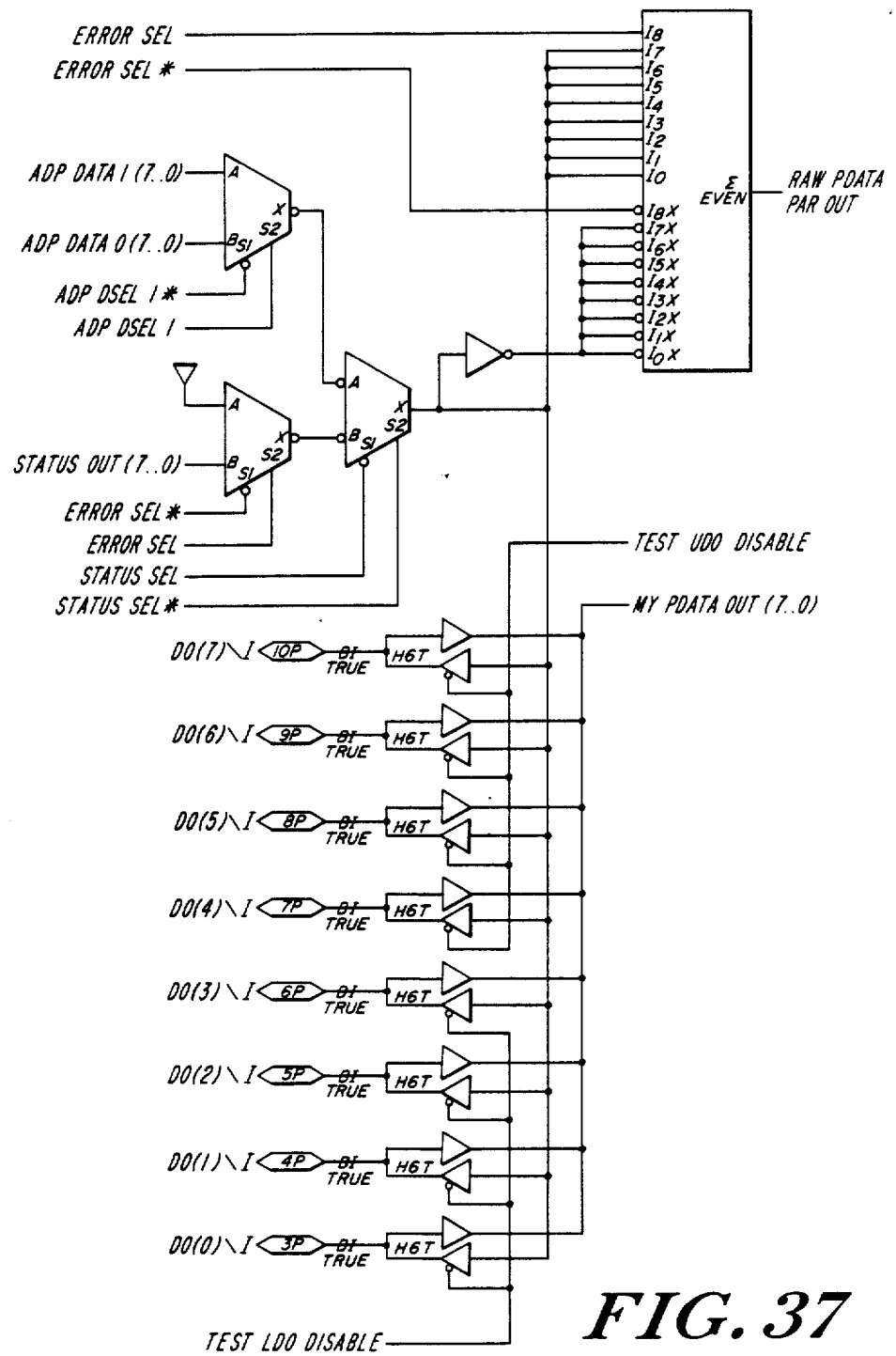
FIG. 37 illustrates preferred circuitry for driving data and status signals onto the adaptor bus in a device interface constructed according to the invention.
Figure 38:
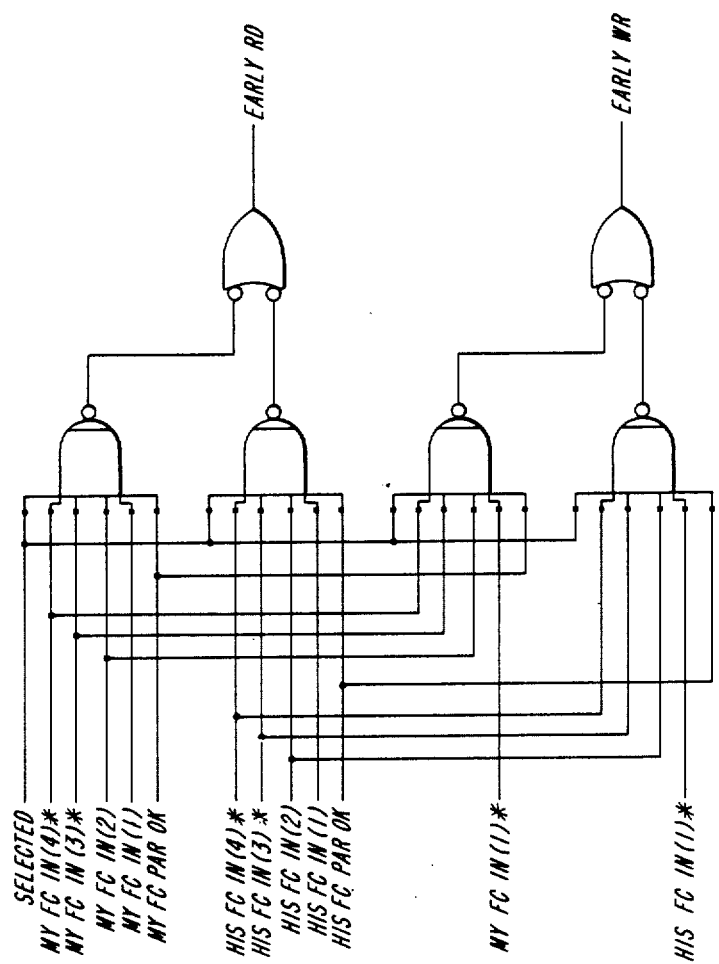
FIG. 38 illustrates preferred circuitry for generating early read and write signals.

FIG. 37 illustrates preferred circuitry for driving data and status signals (ADP DATA and STATUS OUT) onto the adaptor bus 56, as well as circuitry for receiving data signals (MY PDATA OUT) from that bus.

Bus Protocol

The peripheral device interface and, particularly, the gate arrays 32, 34 and adaptor 44 receive signals from the peripheral bus 30 according to the protocol defined above. Unlike the i/o controller 18, 20 which ends each bus interface cycle with the generation of a strobe signal, the gate arrays 32, 34 begin each cycle upon receipt of the strobe signal. This aspect, among others, of the operation of the interface is described below. It will be appreciated that this description generally applies to all of the illustrated gate arrays 32, 34, . . . 42.

Generally, each gate array 32, 34, 36, 38, 40, 42 monitors both the first and second i/o buses and compares information received from both of them. Normally, of course, the comparisons reveal that the signals are ok—i.e., that duplicate signals have been received synchronously and simultaneously on the buses. Accordingly, the the gate array passes signal received on the assigned, or obeyed, bus.

As described above, an information transfer cycle begins with the transmission along the peripheral bus 30 of a select command and slot id. The interface associated with the peripheral to which this select command is directed normally responds with an ALIVE signal, as described above. The next three cycles involve the transfer of the address to be read or written to the adaptor. The final cycles are the reads or writes, and the i/o controller 18, 20 may continue with additional reads or writes if it wishes a sequence of transfers.

As shown in FIG. 26, four XOR gates compare a hard-wired slot ID associated with the chassis slot with bits 4–7 of the SAFE DATA to create a signal called ME SAFE. While this signal may be asserted immediately after receipt of unsafe data, only after assertion of MAKESAFE DATA will ME SAFE be used by the drive side array 32. The signal arrives slightly after the safe function code, but sufficiently before the rising edge of STROBE.

The SAFE FC signals are used as inputs to programmable array logic of the drive side array 32 which controls all of the data transfers on the D-side of the interface. The SAFE FC signals include the following function codes:

```
0000  Idle
0001  Select
0010  Write
0011  Read
```

Responding to these function codes, the drive side array 32 acts as a finite state machine having states described below. It will be appreciated that the check side array 34 is normally acting identically to the drive side array 32 and, therefore, is expected to enter the states simultaneously with its partner array. In the description of states, the designation "PAL" is used in reference to those elements which provide the finite state logic function.

Entering Selection State
SAFE FUNCTION CODE: SELECTION
SAFE DATA: SLOT NUMBER (first part of cycle)
DATA PLACED ON BUS: STATUS (last part of cycle)
PAL STATE BEFORE STROBE: Nothing
PAL STATE AFTER STROBE: NEW ME All data transfers begin with a safe function code for Selection (0001), while the device address is present on safe address leads 4–7. The ME SAFE signal is decoded and presented to the drive side array 32 logic.

The PAL logic implements a state machine which decodes the fact that ME SAFE has been asserted, the fact that a Select function code is present, and the fact that the logic itself is not asserting any of its outputs, to create a state called NEW ME, which it enter on the rising edge of the next STROBE.

Accepting the High Byte of Address
SAFE FUNCTION CODE: IDLE
SAFE DATA: Status that devices was driving (stored in multiplexors 240A and 240B)
PAL STATE BEFORE STROBE: NEW ME
PAL STATE AFTER STROBE: LD HI With reference to FIG. 24, when the rising edge of STROBE occurs, the PAL enters the LD HI state, asserting a signal called LOAD HI*. This signal causes SAFE DATA 0–7 to be recorded on the rising edge of the next STROBE, i.e., the one that terminates the LD HI state.

The lower four bits of the binary counter have outputs A16–A19 and are part of the 23-bit address for data transfers, although bits A16–A18 have another purpose which will be described shortly.

The upper four bits of the counter are called A20–A22 and P CONTROL. If outputs A19, A20, A21, A22, and P CONTROL contain the code 001, a decoder shown in FIG. 25 is enabled. This decoder decodes address bits A16–A18 to create SET BROKEN*, CLR BROKEN*, TOGGLE OBEY Q*, TOGGLE OBEY P*, CLEAR INTERRUPT*, and DO RESET*. The set and clear of BROKEN go to the BROKEN flip-flop (see FIG. 32).

If the device 24 associated with this interface has set the Interrupt Request bit (by asserting SET INT), a processor 10, 12 can clear that by sending a "P CONTROL COMMAND" that will assert CLEAR INTERRUPT*. When CLEAR INTERRUPT* has been asserted (low), the next rising edge of STROBE will clear the STATUS OUT 6 (Interrupt Request) flip-flop. The flip-flop is arranged so that it will not be cleared unless it is already set. This prevents a race condition in which issuance of CLEAR INTERRUPT* might clear the flip-flop as it was in the process of being set.

The DO RESET* signal clears a binary shifter, as illustrated in FIG. 35. RESET* will be asserted (low) until three more STROBE assertions have been received. The shifter is then disabled until the next occurrence of DO RESET*.

Accepting the Middle Byte of Address
SAFE FUNCTION CODE: WRITE
SAFE DATA: High Address Byte
PAL STATE BEFORE STROBE: LD HI
PAL STATE AFTER STROBE: LD MID Assuming that a P CONTROL operation did not occur, the PAL state machine of FIG. 27 will continue processing the data transfer. (In the cases of RESET and SET BROKEN, the hardware will not step to LD MID. In the other cases, the function codes normally used in those cases are inappropriate for LD MID.

The PAL determines that it is in the LD HI state, not in any other state, and that a WRITE function code (0010) is present. From these conditions it will enter the LD MID state on the rising edge of STROBE.

When the rising edge of STROBE occurs, the logic records the high address information in latches that were conditioned during LD HI state. The logic enters the LD MID state, asserting a signal called LD MID*. This signal prepares two binary counters to record SAFE DATA 0–7 on the rising edge of the next STROBE, i.e., the one that terminates the LD MID state.

Accepting the Low Byte of Address
SAFE FUNCTION CODE: WRITE
SAFE DATA: Middle Address Byte
PAL STATE BEFORE STROBE: LD MID
PAL STATE AFTER STROBE: LD LOW The logic determines that it is in the LD MID state, and that a WRITE function code (0010) is present. From these conditions, it will enter the LD LOW state on the rising edge of STROBE.

When the rising edge of STROBE occurs, this records the middle address information in the aforementioned latches, which were conditioned during LD MID state. The logic enters the LD LOW state, asserting a signal called LD LOW*. This signal prepares two binary counters to record SAFE DATA 0–7 on the rising edge of the next STROBE, i.e., the one that terminates the LD LOW state.

Achieving the "SELECTED" State
SAFE FUNCTION CODE: WRITE
SAFE DATA: Low Address Byte
PAL STATE BEFORE STROBE: LD LOW

PAL STATE AFTER STROBE: NEW ME AND SELECTED

The logic determines that it is in the LD LOW state, and that a WRITE function code (0010) is present. From these conditions, it will enter the NEW ME and SELECTED state on the rising edge of STROBE.

The function code and data sequence common to all data transfers is now complete. The STROBE that causes the logic to enter the NEW ME and SELECTED states also records the low byte of address information into the latches, which were conditioned during the LD LOW state.

Preparation for Data Reads and Writes

SAFE FUNCTION CODE: WRITE (Write operation) or IDLE (Read operation)

SAFE DATA: Data to be written (Write operation) or Nothing (Read operation)

PAL STATE BEFORE STROBE: NEW ME AND SELECTED

PAL STATE AFTER STROBE: SELECTED

The PAL to remain in the SELECTED state as long as it is in the NEW ME and SELECTED state (only), MAKE ERROR T1 is not asserted, and a IDLE or WRITE function code is present.

The STROBE that causes the PAL to change from the NEW ME and SELECTED state to only the SELECTED state increments the address counter indicating that the supplied data has been recorded (WRITE cycle) or that the desired data has been obtained (READ cycle). In the case of the READ cycle, the desired data will be placed on the bus during the next cycle.

Data Reads and Writes

SAFE FUNCTION CODE: WRITE (Write operation) or READ (Read operation)

SAFE DATA: Data to be written into device (Write operation, or

DATA PLACED ONTO BUS: Data obtained from device on previous cycle (Read operation)

PAL STATE BEFORE STROBE: SELECTED

PAL STATE AFTER STROBE: SELECTED

Once the PAL is no longer in the joint NEW ME / SELECTED state, an additional term in the PAL equation for SELECTED permits the device to stay in the SELECTED state so long as READ (0011) or WRITE (0010) function codes occur and no error states are entered.

STROBE records the SAFE DATA received from the P BUS or Q BUS during writes and changes the data gated out to the P BUS and Q BUS during reads.

Entering the Error State

If upon the assertion of STROBE, the latched P and Q data and/or function codes are of correct parity, but differing values, or if neither P nor Q produced correct parity, logic which detects this on the drive side array 32 or check side array 34 will assert MAKE ERROR T1* or MAKE ERROR T1 C* respectively. The assertion of MAKE ERROR T1* will cause a WAIT request to be asserted on the bus. The WAIT request allows the STROBE pulse to complete at the normal time, but the next rising edge of STROBE is delayed for 16 microseconds.

The following table shows the conditions that can lead to the assertion of MAKE ERROR T1* and

MAKE ERROR T1 C*:

| D-Latch Parity Status | C-Latch Parity Status | D-Latch C-Latch Compare | ACTION |
|---|---|---|---|
| Fail | Fail | — | MAKE ERROR T1* |
| Pass | Pass | Fail | MAKE ERROR T1* |

(— = don't care)

If BROKEN* is not asserted, the trailing edge of the STROBE will record the assertion of MAKE ERROR T1* to create a "sub-state" that will last until the next trailing edge of STROBE. This sub-state is called ERROR T1, and will be fairly long because of the assertion of WAIT.

ERROR T1 places an all-1's pattern on both the P bus data and the P bus function code lines. It accomplishes this as follows:

1. ERROR T1 and NOT BROKEN create DRIVE* enabling PDATA OUT 0-7 D to the P bus 30A.
2. ERROR T1 causes SEND DATA* to be high, causing DATA OUT 0-7 to be connected to PDATA OUT 0-7.
3. ERROR T1 brings DATA OUT 0-7 to the all-1's state.
4. ERROR T1, combined with the all-1's data will cause the "EVEN" output of the parity generator to be LOW, causing the associated 74F02 output to be HIGH when DRIVE* is asserted, causing an assertion of the DATA PARITY bit on the P Bus 30A as long as the interface is not BROKEN.
5. ERROR T1 enables a transceiver on FIG. 16 to directly place an all-1's condition onto the P bus function code leads.
6. ERROR T1 is used as a direct input into the transceiver which will place a 1 on the Function Code Parity line of the P bus 30A as long as the interface isn't BROKEN.

The next assertion of STROBE will latch new data (all 1's) into the drive and check latches of FIG. 16, and will place the drive side array 32 PAL in the ERROR SEQUENCE state, since MAKE ERROR T1* is still asserted based on the data stored in the Drive and Check latches at the time of the STROBE. The ERROR T1 sub-state still exists because it is clocked on the trailing edge of STROBE.

During the transition to the ERROR SEQUENCE/ERROR T3 state, the controller 18, 20 continues to place an all 1's pattern on the P bus. This will continue until part way through the ERROR SEQUENCE / ERROR T3 state.

The next assertion of STROBE will place the drive side array 32 PAL in a null state, with only OBEY P* possibly asserted.

Normal Operation (Including Bad Parity on One Side PAL equation: OBEY_P=OBEY_P * /MAKE ERROR T1 * /ERR_SEQ * /RESET (See Appendix 2 - Differences between PAL notation and text notation).

The D-Side of the interface is arranged to prefer to get its data from the P BUS. The C-Side of the interface is arranged to prefer to get its data from the Q BUS. Continuing to use the drive side array 32 as an example, the control PAL on the drive side array 32 usually asserts OBEY P*, a signal which keeps the Drive Latch connected to the P BUS. In normal operation, the drive side array 32 control PAL will continue to assert OBEY P as long as MAKE ERROR T1, ERROR SEQUENCE, and RESET* are not asserted.

The following table outlines normal operation and the cases where the D-latch or the C-latch have bad parity:

| OBEY P* | D-Latch Source | D-Latch Parity Status | OBEY Q* | C-Latch Source | C-Latch Parity Status | ACTION |
|---|---|---|---|---|---|---|
| Assert | P BUS | OK | Assert | QBUS | OK | MAKESAFE D = D C = C |
| Assert | P BUS | Fail | Assert | QBUS | OK | MAKESAFE D = C C = C |
| Assert | P BUS | OK | Assert | QBUS | Fail | MAKESAFE D = D C = D |

(The table does not mention data and function code separately, but the MAKESAFE determination is made separately, as was discussed previously.)

Data Integrity Checks During the Error-Handling Sequence

As was indicated previously, circumstances beyond a simple parity error on one side of the interface will cause the assertion of MAKE ERROR T1*, MAKE ERROR T1 C* signals which will cause the interface to step through the error-handling sequence described.

On three occasions during the error-handling sequence, test pattern data will be placed on the bus:

1. In preparation for the STROBE that occurs at the beginning of ERROR SEQUENCE (i.e., during ERROR T1)
2. In preparation for the STROBE that occurs at the beginning of ERROR T3.
3. In preparation for the STROBE that occurs at the end of ERROR T3.

In the first case, the interface is placing all-1's on the bus. In the second case, the i/o controllers 18, 20 is placing all-1's on the bus. In the last case, no one is placing anything on the bus, and it should be all-0's.

When an assertion of STROBE occurs, the PAL may enter a new "OBEY" condition, based on the results of the test.

Checking for the All-Ones Condition During ERROR T1 Sequence

```
PAL:  OBEY_P = ERR_T1_DEL D * CHK_OK P * WAIT IN P *
      /RESET
      OBEY_Q = ERR_T1_DEL C * CHK_OK Q * WAIT_IN Q *
      /RESET
```

The illustrated circuitry checks for an all 1's condition when the interface is not in the ERROR T3 state.

If both OBEY P* and OBEY Q* were asserted, both buses were in use and an error occurred. If the P bus fails its check, the first equation above will not allow continued operation of OBEY P*. If the Q bus fails its check, the second equation above will not allow continued operation of OBEY Q*.

If only OBEY P* was asserted, only the P bus was in use. Therefore, the first equation will fail because OBEY Q* was not asserted. The second equation will check the Q bus to see if OBEY Q* should be asserted such that data transfer now uses the Q bus.

If only OBEY Q* was asserted, only the Q bus was in use. Therefore, the second equation will fail because OBEY P* was not asserted. The first equation will check the P BUS to see if OBEY P* should be asserted such that data transfer now uses the P BUS.

In each of the above equations, the CHECK OK test is performed during the ERROR T1 time (MAKE ERROR T1 and NOT ERROR SEQUENCE) for the side of the interface appropriate to the bus being checked.

If neither bus passes its test, neither OBEY will be asserted on the next assertion of STROBE, and the interface will then go BROKEN.

Checking for the All-Ones Condition During the Error T2 Sequence

```
PAL      OBEY_P = OBEY_O * CHK_OK P * ERR_SEQ
equations:  D * /WAIT_P * /RESET * ERR _T2 D
         OBEY_Q = OBEY_Q * CHK_OK Q * ERR_SEQ
            C * /WAIT_Q * /RESET * ERR_T2 C
```

There are two data checks performed during ERROR SEQUENCE. An all-1's check at the midpoint (which is the beginning of ERROR SEQUENCE / ERROR T3) and an all-0's check at the end.

Each data check is performed by the check circuitry located in the illustration. The 1's check takes place at the time of the STROBE which will take the interface into ERROR T3 state.

Checking for the All-Zeros Condition Durino the Error T3 Sequence

```
PAL Equations: OBEY_P = OBEY_P * CHECK_OK P *
               ERR_SEQ D * /WAIT_P * /RESET *
               ERR_T3 D
               OBEY_Q = OBEY_Q * CHECK_OK Q *
               ERR_SEQ C * /WAIT_Q * /RESET *
               ERR_T3 D
```

The 0's check takes place at the time of the STROBE which will take the interface out of the ERROR T3 state. In each case, if the check is OK, and the WAIT signal is negated (it was supposed to be turned off at the end of ERROR T1, the OBEY output assertions of the PALS remains unchanged when the next assertion of STROBE occurs.

Other Ways in Which "Bus Obedience" Get Changed

```
        PAL   OBEY_P = /OBEY_P * TOGGLE * /RESET
  Equations:  OBEY_P = /OBEY_P * /OBEY Q * /RESET
              OBEY_Q = /OBEY_Q * TOGGLE * /RESET
              OBEY_Q = /OBEY_Q * /OBEY P * /RESET
```

The drive side array 32 control PAL monitors the OBEY P*, OBEY Q* and TOGGLE OBEY P* for the following additional conditions (assuming no RESET):

1. If the OBEY P* signal is not presently asserted, and a toggle request occurs, OBEY P* gets asserted on the next assertion of STROBE.
2. If the OBEY P* signal is not presently asserted, and OBEY Q* isn't asserted either, OBEY P gets asserted on the next assertion of STROBE.

Driving Data onto the P BUS and OBUS

Data is driven onto the bus when DRIVE* is low. The DRIVE* signal is low when the following conditions ar true:

```
    Error T1 AND Not Broken
or: Function Code 0011 (Read) AND Selected
    AND Not Broken
or: Function Code 0001 (Select) AND Me
```

The first term is used to place all 1's on the bus during ERROR T1 state. The second term is the normal data reading case. The third term is the status reporting case immediately after transfer begins.

Broken

The BROKEN signal is generated by latching COMPARE OK* on the leading (falling) edge of STROBE*. The signal COMPARE OK* is asserted if any of the following conditions becomes true:

| 1  | The XOR of Data Out 0-7 with Data Out 0-7 C |
|----|---------------------------------------------|
| 2  | or: the XOR of Drive D* with Drive C* |
| 3  | or: the XOR of Error T1 D* with Error T1 C* |
| 4  | or: the XOR of Error T1 D with Error T1 C |
| 5  | or: the XOR of PDATA PAR OUT D with PDATA PA OUT C |
| 6  | od: the XOR of WAITOUT D with WAITOUT C |
| 7  | or: (the XOR of OBEY P* with OBEY Q *) AND (PFC IN EQ* or PDATA IN EQ* |
| 8  | or: OBEY P* AND OBEY Q* |
| 9  | or: GIOC (controller 18, 20) SET BROKEN |
| 10 | or: DEVICE GO BROKEN |

Term 1: If the data that the drive side array 32 of the interface would like to put on the bus and the data which the check side array 34 would like to put on the bus do not agree, the interface is BROKEN.

Term 2: If one side of the interface would like to drive data onto the bus, but the other side would, not, the interface is BROKEN.

Terms 3 and 4: the two sides of the interface disagree as to whether or not they are in the ERROR T1 sub-state, the interface is BROKEN.

Term 5: If the parity of the data that the drive side array 32 of the interface would like to put on the bus and the parity of the data which the check side array 34 would like to put on the bus do not agree, the interface is BROKEN.

Term 6: If one side of the interface is requesting a bus WAIT, but the other is not, the interface is BROKEN.

Term 7: If only one of the OBEY signals is asserted, the data is all being received from one bus. If the data or function code information received from that bus is inconsistent on the two sides of the interface, the interface must be BROKEN.

Term 8: If neither OBEY signal is asserted, the interface is BROKEN. This situation is usually the result of complete test failure during an ERROR SEQUENCE.

Term 9: the controller 18, 20 to which the interface connects desires to take the interface off-line, it can do so by asserting this signal.

Term 10: If the device to which the interface connects desires to take the interface off-line, it can do so by asserting this signal.

Appendices A and B, submitted with copending, commonly assigned application Ser. No. 079,297, filed July 29, 1987, now U.S. Pat. No. 4,926,315 provide further hardware and software specifications for the fault-tolerant peripheral control system described above and, particularly, for the i/o controllers 18, 20, the gate arrays 32, 34, and the adaptors 44. The teachings of that related application and, specifically, Appendices A and B contained therein are incorporated by reference herein.

It will thus be seen that the objects set forth above, among those made apparent from the preceding description, are efficiently attained. It will be understood that changes may be made in the above constructions and in the foregoing sequences of operation without departing from the scope of the invention. It is accordingly intended that all matter contained in the above description or shown in the accompanying drawing be interpreted as illustrative rather than limiting in sense.

Having described the invention, what is claimed is:

1. In a fault-tolerant digital data processing system of the type having plural functional units, including any of a central processing unit, a memory unit, a peripheral device, and a peripheral device controller the improvement comprising A. first and second bus means connected to at least selected ones of said functional units, each said bus means for transferring information-representative signals, including at least one of a data, address, and control signal, between said selected functional units, B. each of said selected functional units including, and being associated with, interface means for transferring, in absence of at least selected fault, information-representative signals between the associated functional unit and said first and second bus means, C. the interface means of a first said selected functional unit including strobe means for normally applying duplicate timing signals synchronously and simultaneously to said first and second bus means for transfer to said other selected functional units, said timing signals being indicative of a timing of said transfer of information-representative signals on said first and second bus means, D. at least one said interface means other than said first interface means comprising fault detection means responsive to a first class of errors in the transfer of said information-representative signals on said bus means for generating a first fault signal, and means responsive to a second class of errors in the transfer of said information-representative signals on said bus means for generating a second fault signal, E. said first interface means including means responsive to any of said first and second fault signals for at least delaying generation of said timing signals, and F. one or more of said interface including
   (i) means responsive to said first fault signal for processing information signals, including said timing signals, received only on a non-faulty one of said first and second bus means, and
   (ii) error handling means responsive to said second fault signal for entering an operational state for determining a source of detected error.

2. In a fault-tolerant digital data processing system according to claim 1, the further improvement wherein said fault detection means includes single-bit error means for identifying, among said first class of transmission errors, errors arising from single-bit faults occurring during information-representative signal transfer, and multi-bit error means for identifying, among said second class of transmission errors, errors arising from multi-bit faults occurring during information-representative signal transfer.

3. In a fault-tolerant digital data processing system according to claim 2, the further improvement wherein said single-bit error means comprises parity means coupled with at least one of said first and second bus means for detecting parity errors in signals transferred thereon.

4. In a processing system according to claim 1, the further improvement wherein said error handling means includes
   A. means for selectively generating and transmitting a first error-identifying signal synchronously and simultaneously on each of said first and second bus means during a first timing interval, and
   B. means for selectively comparing signals received on at least one of said first and second bus means during said first timing interval with said first designated error-identifying signal.

5. In a fault-tolerant digital data processing system according to claim 4, the further improvement wherein said error handling means further includes
   A. means for selectively generating and transmitting a second error-identifying signal synchronously and simultaneously on each of said first and second bus means during a second timing interval, and
   B. means for selectively comparing signals received on at least one of said first and second bus means during said second timing interval with said second error-identifying signal.

6. In a fault-tolerant digital data processing system according to claim 5, the further improvement wherein said error handling means further includes
   A. means for selectively generating and transmitting a third error-identifying signal synchronously and simultaneously on each of said first and second bus means during a third timing interval, and
   B. means for selectively comparing signals received on at least one of said first and second bus means during said third timing interval with said third designated error-identifying signal.

7. In a fault-tolerant digital data processing system according to claim 1, the further improvement wherein said at least one said interface means comprises first and second processing sections, each processing section being coupled to said first and second bus means for processing duplicate input signals, normally received synchronously, and simultaneously on at least one of said first and second bus means, to normally generate resultant signals identically, synchronously, and simultaneously with the other processing section.

8. In a fault-tolerant digital data processing system according to claim 7, the further improvement wherein said at least one interface means comprises comparison means coupled to said first and second processing sections for comparing resultant signals produced by each said processing section and for generating a fault signal in the event those compared signals do not match.

9. In a fault-tolerant digital data processing system according to claim 1, the further improvement wherein at least one said interface means includes means for normally transferring, in absence of at least selected fault, duplicate ones of said information-representative signals synchronously and simultaneously between the associated functional unit and said first and second bus means.

10. In a method according to claim 2, the further improvement comprising the step of transferring, in absence of at least selected fault, duplicate ones of said information-representative signal synchronously and simultaneously between at least one of said functional units and said first and second buses.

11. In a fault-tolerant digital data processing system according to claim 10, the further improvement wherein at least a selected one of said interface means includes means for transferring, in absence of at least selected fault, duplicative information-representative signals synchronously and simultaneously between the associated functional unit and said first and second bus means.

12. In a method of operating a fault-tolerant digital data processing system having plural functional units, including any of a central processing unit, a memory unit, a peripheral device and a peripheral device controller, the improvement comprising the steps of
   A. providing first and second buses, each connected to at least selected ones of said functional units for transferring information-representative signals, including at least one of a data, address, and control signal, between said selected functional units,
   B. transferring, in absence of at least selected fault, information-representative signals between each of said selected functional unit on said first and second buses,
   C. normally applying duplicate timing signals synchronously and simultaneously on said first and second bus for transfer to said functional units, said timing signals being indicative of a timing of said transfer of information-representative signals on said first and second buses,
   D. monitoring said information-representative signals transfers for responding to a first class of transfer errors for generating a first fault signal, and for responding to a second class of transfer errors for generating a second fault signal,
   E. responding to any of said first and second fault signals for at least delaying the applying of said duplicate timing signals to said first and second buses,
   F. responding to said first fault signal for processing information signals, including said timing signals, received only on a non-faulty one of said first and second buses, and
   G. responding to said second fault signal for entering an operational state for determining a source of detected error.

13. In a method according to claim 12, the further improvement comprising the steps of
   A. identifying, among said first class of transmission errors, errors arising from single-bit faults occurring during information transfer, and
   B. identifying, among said second class of transmission errors, errors arising from multi-bit faults occurring during information transfers.

14. In a method according to claim 13, the further improvement comprising the step of detecting parity errors in signals transferred on at least one of said first and second buses during information transfers.

15. In a method according to claim 12, the further improvement comprising the steps of
   A. generating and transmitting a first error-identifying signal synchronously and simultaneously on each of said first and second bus means during a first timing interval, and
   B. comparing signals received on at least one of said first and second buses during said first timing interval with said first error-identifying signal.

16. In a method according to claim 15, the further improvement comprising the steps of
   A. generating and transmitting a second error-identifying signal synchronously and simultaneously on each of said first and second bus means during a second timing interval, and
   B. comparing a signal received from at least one of said first and second buses during said second timing interval with said second error-identifying signal.

17. In a method according to claim 16, the further improvement comprising the steps of
   A. generating and transmitting a third error-identifying signal synchronously and simultaneously on each of said first and second buses during a third timing interval, and
   B. comparing a signal received on at least one of said first and second buses during said third error-identifying timing interval with said third error-identifying signal.

18. In a method according to claim 12, the further improvement comprising the step of providing a device interface for interfacing at least one said peripheral device with said first and second buses, said device interface including first and second processing sections, each said processing section being coupled to said first and second buses for processing duplicate input signals, normally received synchronously, and simultaneously on at least one of first and second buses, to generate resultant signals identically, synchronously, and simultaneously with the other processing section.

19. In a method according to claim 18, the further improvement comprising the step of comparing resultant signals produced by each said processing section and for generating a fault signal in the event those compared signals do not match.

* * * * *